(12) United States Patent
Beckham et al.

(10) Patent No.: US 12,430,355 B2
(45) Date of Patent: Sep. 30, 2025

(54) METHOD AND DATA SERVICE FOR CONVERTING AND OUTPUTTING ANIMAL RELATED DATA

(71) Applicant: The Government of the United States of America, as represented by the Secretary of Homeland Security, Washington, DC (US)

(72) Inventors: Tammy Beckham, Manhattan, KS (US); Matthew Coats, Washington, DC (US); John Korslund, Riverdale, MD (US); Michelle Colby, Washington, DC (US); James Wall, College Station, TX (US); Keith Biggers, College Station, TX (US); Melissa Berquist, College Station, TX (US); Austin Riddle, College Station, TX (US); Paul Bilnoski, College Station, TX (US); Derek Overby, Covington, LA (US); Graham Booker, College Station, TX (US); Lindsey Holmstrom, Manhattan, KS (US)

( * ) Notice: Subject to any disclaimer, the term of this patent is extended or adjusted under 35 U.S.C. 154(b) by 863 days.

(21) Appl. No.: 17/571,393

(22) Filed: Jan. 7, 2022

(65) Prior Publication Data
US 2022/0138219 A1    May 5, 2022

Related U.S. Application Data

(63) Continuation of application No. 15/933,910, filed on Mar. 23, 2018, now Pat. No. 11,243,976, which is a
(Continued)

(51) Int. Cl.
G06F 16/26    (2019.01)
A01K 29/00    (2006.01)
(Continued)

(52) U.S. Cl.
CPC ............ *G06F 16/26* (2019.01); *A01K 29/005* (2013.01); *G06F 16/29* (2019.01); *G06Q 10/10* (2013.01); *G06Q 50/02* (2013.01)

(58) Field of Classification Search
CPC ....... G06F 16/26; G06F 16/29; A01K 29/005; G06Q 10/10; G06Q 50/02
See application file for complete search history.

(56) References Cited

U.S. PATENT DOCUMENTS 7,993,266 B2    8/2011    Colston, Jr. et al.
8,234,129 B2    7/2012    Michon et al.
(Continued)

FOREIGN PATENT DOCUMENTS

CN    102288183 A  *  12/2011
GB      2451801 A  *   2/2009    ............. G06Q 10/08

OTHER PUBLICATIONS

Asset, "Epidemic threshold" Feb. 26, 2017; available at https://web.archive.org/web/20170226122238/https://www.asset-scienceinsociety.eu/pages/epidemic-threshold (Year: 2017).*
(Continued)

*Primary Examiner* — John C Kuan
(74) *Attorney, Agent, or Firm* — Kelly G. Hyndman; Robert W. Busby

(57) ABSTRACT

A system and computerized method for monitoring and analyzing animal related data. In one embodiment, the system includes a processor and memory operable to identify a parameter related to animal management for species in a biological environment, aggregate animal related data from different sources about the parameter of the species, identify a baseline for the parameter, correlate the animal related data against the baseline to obtain correlated data, and analyze said correlated data to assess said animal management.

8 Claims, 31 Drawing Sheets

Related U.S. Application Data continuation-in-part of application No. 15/144,645, filed on May 2, 2016, now abandoned.

(60) Provisional application No. 62/475,446, filed on Mar. 23, 2017, provisional application No. 62/155,751, filed on May 1, 2015.

(51) Int. Cl.
*G06F 16/29* (2019.01)
*G06Q 10/10* (2023.01)
*G06Q 50/02* (2024.01)

(56) References Cited

U.S. PATENT DOCUMENTS

| | | | |
|---|---|---|---|
| 8,560,339 | B2 | 10/2013 | Khan |
| 8,626,521 | B2 | 1/2014 | Brown et al. |
| 8,882,664 | B2 | 11/2014 | Ebert et al. |
| 9,489,495 | B2 | 11/2016 | Li et al. |
| 9,594,878 | B2 | 3/2017 | Silva et al. |
| 9,727,702 | B2 | 8/2017 | Kass-Hout et al. |
| 9,746,985 | B1 * | 8/2017 | Humayun ............ G06F 16/904 |
| 10,188,048 | B2 | 1/2019 | Nelson et al. |
| 10,642,958 | B1 | 5/2020 | Perlin et al. |
| 2003/0177025 | A1 * | 9/2003 | Curkendall ............ G06Q 10/10 340/573.3 |
| 2006/0036619 | A1 | 2/2006 | Fuerst et al. |
| 2010/0169122 | A1 | 7/2010 | Ruoff et al. |
| 2010/0274573 | A1 | 10/2010 | Feied et al. |
| 2011/0099120 | A1 | 4/2011 | Grossman et al. |
| 2012/0124027 | A1 | 5/2012 | Hnatio |
| 2013/0054654 | A1 * | 2/2013 | Sterling ................. G06F 16/29 707/E17.032 |
| 2013/0275316 | A1 * | 10/2013 | Teng ..................... A01K 29/00 705/317 |
| 2014/0167917 | A2 | 6/2014 | Wallace et al. |
| 2016/0063188 | A1 | 3/2016 | Thornberry et al. |
| 2016/0117471 | A1 | 4/2016 | Belt et al. |
| 2018/0218057 | A1 | 8/2018 | Beckham et al. |
| 2018/0366221 | A1 | 12/2018 | Crehore et al. |
| 2020/0004746 | A1 | 1/2020 | Randall et al. |
| 2020/0373018 | A1 | 11/2020 | Segal |

OTHER PUBLICATIONS

Machine Translation of CN-102288183-A, downloaded Feb. 2015 (Year: 2015).*

Norstrom, "Geographic Information System (GIS) as a Tool in Surveillance and Monitoring of Animal Diseases" Acta vet. scand. 2001, Suppl. 94, 79-85 (Year: 2001).*

* cited by examiner

METHOD AND DATA SERVICE FOR CONVERTING AND OUTPUTTING ANIMAL RELATED DATA

CROSS-REFERENCE TO RELATED APPLICATIONS

This application is a continuation of U.S. patent application Ser. No. 15/933,910 entitled "System and Method for Monitoring and Analyzing Animal Related Data" filed Mar. 23, 2018; which is a continuation-in-part of U.S. patent application Ser. No. 15/144,645 entitled "System and Method for Monitoring and Analyzing Animal Health Data" filed May 2, 2016; which claims the benefit of U.S. Provisional Application Ser. No. 62/155,751 entitled "System and Method for Monitoring and Analyzing Animal Health Data" filed on May 1, 2015; U.S. patent application Ser. No. 15/933,910 also claims the benefit of U.S. Provisional Application Ser. No. 62/475,446 entitled "System and Method for Monitoring and Analyzing Animal Related Data" filed on Mar. 23, 2017; all of the foregoing being incorporated herein by reference in their entirety.

STATEMENT OF FEDERALLY FUNDED RESEARCH

This invention was made with government support under Federal Cooperative Agreements 10-9100-1290-CA, 12-9100-1290-CA and 12-9208-0323-CA by the U.S. Department of Agriculture (USDA); and Federal Grant 2007-ST-061-000002, Cooperative Agreement 2010-ST-061-AG0002, and Task Orders HSHQDC-12-J-00154, HSHQDC-13-J-00418, and HSHQDC-13-J-00329 issued under Basic Ordering Agreement HSHQDC-10-ABOA33, by the U.S. Department of Homeland Security. The U.S. government has certain rights in this invention.

TECHNICAL FIELD OF THE INVENTION

The present invention relates in general to the field of data collection and processing, and more specifically to a system and method for monitoring and analyzing animal related data.

BACKGROUND OF THE INVENTION

Outbreaks of infectious animal diseases can easily overwhelm decision-makers with raw information, forcing them to cope with a torrent of news reports, official updates, spreadsheets, maps, photos and documents. The chaos can render a response both inefficient and ineffective. Coordinating the decision-making process would be advantageous for successful outbreak management and animal-related health monitoring in general.

SUMMARY OF THE INVENTION

These and other problems are generally solved or circumvented, and technical advantages are generally achieved, by advantageous embodiments of the present invention, including a system and computerized method for monitoring and analyzing animal related data. In one embodiment, the system includes a processor and memory operable to identify a parameter related to animal management for species in a biological environment, aggregate animal related data from different sources about the parameter of the species, identify a baseline for the parameter, correlate the animal related data against the baseline to obtain correlated data, and analyze said correlated data to assess said animal management.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the features and advantages of the present invention, reference is now made to the detailed description of the invention along with the accompanying figures and in which.

Corresponding numerals and symbols m the different figures generally refer to corresponding parts unless otherwise indicated. The FIGURES are drawn to clearly illustrate the relevant aspects of the embodiments and are not necessarily drawn to scale.

DETAILED DESCRIPTION OF THE INVENTION

Figure 1:
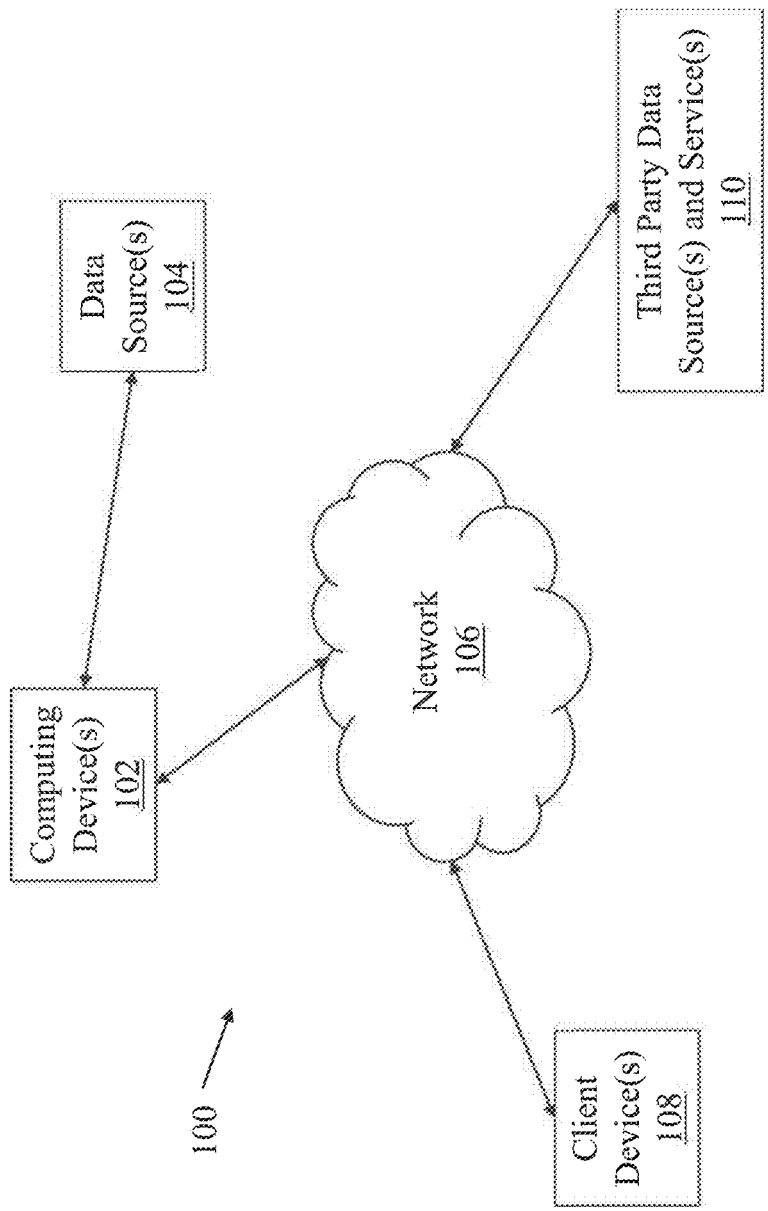
FIG. 1 illustrates a block diagram of an embodiment of a system.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. Although the description of the invention and various embodiments relate to animal health data collection and assessment, the invention is may be applicable to the collection and assessment of non-animal health data. As a result, the present invention is not limited to animal health data or the examples described herein.

Various embodiments of the present invention provide a system and computerized methods that allow a diverse set of disparate data to be automatically collected and accessed in near real-time or real-time, brokered based on defined data sharing agreements, transformed (e.g., processed, aggregated, synthesized, integrated, fused, etc.) as needed, and presented to end-users in a customizable and interactive fashion. The system provides an extensible and modular framework that allows a variety of data and tools, and various underlying technologies to be integrated in a distributed yet seamless fashion. The system can be fully distributed integrating both fixed and mobile elements. The system allows producers, state animal health officials ("SAHOs"), federal regulatory agencies and others to better understand a situation (shared situational awareness) and to more effectively collaborate, coordinate, communicate and make decisions regarding animal or product movement during the situation, while minimizing the disruption to normal business cycle that may occur as a result of the situation.

The system supports both routine production scenarios and the full emergency cycle (i.e., planning, preparation, early detection, mitigation, response, management and recovery) for emerging disease indications and/or outbreak events. The system also addresses privacy and security concerns by ensuring that the disparate data is compartmentalized, protected, and stored based on agreed conditions. Custom policies and permissions can be configured that control sharing of data with certain individuals and groups, and the policies may be dynamic and adjusted based on changing circumstances. The system can also enable "data on demand" in the event of an emergency, whereby certain data stored at, for example, a data owner level, can become accessible to other users, such as state or federal government officials, for research and analysis.

Thus, the system can link stakeholders to key confidential/sensitive data sources, but the data can be kept under "lock and key" until an emergency occurs and access to the data is necessary. At that time, data consumers can request access to the data, data owners can approve or grant access to the data, and the data can be released based on established data sharing agreements. The separation of data allows for business sensitive data to be distributed in a controlled manner, and then integrated to support shared situational awareness and decision making in regards to business continuity, which supports better risk assessment, mitigation, and management during emergency response operations. By separating particular data based on a type of user, the system can adequately be used by a wide variety of stakeholders and still address the specific needs of each of the stakeholders.

For example, a producer may be interested in (a) tracking animal movements and helping manage their animal health on a day-to-day basis, (b) monitor disease statuses across the producer's facilities and enable the producer to see how statuses change over time, (c) integrate diagnostic testing data from multiple laboratories or veterinarians in a single software solution, (d) allow a global view of the producer's operations where they can monitor all sites or a localized view where they can review the full history of a specific site, (e) provide a means to prove disease freedom during an outbreak, allowing for them to return to business operations sooner, and (f) integrate production level data with diagnostic testing data, and allow for the analysis of potential correlations and impacts between the two.

In contrast, an SAHO may require access to animal health data on a different granularity than that of the producer, such that the SAHO may make appropriate decisions in view of potential outbreaks. For example, the SAHO may desire that the system (a) provide enhanced capabilities for understanding and analyzing the data collected in state animal health data management systems (e.g., managed incidents, Certificates of Veterinary Inspection, permits, response personnel, etc.), (b) provide tools for evaluation of major stakeholders and trading partners, and the potential impact of certain actions, (c) allow data sharing across state lines and interoperability between different state animal health management systems, (d) provide a single tool that integrates asset management, animal health data, and other response management tools, and (e) enable interfacing with other responsive entities on the federal level.

Finally, federal officers may require that the system provide a high-level view of animal health data in efforts to assist with outbreak relief, while filtering out a vast majority of information retained by the system for use by producers or SAHOs. In this instance, a federal officer may require that the system (a) support and enforce federal response guidelines and requirements, (b) enable information sharing with various state points of contact, and (c) provide a single data portal to support national response efforts during catastrophic outbreaks, as well as provide a potential data repository for future outbreak modeling and risk assessment and prevention efforts (e.g., by way of data anonymization or obfuscation). Moreover, the system can enable revision of appropriate strategies and policies that may change at the federal level. For example, the U.S. Department of Agriculture may provide updated policies for effective incident management, and guidelines as to coordinating incident responses, which may then be updated and utilized by the system. Thus, the system may be designed to compartmentalize data based on the type of user, and provide sufficient information and functionality at varying levels of granularity based on the user to enable quick and effective decisions on all levels.

Referring initially to FIG. 1, illustrated is a block diagram of an embodiment of a system 100. The system 100 includes one or more computing devices 102 (e.g., a computer) communicably coupled directly or indirectly to one or more data sources 104. The system 100 is communicably coupled to a network 106 that facilitates coupling the computing device(s) 102 to client device(s) 108 and third-party data source(s) and service(s) 110. The network 106 can be the Internet, a wireless network, a public or private wide area or local area network, a cellular network, an optical network, a satellite network, a hardline connection, a wireless connection, a point-to-point connection, any other means of transmitting data, or any combination thereof. Note that the computing device(s) 102 can be a single computing device or a distributed network of locally or remotely located computing devices communicably coupled to one another. The data source(s) 104 can be any type of data storage or delivery medium (including memory) that allows data to be written, stored or retrieved by a computing device. Note that the data source(s) 104 can be a single storage device or a distributed network of locally or remotely located data storage devices communicably coupled to the computing device(s) 102. The data source(s) 104 can be integrated into the computing device(s) 102, or separate devices locally or remotely located with respect to the computing device(s) 102, or a combination thereof. Moreover, the computing device(s) 102 and data source(s) 104 may include redundant devices or devices operating in parallel. Note that the client device(s) 108 can be a workstation, a client computer, a laptop, a handheld computer, a mobile computing tablet, a mobile phone, an input and/or output device, a user interface on equipment, a sensor, a client data source or any other desirable device. In addition, the data source(s) 104 and third-party data source(s) and service(s) 110 can be databases, data feeds, sensors, storage devices, other computers, other client devices, etc.

Some features and benefits of various embodiments of the system 100 will now be described. The system 100 allows secure and robust access to diverse sets of data, and enables dynamically brokered, controlled or compartmentalized sharing of data to end-users (i.e., based upon established data sharing/protection agreements) at varying levels of resolution/detail that can be dynamically adjusted based on changing needs and circumstances. In addition, the system 100 provides timely and usable information to a decision maker in a customizable form factor that: (a) integrates or fuses data together (e.g., service-oriented architecture, relational and not only Structured Query Language (NoSQL) databases), and allows for processing, transformation, synthesis, aggregation, filtering, or sorting to support better awareness and decision-making across different agriculture arenas, (b) transforms raw data into more actionable information through the use of interactive visualization and analytical tools, and (c) supports analysis across multiple dimensions including time, space, animal populations, and genetics. Moreover, the system 100 incorporates both interactive and automated tools for more effective data analysis. The system 100 supports the full spectrum of activities (from day-to-day monitoring to managing animal health events) and can rapidly adjust to support changing needs and circumstances. The system 100 also provides a portable and reconfigurable platform to support multiple usage contexts including real-world operations, training and preparedness, and planning and analysis. As a result, the system 100 improves collaboration, coordination, and communication between different users, groups, and organizations, and provides an extensible architecture that can be grown and adjusted as end-user needs/requirements change.

Various embodiments of the present invention integrate authoritative information into a single, easy-to-use format that empowers real-time collection, distribution, and analysis of biosurveillance, veterinary diagnostic, and animal movement data. These embodiments are capable of integrating data from multiple sources, such as clinical observations, laboratory diagnostic test results, animal production information (e.g., weight gain, feed intake, etc.), wildlife, geographical, and environmental/climate data. As a result, the system 100 can serve as a central point for multiple groups to collaborate and leverage their collective resources to monitor disease events and treatment efficacies, thus enabling efficient risk analysis and effective program design for disease intervention.

The system can provide a passive surveillance capability that provides varying levels of functionality depending on the type of user, group membership for the user, or previously agreed upon conditions associated with the user. The functionality can be compartmentalized depending on the type of user to provide the appropriate amount of benefit to that user while respecting privacy concerns of, for example, business owners or production managers who own or manage the animals. In certain emergency situations, functionality can be combined across user type groups to assist in appropriate incident management decision making, while still protecting confidential or sensitive business data.

For example, the system may be usable by local producers, production managers, and veterinarians that directly interact with animals, whereby animal health data, movement data, or other such data pertinent to the animal can be entered and recorded in real time to serve as a simple data collection and tracking tool at the local level, such as by a company operating a large farm or other such operation. The company can use the system to enhance business continuity and make appropriate decisions based on the data that is being recorded. Additionally, epidemiologists and other such analysts may review an abstracted, high-level version of the real-time data using various tools of the system to observe for any anomalies in animal health. In the event of an animal disease outbreak, state or federal officials can access appropriately abstracted data to manage and control the outbreak, or may be permitted full access to the animal data in certain emergencies. For example, state or federal officials may be permitted access to only animal data on a county-level, but may be granted full access to all nation-wide animal data upon input to the system that a national emergency has been declared.

Minimizing business and economy disruption and minimizing the number of impacted animals from the disease is of vital importance to the public for a variety of reasons (e.g., avoiding unnecessary destruction or quarantine of animals, avoiding price increases for industries), and the recorded animal data can provide for better, faster decision making regarding the movement or sale of animals safe from disease. For example, a regulatory official may determine to quarantine all animals that have had incidental contact with a disease originating area. Through the visualization software and animal tracking, local veterinarians, producers, or production managers can appropriately be informed as to whether certain animals within their control must be quarantined, or whether such animals are clear for further movement and/or sale to market.

This data sharing approach thereby allows for sensitive or confidential business data, such as animal movement and feeding patterns, to be collected and analyzed at the business or local level. The business sensitive data can also be protected and distributed in a controlled manner in the event of emergencies. By combining data from disparate sources into a single integrated system, situational awareness and decision making can be improved across all levels of use, which results in better business continuity on the part of the businesses that own the animals, while also allowing for better risk assessment, mitigation, and management during emergency response operations. Moreover, the use of a single system for data collection, reporting, and tracking, provides the ability for different agencies to use the system while mitigating interoperability issues between the different agencies.

In summary, various embodiments of the system 100 can provide one or more of the following benefits: (a) enhance animal health management for producers, SAHOs, and federal regulatory agencies; (b) improve collaboration, coordination, and communication between these different end-users and groups thereby allowing them to leverage their collective resources to more effectively monitor and manage animal health, and assess different treatment efficacies; (c) eliminate latency of decisions by automatically providing access to current data (i.e., a decision maker no longer has to manually collect, process, integrate, and develop a presentation from the raw data); (d) provide a unified approach where data can be collected and accessed, processed, aggregated, transformed, synthesized, integrated, fused, and then presented in a meaningful way; (e) take existing parallel workflows/processes (i.e., production management, disease surveillance, disease response) and allows them to converge and interoperate, and allows automated integration of data in near real-time to support these activities; (f) allow interoperability between different systems and data that (to date) are not typically integrated in any automated way; (g) provide an infrastructure where data can be made available (i.e., based upon data sharing agreements in an actual, anonymized, or obfuscated fashion) to support modeling of disease spread, risk analysis and assessment, and determination of baselines/trends and anomalies for detecting new and/or emerging events; (h) support an array of decisions and allows decisions to be more aligned with current processes (i.e., as data is immediately available when needed); (i) support pre-event and post-event usage; and/or j) help with day-to-day production animal health decisions and early detection, response, management, and recovery from disease events that occur.

Figure 2:
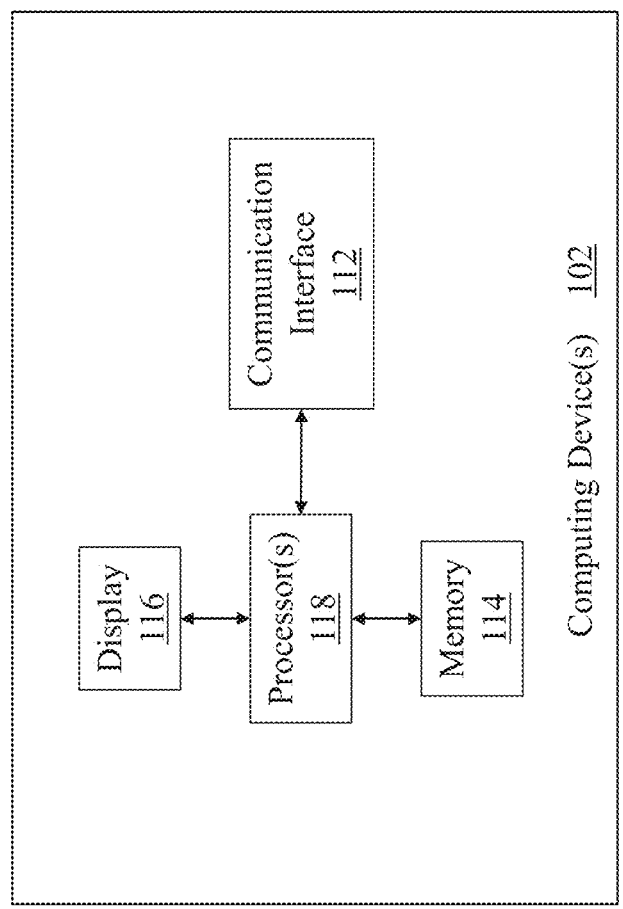
FIG. 2 illustrates a block diagram of an embodiment of the computing device(s) of FIG. 1.

Turning now to FIG. 2, illustrated is a block diagram of an embodiment of the computing device(s) 102 of FIG. 1. The computing device(s) 102 includes a communications interface 112, a memory 114 (capable of storing computer program code, which includes, without limitation, interpreted code, binaries, libraries, and/or executables), a display 116 and one or more processor(s) 118. The processor(s) 118 are communicably coupled to the communications interface 112, memory 114 and display 116. Alternatively, the display 116 can be communicably coupled to the processor(s) 118 via the communications interface 112. The communications interface 112 can be multiple interfaces and provides the appropriate connections and communication protocols to connect the processor(s) 118 to other devices, components and the network 106. The computing device(s) 102 have a computer program embodied on a non-transitory computer readable medium that when executed causes the computing device(s) 102 to perform various computerized methods in accordance with the present invention, non-limiting examples of which will be described in more detail below.

The computing device(s) 102 is configured to monitor and analyze animal related data in a biological environment. In one embodiment, the processor(s) 118 and memory 114 (cooperating to execute computer program code) are configured to cause the computing device(s) 102 to identify a parameter related to animal management (e.g., a syndrome, animal health, animal production) for species (e.g., disparate species) in the biological environment. The parameter may include, without limitation, an animal diagnostic laboratory throughput parameter (e.g., a veterinary diagnostic laboratory throughput parameter), an animal resource allocation parameter (e.g., a veterinary diagnostic laboratory resource allocation parameter), an animal production parameter, an animal health monitoring parameter, an animal tracking parameter, an animal disease identification parameter, a phylogenetic analysis parameter, and an animal related emergency response parameter/dynamically changing situation.

The processor(s) 118 and memory 114 (executing computer program code) are configured to receive and encode animal related data from different sources into a common format. The animal related data may include, without limitation, animal health data, movement data, key location data, surveillance data, diagnostic testing data, geographic information system layer data, personnel data, resource data, phylogenetic data and laboratory data, and may be directed at the individual or group level. The conversion or translation associated with encoding the animal related data may be from a proprietary format to a common agnostic format, where such a conversion is capable of retaining various aspects of the data, such as metadata. In a related embodiment, the common format allows the data to be employable across various types of software and/or devices. A unique identifier can also be assigned to the animal related data to associate the data to other data such as a species type. The unique identifier may also be relationally associated with an identifier assigned to the animal related data by the corresponding data source (e.g. producer, veterinarian or health authority). For example, in one embodiment, identifiers may be recorded in the system for each user of the system, such as a producer, a veterinarian, a health authority (e.g., a SAHO), etc. The unique identifier applied to the animal related data can be a concatenation of the identifiers for the users associated with that particular animal, i.e., the identifiers for the producer, veterinarian, and health official may all be concatenated to generate the unique identifier.

The animal related data may also be anonymized to sanitize sensitive information, but sufficient to enable some type of analysis thereof. For example, the animal related data may include movement data and geographical data concerning certain animals associated with a business. The business may have privacy concerns regarding, for example, animal movement patterns, and therefore the movement data and/or geographical data can be translated into a format that is more suitable for protecting the privacy of the business. For example, geographic data concerning a particular animal may be entered into the system by a local producer or business owner. However, the geographical data entered into the system may include information that associates the particular animal with the business by way of a business name, a physical address, or other such identifying information.

In such a case, the system can analyze geographical data and translate any geographical data that is represented as an address into coordinate geographical information. The coordinate geographical information can be generated, for example, by using a set of coordinates that correspond to the address information, or may alternatively be generated based on where the initial data for an animal was recorded. The generated coordinate data may be internally linked to the original address information, and the system can display to a user either the coordinate data or the address information, depending on what type of user is using the system (e.g., the business owner may have full access to the address information, but a state official may have access to only the coordinate data).

Furthermore, the system can also be configured to restrict access to animal related data that was collected and entered into the system based on the timing of requests. For example, certain animal diseases have incubation periods, and the system may make animal related data accessible only until expiration of the incubation period, after which the system can deny requests for the animal related data. Alternatively, the system may allow access to animal related data if a request for the data is received within twenty-four (24) hours of the data being entered into the system. Such timing periods can be established in the system and may be unique depending on the type of disease tracking that is being performed, or based on particular preferences of the local producer or business operator.

The processor(s) 118 and memory 114 (executing computer program code) are also configured to filter the animal related data from the different sources based on the parameter. The filtering of the animal related data from the different sources may be based on time, space and context associated with the parameter, and/or based on a guard band or pre-determined baseline associated with the parameter. Thus, certain animal related data may be flagged as anomalous and/or discarded if it falls outside of a particular expectation, or if a predetermined set of data is not provided. Such a rejection may occur if certain users have indicated that a minimum number of data elements must be present and populated with data in order for accurate analysis to occur. Conversely, the animal related data that is filtered out may be retained within the memory 114 for other purposes. The processor(s) 118 and memory 114 (executing computer program code) are also configured to aggregate the animal related data from the different sources about the parameter of the species, and may also cause a notice to be displayed to a user upon determining that additional data must be included in the data set.

The processor(s) 118 and memory 114 (executing computer program code) are also configured to identify a baseline for the parameter. It should be noted that the baseline may be a time series model calculated over time and may fluctuate based on the animal related data. Thus, the baseline can then be tested to determine the validity thereof by, for instance, identifying patterns in the animal related data. If the baseline is invalid or should be updated, the processor(s) 118 and memory 114 (executing computer program code) are configured to modify the baseline. Once the baseline is set, the processor(s) 118 and memory 114 (executing computer program code) are configured to correlate the animal related data against the baseline to obtain correlated data and then analyze the correlated data to assess the animal management. The computing device(s) 102 may assess the animal management by predicting future outcomes associated with the animal management, by identifying a trend associated with the animal management, and/or by identifying an anomaly or confirming a normalcy associated with the animal management. The assessment may be performed in real-time, or delayed to account for incubation time.

The processor(s) 118 and memory 114 (executing computer program code) are also configured to present the animal related data in a first frame of the display 116 and present the correlated data in a second frame of the display 116. The animal related data and correlated data may be presented as a geographical map, a graphical representation, a chart or a list, and dynamically formatted for presentation on the display 116. The processor(s) 118 and memory 114 (executing computer program code) are also configured to track a movement of the species associated with the animal related data. As an example, the animals may be tagged with a sensor (such as a radio frequency identification tag) that communicates with a reader and server to provide location information to the computing device(s) 102. Of course, the computing device(s) 102 may not only track, but in addition to or in lieu of incorporate data about the movement of the species. The processor(s) 118 and memory 114 (executing computer program code) are also configured to assign permissions (e.g., credential based on predefined rules) to the animal related data based on the source and restrict access to at least portions of the animal related data based on the permissions (e.g., county (or coarser)-level permissions), which may be dynamically adjusted (e.g., full or unlimited access) based on specific circumstances, teaming arrangement, investigation, or on a situational basis such as an emergency level or basis. The permissions may also be applied to allow access to the correlated data with the data granularity being commensurate with the permission levels. The permissions may be allocated by an external agency or service, and verified and assigned in accordance with the computing device(s) 102.

The processor(s) 118 and memory 114 (executing computer program code) are also configured to provide a notification to a device such as a client device(s) 108 based on the correlated data. The notification may include an alert to a device such as a client device(s) 108 if the animal related data substantially deviates from the baseline by, for instance, a guard band. A notification may also be provided if the animal related data is outside a predetermined set or threshold, which may affect an accuracy of the correlated data. Of course, the processor(s) 118 and memory 114 (executing computer program code) may repeat at least a portion of the above-referenced operations as the application dictates.

Figure 3:
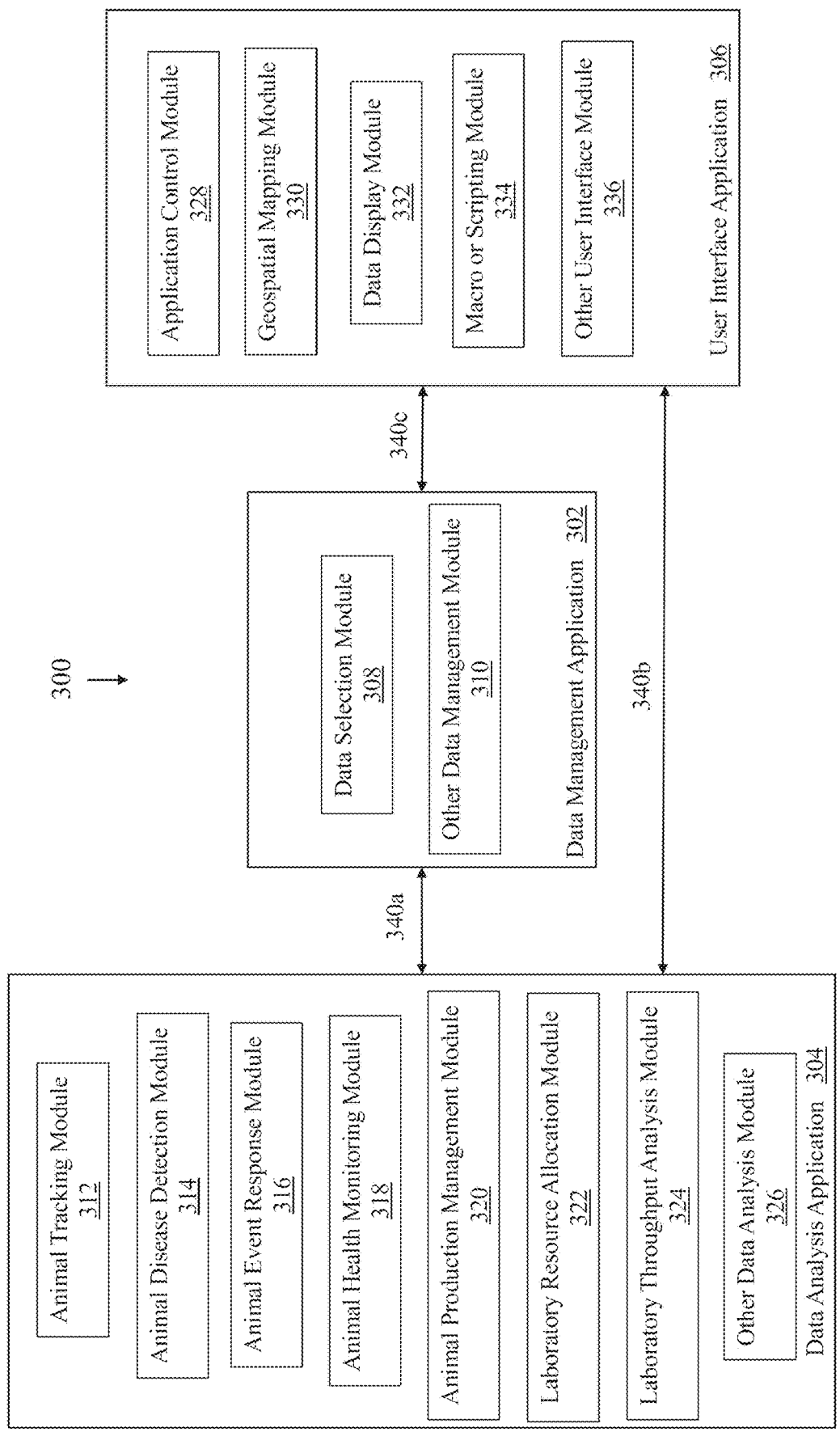
FIG. 3 illustrates a block diagram of an embodiment of various applications and modules used to perform various computerized methods.

Turning now to FIG. 3, illustrated is a block diagram of an embodiment of various applications and modules used to perform various computerized methods. Software programs are often subdivided into components that interact with one another or cause another component to perform some type of action or function to provide a desired functionality. This type of configuration and interaction between the components is also called "interconnected." These components can take many forms depending on the programing language used and the operational environment(s) in which they are executed. In addition, the components can be interconnected in various ways to accommodate the programming language or operational environment(s). Primary functional components within software and hardware architectures are often referred to as layers or applications, which are typically interconnected in such a way to enable interaction between them. Secondary functional components are often referred to as modules, gadgets, widgets, tools, functions, etc. These secondary functional components can be interconnected with other secondary functional components and/or primary functional components. A frame is a type of box, window, container object or information dashboard displayed within a user interface that is used for input and/or output (e.g., an Internet browser, a word processing window, a file directory window, etc.). Many of these terms are interchangeable even though they may have different connotations within a specific software environment. As a result, the present invention is not limited by any use or definition of these terms.

In one embodiment of the present invention, a computer program 300 includes a data management application 302, a data analysis application 304 and a user interface application 306 executable by one or more computing device(s) 102 communicably coupled to the one or more data source(s) 104. In a related embodiment, the one or more computing device(s) 102 may be communicably coupled to the third party data source(s) and services 110 in addition to the one or more data source(s) 104. The data management application 302, data analysis application 304 and user interface application 306 are interconnected as indicated by the arrows 340a, 340b, 340c. In one embodiment, the data management application 302 includes at least a data selection module 308, but may include other data management modules 310. The data management application 302 is the software interface to the data source(s) 104. In another embodiment, the data management application 302 is the software interface to the data source(s) 104 and/or the third party data source(s) and services 110. The data selection module 308 provides sufficient information to the data analysis application 304 and user interface application 306 such that those applications and modules therein are able to select, retrieve, save, process, manipulate and/or transform the desired data, and/or causes actions to be performed related to the desired data. The data management application 302 provides many other data management functions, which can be separate modules (e.g., other data management modules 310), to users, database administrators, system administrators and authorized third parties. These functions may include, but are not limited to, data acquisition, collection, cleansing, filtering, formatting, integration, security, transformation, translation, conversion of formats, aggregation, queries, compression, encryption, decryption, repair, backup, delivery, etc.

The data analysis application 304 provides users with a set of manual and automated tools for analyzing data from the one or more data source(s) 104 via the data management application 302. For example, data analysis application 304 can include an animal tracking module 312, an animal disease detection module 314, an animal event response module 316, an animal health monitoring module 318, an animal production management module 320, a laboratory resource allocation module 322, a laboratory throughput analysis module 324, and other data analysis modules 326. These modules will be described in more detail below in reference to various non-limiting examples. Moreover, some embodiments may include different sets of these modules or limit access to various modules.

The user interface application 306 provides a user friendly and user customizable interface to access, view, analyze, manipulate and otherwise use data from the one or more data source(s) 104 and/or the third party data source(s) and services 110 via the data management application 302 and data analysis application 304. For example, the user interface application 306 can include an application control module 328, a geospatial mapping module 330, a data display module 332, a macro or scripting module 334 and other user interface modules 336. The application control module 328 provides a set of application control functions that allow a user to add, remove, change and manipulate frames displayed on the computing device(s) 102, and to execute, control and terminate the modules within the program 300, and the program 300 itself. The geospatial mapping module 330 displays a frame in the user interface that includes a map with one or more graphical objects representing various data from the data source(s) 104 or the modules from the data analysis application 304. The geospatial mapping module 330 also provides various controls that allow a user to annotate, change and manipulate content displayed within the frame (e.g., map data overlaid with data from the data sources 104 or the modules from the data analysis application 304). The data display module 332 displays a frame in the user interface that provides a listing, a chart or a graph of data from the data sources 104 or the modules from the data analysis application 304 in whatever visual format desired by the user. The macro or scripting module 334 allows the user to create, modify and save customized modules, which provide user-defined functions, analysis or displays.

Figure 4:
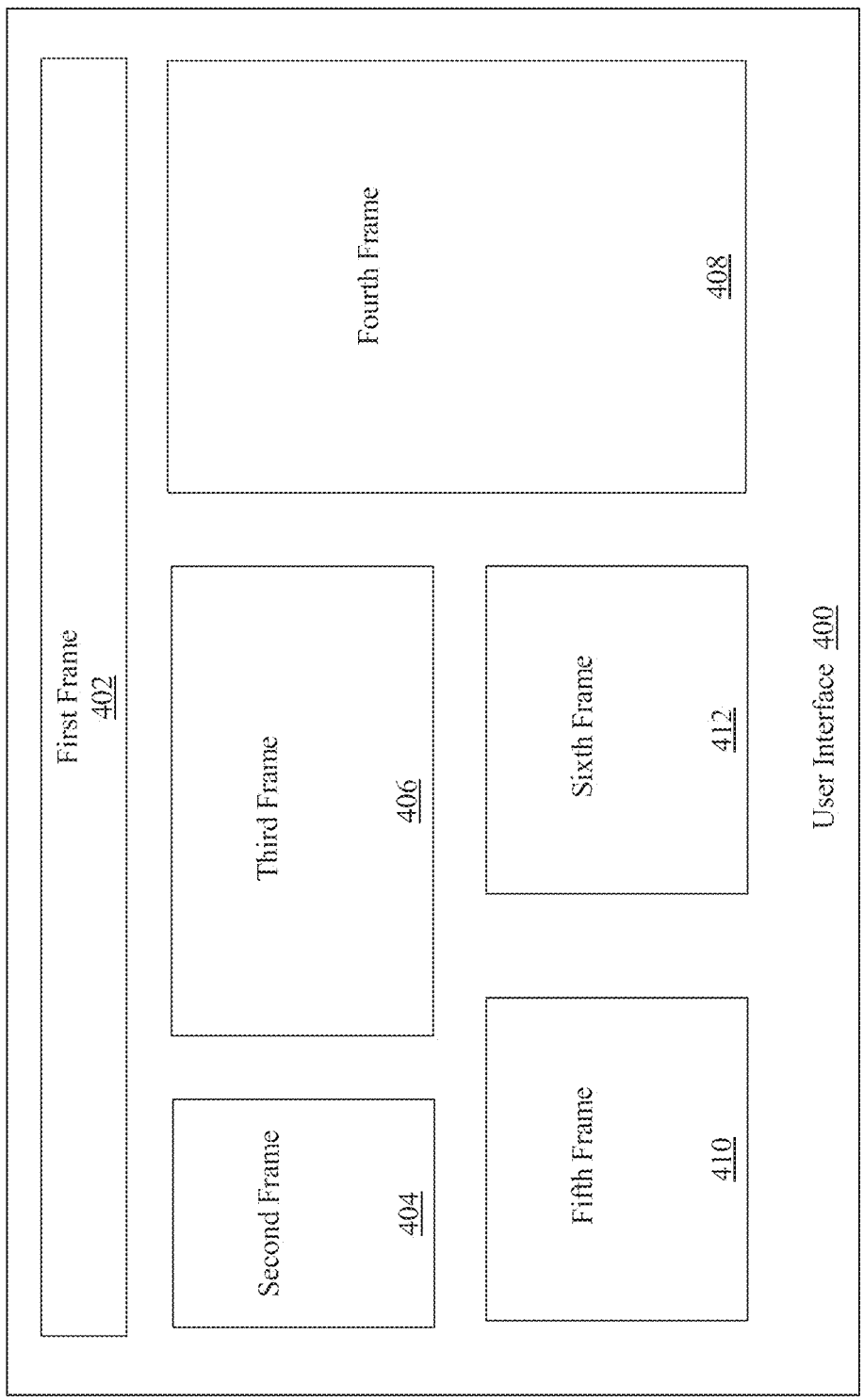
FIG. 4 illustrates a block diagram of an embodiment of a user interface created by the user interface application of FIG. 3.

Referring now to FIG. 4, illustrated is a block diagram of an embodiment of a user interface 400 created by the user interface application 306 of FIG. 3. The application control module 328 creates and displays the user interface 400 (e.g., an initial, start-up or main window) on a display of the computing device(s) 102. In this example, the user interface 400 includes six frames that can be removed, replaced, changed and manipulated by the user via a mouse, pen, keyboard, touch screen, other input device or a combination thereof. A first frame 402 typically includes a control menu, buttons, drop down menus, data entry fields, status information or other control functions of the application control module 328 that are used to control the user interface 400 and/or the program 300. One of the other frames such as the second or fourth frames 404, 408, will typically provide input and output for the data display module 332. Similarly, one of the frames such as the third frame 406 will provide input and output for the geospatial mapping module 330. The other frames such as the fifth frame 410 or the sixth frame 412 can provide input and output to any of the other modules within the program 300 or even additional instances of the data display module 332 or the geospatial mapping module 330. Note that the frames within the user interface 400 can be moved, resized and manipulated by the user within the user interface 400. Note that the user interface 400 can display more or less than six frames (e.g., one, two, ten, etc.). Moreover, the frames can be separated from the user interface 400 such that they are displayed outside the boarders of the user interface 400 or even on a second display.

Figure 5:
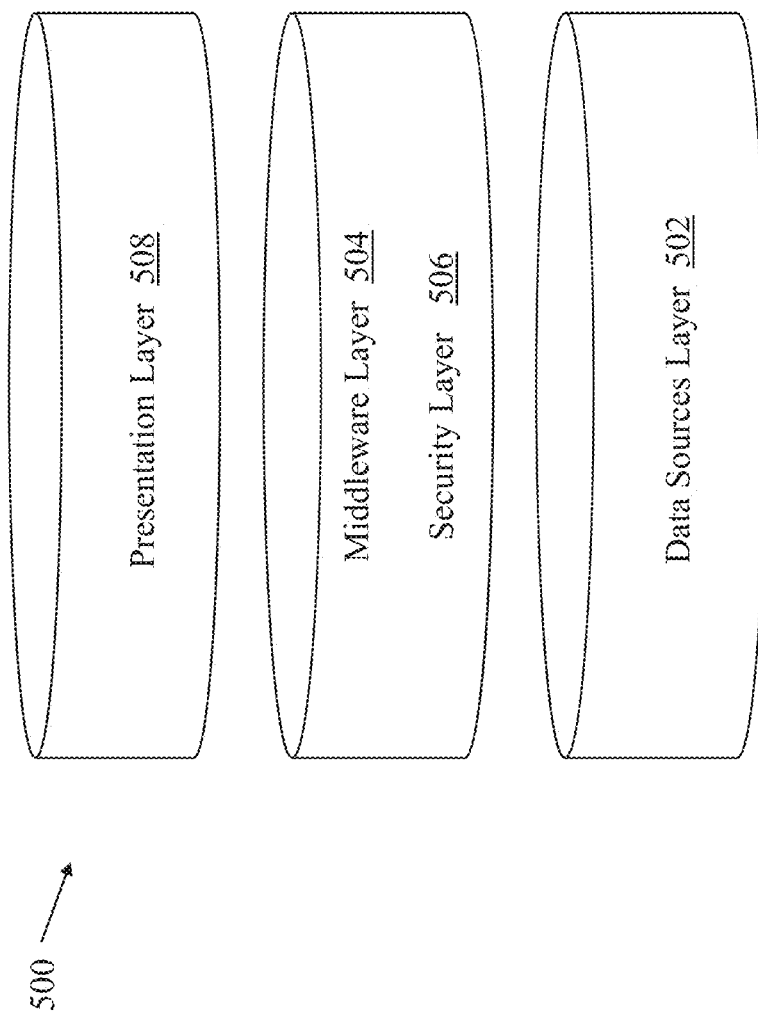
FIG. 5 illustrates a block diagram of an embodiment of a modular and distributed architectural framework for the system and computerized methods.

Turning now to FIG. 5, illustrated is a block diagram of an embodiment of a modular and distributed architectural framework 500 for the system and computerized methods. The framework 500 includes a data sources layer 502 (i.e., the data management application 302), a middleware layer 504 (i.e., the data analysis application 304) having an integrated security layer 506, and a presentation layer 508 (i.e., the user interface application 306). The framework

500: (a) relies upon a collection of loosely-coupled (and potentially distributed) services for contributing data and capabilities; (b) facilitates the fetching of raw data from services, brokering access to this data based on defined polices and user credentials, and feeding the data to supporting services linked to components (i.e., these can combine, fuse, visualize, and share or export the data); and (c) leverages a collection of reusable core services that are able to provide underlying system functionality (e.g., core dashboard, geocoding, administration services, data policy service, map server, data engine, and rendering services). The framework 500 can operate within a cloud environment or on one or more servers depending upon the system and application requirements.

The data sources layer 502 facilitates fusion of data and capabilities from different sources in an extensible, scalable, reliable, and secure way. The data sources layer 502 also allows for the development of custom components for integrating new sources of data from databases, data sources, sensors, etc. The set of data sources (i.e., for storing or warehousing and publishing data) and services (i.e., for accessing or interfacing and functioning on the data) provide a wide range of data and system capabilities, reside locally or remotely (i.e., in the cloud) to the system deployment, and support industry pervasive data exchange language such as Simple Object Access Protocol ("SOAP"), Representational State Transfer ("REST"), and/or Extensible Markup Language ("XML") to facilitate data exchange. In one embodiment, the set of data sources and services include the data source(s) 104 and third party data source(s) and service(s) 110.

In one embodiment, the framework 500 employs animal related data. The animal related data can include animal health data, movement data, key location data, surveillance data, diagnostic testing data, geographic information system ("GIS") layer data, personnel data, resource data, other data, or a combination thereof. The animal related data can be collected automatically in near real-time or in real-time according to a predetermined schedule, on demand, randomly or when a change in the animal related data is detected within one or more of the third-party data source(s) or service(s) 110. Note that, additional animal related data can be received from the client device(s) 108.

As will be described in more detail below, the computerized method may include various ways of protecting confidential information obtained from the third-party data sources or disclosing such information only in an emergency. For example, one or more permissions can be assigned to the animal related data based on one or more data sharing agreements associated with the third-party data source. Thereafter, selected portions of the assessed animal related data are further transformed or restricted based on the one or more permissions assigned to the animal related data. The assessed animal related data can be transformed by aggregating the assessed animal related data to provide the selected portions of the assessed animal related data without disclosing any confidential information. In addition, access to the animal related data can be restricted based on a security level of a user, display or the client device. Access to the animal related data can be dynamically adjusted based on specific circumstances, teaming agreements, investigation, or on a situational basis such as an emergency level or basis. For instance, if emergency levels 1 to 5 represent emergency rankings from the lowest to the highest, then access may be dynamically adjusted based on the more severe rankings.

The middleware layer 504 bridges the data services layer 502 with the presentation layer 508. The middleware layer 504 handles requests from data requestors to data providers, performs data processing as needed (e.g., processing, transforming, integrating, fusing or other data manipulation), and routes the data as required, which allows contributions from one component to another (i.e., sharing of data or capabilities across different components). For example, the middleware layer 504 can include various automated tools to support the analysis of integrated data such as: (a) baseline modeling and anomaly detection algorithms; (b) data mining algorithms for discovering patterns; and (c) intelligent agents for observing, learning, and determining, and responding to prescribed conditions, triggers, thresholds or events have been met or have occurred. In addition, the middleware layer 504 supports data caching to improve overall system and application performance.

The middleware layer 504 also integrates with the security layer 506 for enforcement of data access permissions. The security layer 506 allows the establishment and management of different policies and credentials that provide brokered access to data by the end users and groups. The security layer 506 can include a collection of administrative tools that: (a) allow for management of groups and end user account information; (b) allow for the management of data sharing and compartmentalization polices, and for granting permissioned access to data and system capabilities; (c) support the dynamic definition and configuration of custom profiles (i.e., both visual layouts and assignment of components); and (d) support the configuration of components and their underlying properties.

The middleware layer 504 may run various algorithms (modules) such as animal production management models, animal emergency models, baseline modeling, anomaly detection algorithms, data mining algorithms for discovering patterns, intelligent agents for observing, learning, and determining, and responding to when prescribed conditions, triggers, thresholds or events have been met or have occurred. If one or more conditions are detected, one or more notifications can be automatically created and sent to the display or one or more client devices. The one or more conditions may include an anomaly, a trigger condition, a pattern, a trend or a trigger event. In one example, one or more conditions indicate a possible animal disease event or a possible contamination event. The one or more notifications may include a request for additional animal health data, a request for one or more resources, an instruction to perform one or more tasks, an alert describing the one or more conditions, or a combination thereof. One example of such a notification is an indication that a case definition has been met through the input of prescribed animal health data, triggering the user to submit samples to a veterinary diagnostic laboratory. The notification is received as a pop-up window in the computing device(s) 102 and/or client device(s) 108, and guides the user through the sample collection and submission process. Another example is an alert via pop-up window in 1 the computing device(s) 102 and/or client device(s) 108 if animal related data indicates a disease for a particular animal herd and instructions not to move that particular animal herd.

The presentation layer 508 provides tools for interactive visualization and analysis of the contributed data. For example, the presentation layer 508 can include custom querying, filtering, grouping and sorting on the integrated data through form-based views, data viewing in a tabular fashion or transformed into interactive visualizations and custom computation that can be performed on the integrated data (i.e., basic calculations). The presentation layer 508 also supports development of custom visualizations that can be contributed to other components (i.e., allowing component data to be displayed on a map or timeline). Moreover, the presentation layer 508 allows the development of custom perspectives, profiles, and component configurations to address specific end user needs or activities (see, e.g., Information Dashboard Framework ("IDF") described below).

Figure 6:
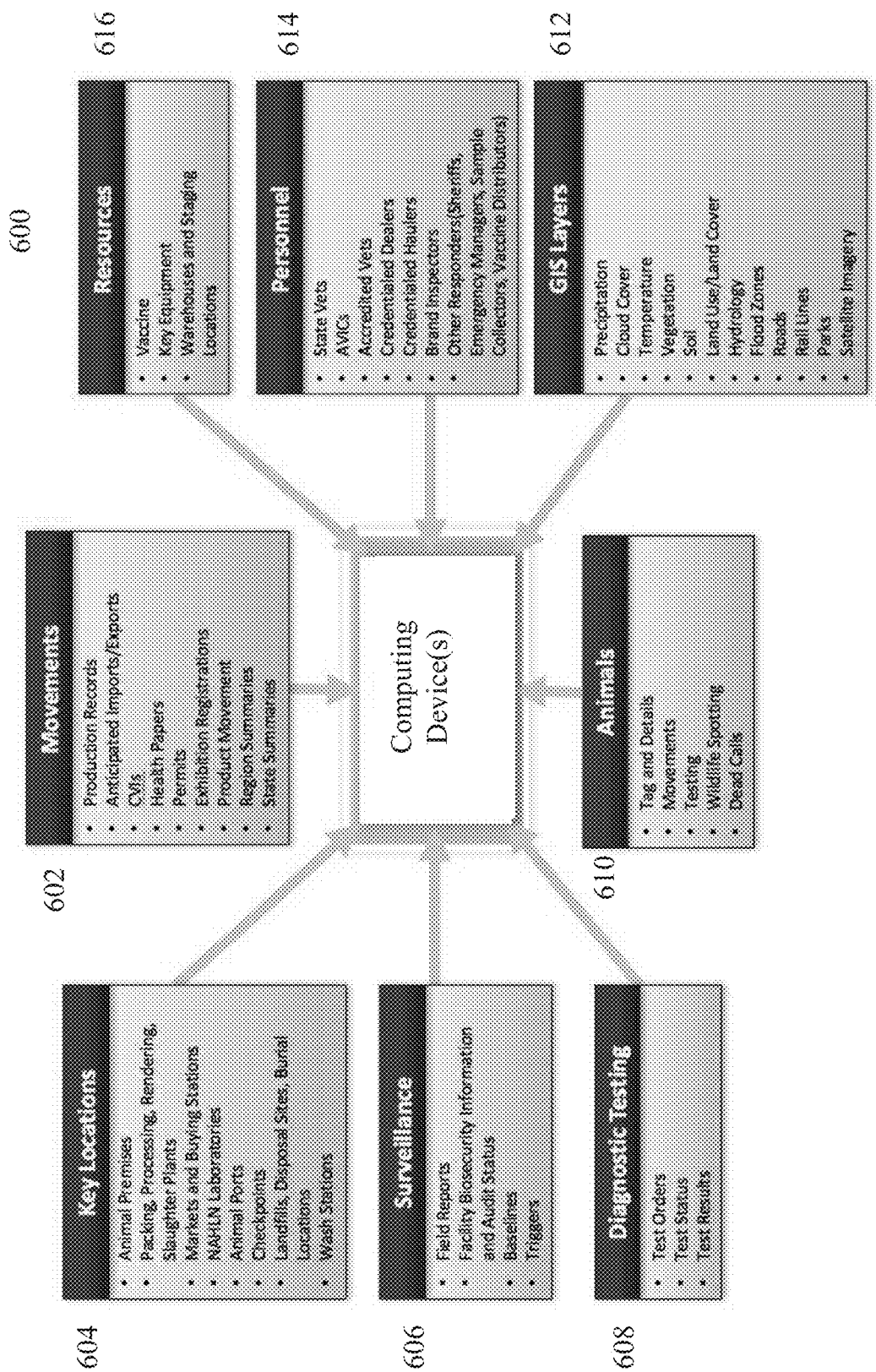
FIG. 6 illustrates a block diagram of an embodiment of animal related data from different sources.

Various non-limiting examples of the data sources layer 502 will now be described. The underlying data from the third-party databases contained in the data sources layer 502 includes animal related data (which may include animal health data and other information that is helpful in the assessment and presentation of the animal health data). Examples of various types of underlying data 600 (animal related data) are shown in FIG. 6. Note that the underlying data 600 can be obtained from a system owner or affiliated database(s). In one embodiment, the underlying data 600 can be classified into movement data 602, key location data 604, surveillance data 606, diagnostic testing data 608, animal data 610, GIS layer data 612, personnel data 614, resource data 616, etc. The movement data 602 can include production records, anticipated imports/exports, Certificates of Veterinary Inspections ("CVIs"), health papers, permits, exhibition registrations, product movement, region summaries, state summaries, etc. The key location data 604 can include animal premises, plants (packaging, processing, rendering, slaughter), market and buying stations, National Animal Health Laboratory Network ("NAHLN") laboratories and other veterinary diagnostic laboratories, animal ports, checkpoints, landfills, disposal sites, burial locations, wash stations, etc. The surveillance data 606 can include field reports, facility biosecurity information and audit status, etc. The diagnostic testing data 608 can include test orders, test status, test results, etc. The animal data 610 can include tag and details, movements, testing, wildlife spotting, dead calls, etc. The GIS layer data 612 can include precipitation, cloud cover, temperature, vegetation, soil, land use/land cover, hydrology, flood zones or plains, roads, rail lines, parks, satellite imagery, etc. The personnel data 614 can include state veterinarians, animal health officials, certain governmental directors related to agriculture, accredited veterinarians, credentialed dealers, credentialed haulers, brand inspectors, other responders (sheriffs, emergency managers, sample collectors, vaccine distributors), etc. The resource data 616 can include vaccines, key equipment, warehouses, and staging locations, etc.

The underlying data 600 in the data sources layer 502 can be integrated in such a way to satisfy one or more criteria. For example, the underlying data 600 may be digitally stored in an accessible means, ranges in type and scope (e.g., premises details, animal inventories, animal movements, diagnostic test orders and results, disease surveillance reports, animal production information), managed by a variety of different means (e.g., spreadsheets, databases, applications), stored in a variety of disparate formats and structures (e.g., JavaScript Object Notation ("JSON"), Extensible Markup Language ("XML"), text, relational), managed and owned by different entities or organizations, and not currently integrated (in near real-time at least) as part of normal operational settings. In another embodiment, a portion or all of the underlying data 600 may be converted and stored in a common agnostic format or an extensible format. In addition, the underlying data 600 often varies in data resolution and/or completeness, and in some cases can be noisy in nature. Moreover, the underlying data 600 often contains business sensitive or confidential data requiring strict control and compartmentalization when sharing across different entities or organizations, and/or needs to be processed and presented in a variety of ways for effective use by different stakeholders across all aspects of the animal health. Moreover, custom policies and permissions can be configured that control sharing of data with individuals and groups, and these policies can be dynamically modified or adjusted based on changing circumstances, such as emergency situations where animal health may be at risk.

Figure 7:
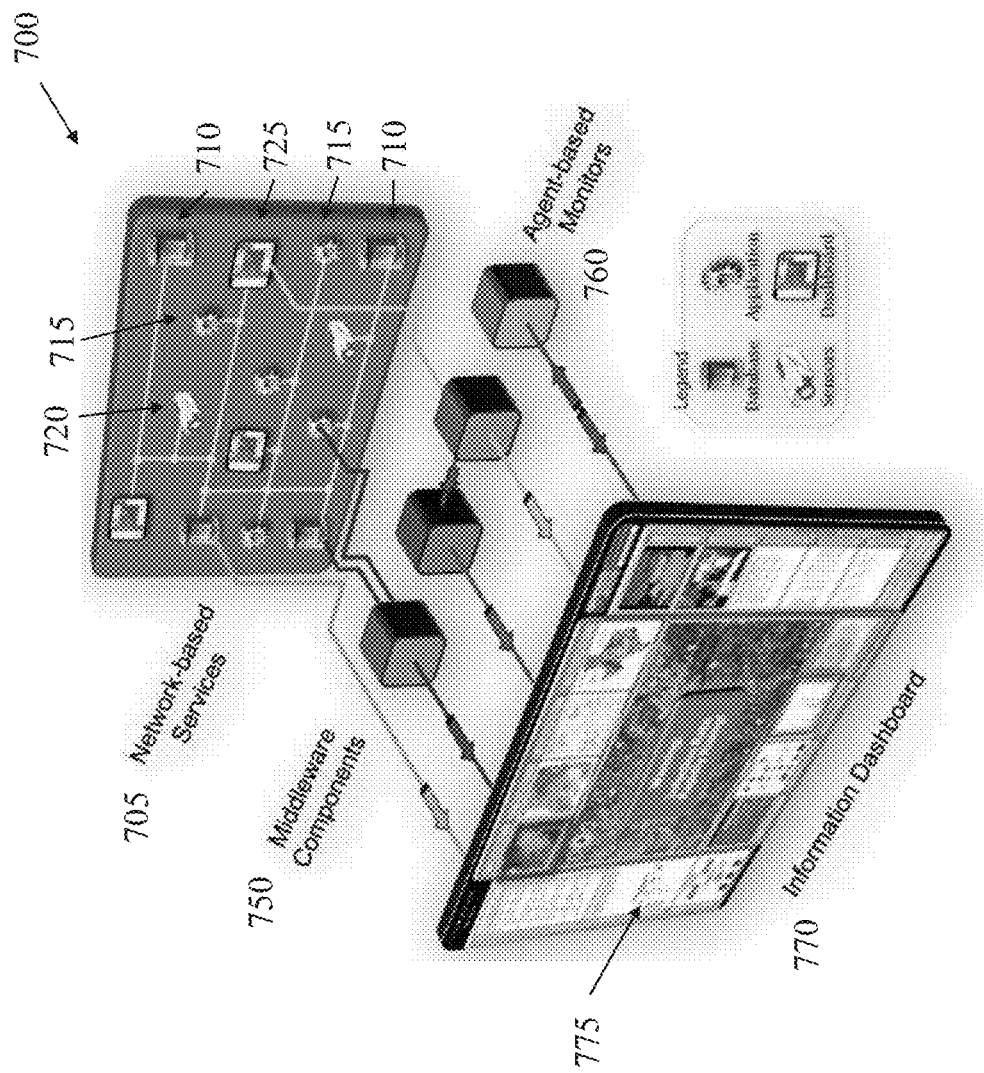
FIG. 7 illustrates a diagram of an embodiment of an architectural framework.

Turning now FIG. 7, illustrated is a diagram of an embodiment of an architectural framework 700. The architectural framework 700 includes various network-based services 705 that are accessed by various middleware components 750 to provide an information dashboard framework ("IDF") 770 that displays the accessed animal related data in various graphical and analytical representations. The network-based services 705 include various databases 710, applications 715 (e.g., models, simulations, etc.), sensors 720, and dashboards 725. The middleware components 750 include agent-based monitors 760 that interface with the network-based services 705 to provide the selected animal related data to the IDF 770, and provide cautions, alerts and warnings based on threshold conditions or values. In one embodiment, the IDF 770 is part of a computing device(s) 102 that causes the IDF 770 to be displayed on a display 116. In another embodiment, the IDF 770 can be implemented as a thin client and used on mobile devices. The configuration of the middleware components 750 and the IDF 770 will vary based on the set of user-defined criteria used to populate the information displayed on the IDF 770.

In one embodiment, the IDF 770 is part of the user interface application 306 and is a development environment for quickly generating information dashboards that receive data from multiple disparate sources. The IDF 770 supports command and control activities (and decision support) during emergency operations by providing a common integrated display that would serve as a common operational picture ("COP") to enable better situational awareness for decision makers. This notion has been extended to the creation of user-defined operating pictures ("UDOP") that allow for coordinated activity by allowing dashboards to be used by decision makers at different locations with different areas of responsibility. The system facilitates users making better decisions, faster. Thus, using a service-oriented architecture provides enhanced response capabilities by organizing relevant data from authoritative sources to facilitate rapid information sharing between industry and government at the national level for animal management including during an animal disease event.

In one embodiment, the domain that IDF 770 particularly excels in is related to command and control and the notion of establishing a common operating picture that facilitates situation awareness and aids in the decision making process at multiple levels or echelons. In this domain, common operating pictures are often GIS-centric with icons existing on maps that are linked to specific data components. Such an approach is not usually sufficient in fully gaining situational awareness. The IDF 770 overcomes this approach by providing a rich set of components that extends annotated maps with a number of functional components that can manipulate data (collection, filtering, and fusion), create visual analytical representations, link to external video and rich site summary ("RSS") feeds, enforce data access rules, and a number of other functions that contribute to a common operating picture and can be tailored for a specific user. In fact, the notion of a common operation picture is extended to the concept of a user-defined operating picture.

The present system provides the additional benefit of a standard interface where all decision makers are looking at the same underlying picture (i.e., all seeing the exact same thing, albeit in varying levels of granularity of detail). Thus, a user in one organization can define a first customized display, while a user in a different organization can develop a second customized display that may present different data or metrics pertaining to the needs of his or her organization. The overall focus of the present invention allows several different users, each with different priorities, to customize the application and make efficient decisions based on individual requirements, all while using a single unified data system.

Moreover, the present invention can be customized as appropriate to fit the particular needs of the decision maker. For example, the information and tools necessary for monitoring and analyzing the ongoing status of porcine reproductive and respiratory syndrome (PRRS) within a region may be quite different from those needed to plan and prepare for a large-scale foot-and-mouth disease outbreak. Likewise, the tools required to monitor an incident at a local level may be quite different from those at a national level. Accordingly, certain particularized data may be selected by the system for display to a particular user, based either on a classification of the user, or based on user-preferences for filtering and displaying of data. Finally, the tool can support not only operations, but also training and analysis-based activities as well. Through supporting these different aspects, the system can provide flexibility, scalability, and re-configurability to support a wide variety of operations that may be necessary.

The IDF 770 provides multiple capabilities and features, some of which include: (a) the ability to transform from one unique perspective to another very quickly, which relate to a specific task or mission that a user is performing and the collection of components chosen to support that task or mission; (b) the fusion of data from multiple data streams from different sources to create new perspectives oriented on a greater understanding of the problem space; (c) the inclusion of an agent layer capable of evaluating the incoming data based on a set of conditional rules; (d) the enforcement of privileged data access by controlling access to the set of components available to a particular user; (e) the ability for enabled dashboards to exchange data among themselves; (f) the redirection of a data stream from one service to another for additional processing; and (g) a powerful environment for dashboard administration and customizable layout. The particular technical approach for the IDF is centered on the implementation of a service-oriented architecture with access to a vast array of services existing within the "cloud." The IDF 770 connects to candidate services such as data, applications (e.g., simulations), sensors, and other IDF-based dashboards. Data is represented directly in a prescribed manner, combined (fusion) with two or more data streams for unique representations, or acquired from one service and routed to another source for additional processing.

As illustrated, the IDF 770 is composed of one or more frames (one of which is designated 775) providing input to and output from functional modules (i.e., each box or container object within the gridded display corresponds to an individual frame running a module). A module represents both function and access to a particular data source or service. In one embodiment, the modules represent a library of different capabilities that can include geospatial mapping, resource management, logs, communication, models and simulation, visual analytics, and integration of live sensor data. Different perspectives can then be configured within the dashboard to support different operational tasks or missions by organizing a unique set of frames running selected modules. Profiles represent user categories or positions within an organization and are usually represented by multiple pre-defined perspectives.

IDF-based dashboards are user-definable, and a user can easily customize the active modules from the available library. A user can swap these frames in and out of their display, and resize them, to customize the display to best meet their needs. This overall flexibility is what leads to a user-definable operating picture. In another embodiment, the IDF 770 allows the use of dashboard templates to allow configuration, control and/or customization of the frames of the IDF 770. Finally, agent-based monitoring modules 760 can be setup and configured to monitor the component data feeds (running in the background) and when an event of interest is identified, an alert or warning can be provided to the end-user. The IDF-based dashboards can support the entire emergency lifecycle (from planning and preparedness, to response and recovery), and may be used at all levels (including local, state, and national) by pulling specific information from relevant data sources and displaying particularized data for a wide range of user types based on user-definable dashboards. For example, each type of user may have a user-defined profile that enables customized views of the current animal situation on all levels.

Non-limiting examples of various embodiments of the system include the Emergency Response Support System ("ERSS"), Enhanced Passive Surveillance System ("EPSS"), and Laboratory Capacity Estimation Model ("LCEM"), which will be described in more detail below in reference to exemplary IDFs. Another embodiment includes the Bio-surveillance Common Operating Picture ("BCOP"). The BCOP is a biological application of the IDF that allows analysts to track, organize, and share biological event information in real-time.

Figure 8:
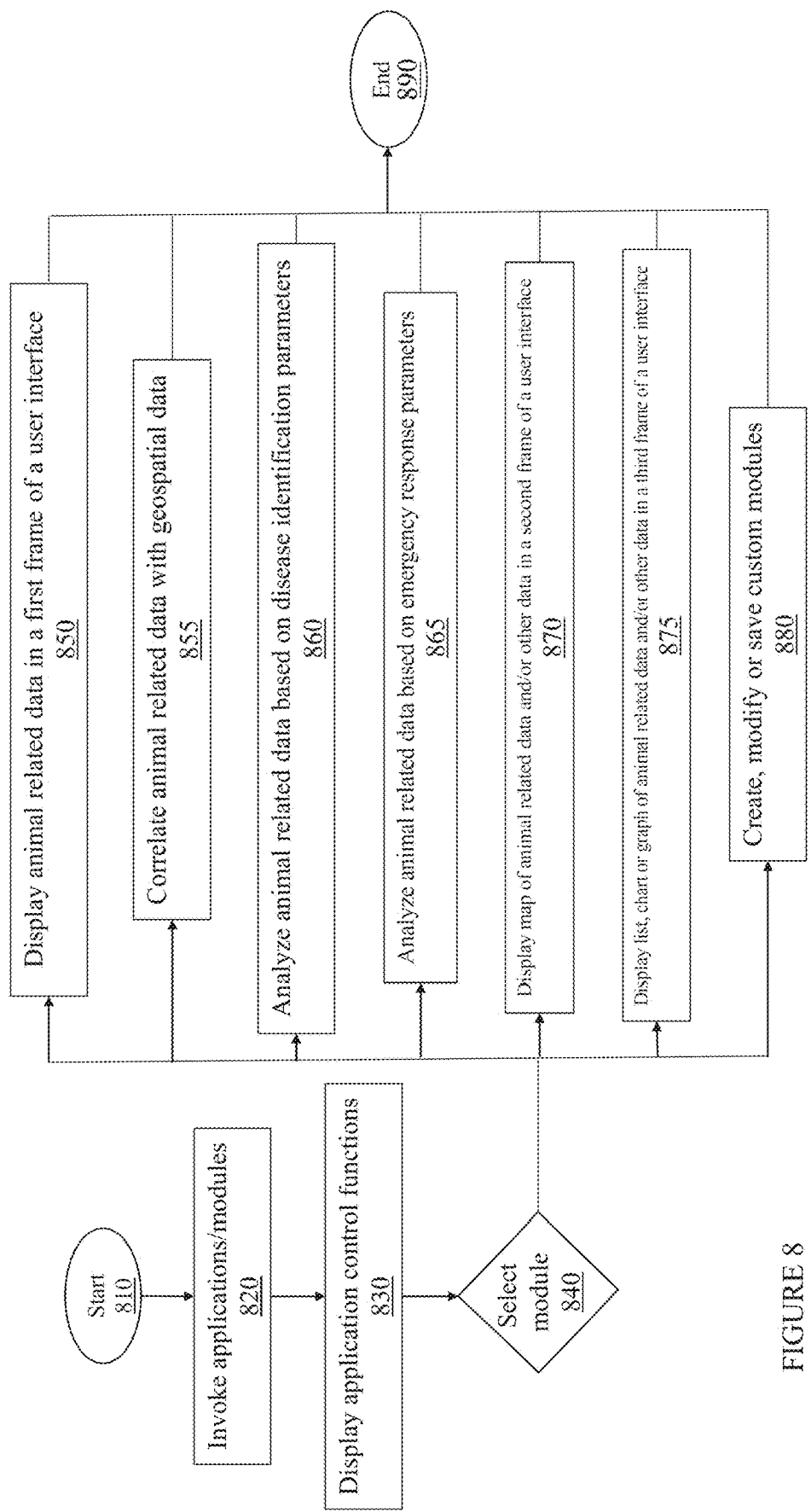
FIG. 8 illustrates a flow chart of an embodiment of a method of analyzing and displaying one or more sets of animal related data.

Turning now FIG. 8, illustrated is a flow chart of an embodiment of a method of analyzing and displaying one or more sets of animal related data. With continuing reference to preceding FIGURES, the method begins at a start step 810. At a step 820, the method invokes selected applications and modules of FIG. 3. For instance, the method invokes: (a) the data selection module 308 within the data management application 302; (b) the animal tracking module 312, the animal disease detection module 314 and the animal event response module 316 within the data analysis application 304; and (c) the application control module 328, the geospatial mapping module 330, the data display module 332 and the macro or scripting module 334 within the user interface application 306.

The data management application 302 can be used to automatically collect the animal related data from the data source(s) 104 and/or third party data source(s) and service(s) 110, or integrate additional animal related data from one or more sensors into the one or more sets of animal related data. The data management application 302 or data analysis application 304 can automatically create and send one or more notifications to client device(s) 108 communicably coupled to the computing device(s) 102. The data management application 302 can also receive additional animal related data from client device(s) 108 communicably coupled to the computing device(s) 102, assign one or more permissions to the animal related data based on one or more data sharing agreements associated with the data source(s) 104 and/or third party data source(s) and service(s) 110 or based on a type, category, or class of the user attempting to access the data, transform or restrict the selected portions of the assessed animal related data based on the one or more permissions assigned to the animal related data or the permissions assigned to the type of user, convert and/or translate portions of the animal related data from a proprietary format into an agnostic format, including translation of address information into coordinate information, aggregate the assessed animal related data to provide the selected portions of the assessed animal related data without disclosing any confidential information, limit access to the animal related data based on a security level of a user, display on a client device, or dynamically adjust access to the animal related data based on specific circumstances such as an emergency level or basis.

The data analysis application 304 provides users with a set of manual and automated tools for analyzing data from the data source(s) 104 and/or third party data source(s) and service(s) 110 via the data management application 302. The user interface application 306 provides a user friendly and user customizable interface to access, view, analyze, manipulate and otherwise use data from the data source(s) 104 and/or third party data source(s) and service(s) 110 via the data management application 302 and data analysis application 304.

A set of application control functions from the application control module 328 is displayed, by the computing device(s) 102, in a user interface of a display in a step 830. The application control module 328 provides a set of application control functions that allow a user to add, remove, change and manipulate frames displayed on the computing device(s) 102, and to execute, control and terminate the modules and applications. The set of application control functions enable customization and control of the user interface, and execution of the data selection module 308, the animal tracking module 312, the animal disease detection module 314, the animal event response module 316, the geospatial mapping module 330, the data display module 332, and the macro or scripting module 334. The user interface application 306 can also provide a data query tool, a map annotation tool, a calculator, one or more analytical tools, the macro or scripting module 334 to create user-defined modules, etc.

In a decisional step 840, a user input is received, by the computing device(s) 102, in the user interface of the display that indicates activation or selection of at least one of the modules. If the user input indicates activation of the data selection module 308, the method obtains the one or more sets of animal related data and causes the one or more computing device(s) 102 to display the one or more sets of animal related data in a first frame of the user interface in step 850. The animal related data can include animal health data, movement data, key location data, surveillance data, diagnostic testing data, GIS layer data, personnel data, resource data, other data, or a combination thereof. The third-party data source(s) and service(s) 110 can include governmental databases, laboratory databases, animal processing databases, animal producer databases, veterinarian databases, commercial databases, data feeds, sensor data, other sources, or a combination thereof.

The default selection of specific pieces of animal health data may be determined according to the user category or type. For example, a local producer or animal owner may need only limited amounts of animal health data on a daily basis to make appropriate business decisions, whereas a federal official may require alternative or additional pieces of animal health data to quickly and accurately make health related decisions that involve animals on a state or federal level. As such, data selection module 308 may select specific pieces of animal health data for display on computing device(s) 102 that correspond to the exact needs of the user. Such data allocation based on the type of user can be specified, for example, via a user interface, or may be specified in a configuration file read by the system. As the system is designed to be used by a wide variety of types of users, this specific allocation of particularized data based on a user type enables immediate and accurate decision making on all levels, as each user is only presented with information that is important to the needs of that user.

If the user input indicates activation of the animal tracking module 312, one or more sets of animal related data are correlated with geospatial data in a step 855. The animal tracking module 312 can be used, among other things, to track movement of one or more animals over time, or track one or more permits associated with one or more animals over time and determine a status of the one or more permits. Such tracking can be performed using, for example, coordinate geographical information that may be coded or updated when the status of the animal is checked, or may be automatically updated on a periodic basis by a GPS device attached to the animal.

Moreover, depending on the type of user and the permissions assigned to the user, additional tracking information may be retained and displayed by the system. For example, a physical address associated with the animal may be retained and linked to the coordinate geographical information, such that a user can determine that the subject animal belongs to a particular company or individual associated with the same address. The physical address may be displayed only if the user is authorized to view such data based on a policy or permission.

Figure 9:
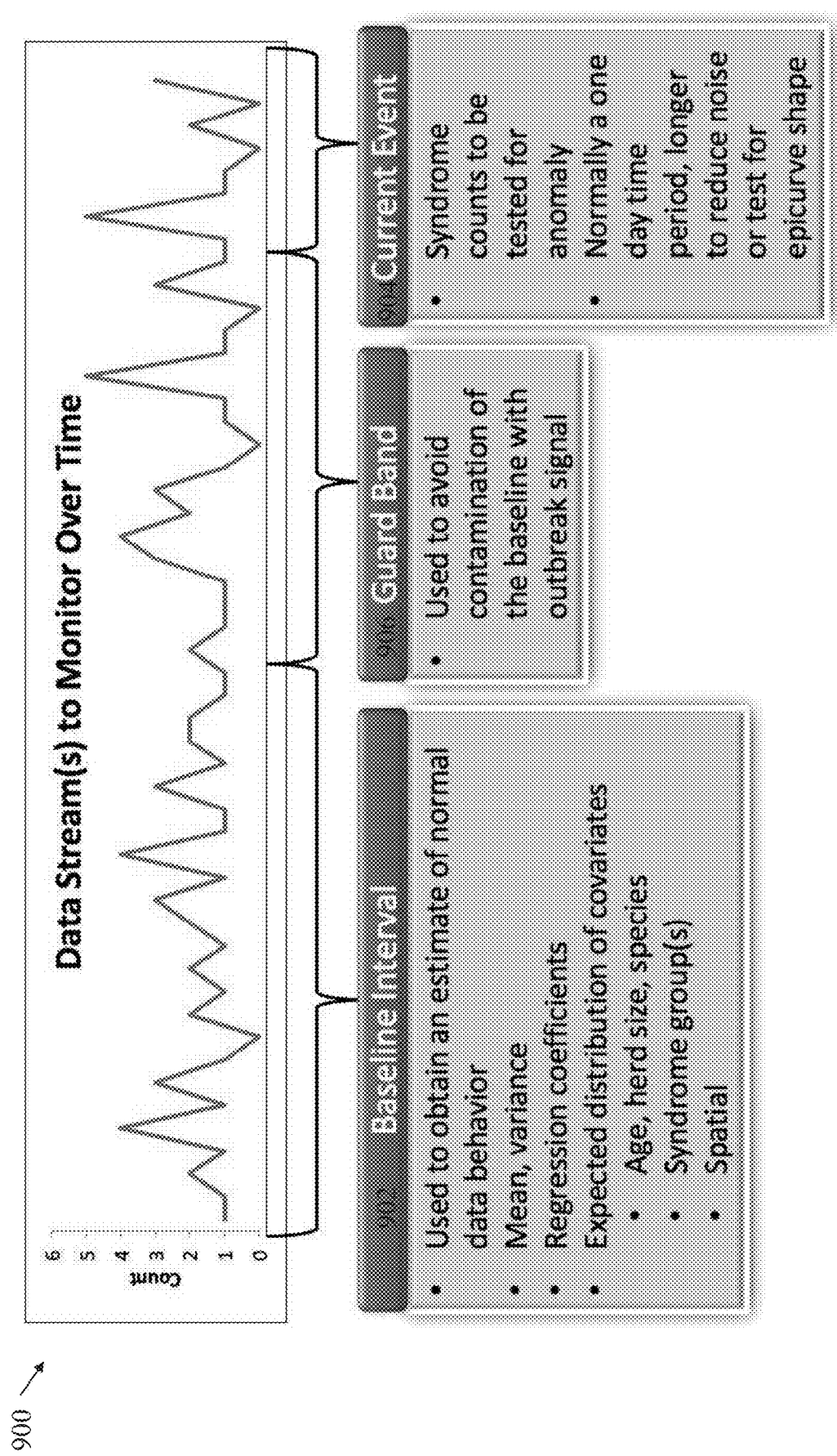
FIG. 9 illustrates a graphical representation of an embodiment of a monitoring data stream(s) over time.

If the user input indicates activation of the animal disease detection module 314, one or more sets of animal related data are analyzed based on one or more disease identification parameters in a step 860. As shown in FIG. 9, data from data stream(s) is monitored over time as shown in a graphical representation 900. In one embodiment, the data is separated into three segments that slide forward in time. These segments include: (1) a baseline interval 902 to estimate expected data behavior; (2) the current event 904, typically 1-7 days, of potentially anomalous data; and (3) a guard band 906 between the baseline interval 902 and the current event 904 to avoid contamination of the baseline interval 902 by an outbreak signal. Whether the quantities of interest are simple means and standard deviations, regression coefficients, spatial distributions, or distributions of covariate strata (e.g., age groups), these temporal subdivisions are used to determine whether the current event 904 violates the null hypothesis of expected behavior inferred from the baseline interval 902. This analysis can be used to determine if a disease outbreak is more prevalent within or among different data groups. The baseline interval 902 is analyzed by examining different categorizations of data relationships. The significance of resulting signals as disease detection events: (a) requires examination of specific health information that is resulting in an algorithm-derived alert; (b) initiates communication between veterinarians and/or State/Federal Animal Health Officials; (c) identifies potential outbreak and geographic extent, changes in animal health status, or absence of a disease event; (d) quantifies how much we are looking for disease to report to trading partners; and (e) concepts of operation for disease response (SAHOs, Federal Government, and/or Veterinarians/Producers). Additional analysis may include cluster techniques and space-time statistics. The disease identification parameters can be adjusted to detect a specific disease, or detect a new strain of the specific disease, or to compensate for seasonality. One or more trigger conditions can be set to provide an alert or notification of the specific disease when such a disease is detected. The animal disease detection module 314 can provide an alert or warning not to move one or more animals to or from a specific geographic area. In another embodiment, the animal disease detection module 314 can also be used to analyze the data in order to detect one or more anomalies within the one or more sets of animal related data, predict spread of a disease based on a statistical analysis, detect one or more symptoms, or disease related patterns or trends, or identify a potential threat to human public health. The animal disease detection module 314 may also include one or more phylogenetic analysis tools.

If the user input indicates activation of the animal event response module 316, one or more sets of animal related data are analyzed based on one or more animal related emergency response parameters in a step 865. In a related embodiment, the one or more animal related emergency response parameters may dynamically change as the situation dynamically changes. The animal event response module 316 can be used to analyze the data and determine a quarantine zone or a buffer zone, determine an allocation of resources, plan a response to an actual or simulated animal disease outbreak, implement a response to an actual animal disease outbreak. The allocation of resources can be based on an animal vaccination scenario, an animal sampling scenario, an animal slaughter scenario or a combination thereof.

If the user input indicates activation of the geospatial mapping module 330, the method causes a map with one or more graphical objects representing the one or more sets of animal related data, correlated data from the animal tracking module 312, analyzed data from the animal disease detection module 314 or analyzed data from the animal event response module 316 to be displayed, by the one or more computing device(s) 102 in a second frame of the user interface in a step 870. The geospatial mapping module 330 displays a frame in the user interface that include a map with one or more graphical objects representing various data (e.g., type of animal, stage of production, disease status, etc.). The geospatial mapping module 330 also provides various controls that allow a user to annotate, change and manipulate content displayed within the frame (e.g., map data overlaid with data from the other sources).

If the user input indicates activation of the data display module 332, the method causes a listing, a chart or a graph of the one or more sets of animal related data, correlated data from the animal tracking module 312, analyzed data from the animal disease detection module 314 or analyzed data from the animal event response module 316 to be displayed, by the one or more computing device(s) 102 in a third frame of the user interface in a step 875. The data display module 332 displays a frame in the user interface that provides a listing, a chart or a graph of data.

If the user input indicates activation of the macro or scripting module 334, the method allows the user to create, modify and save customized modules, which provide custom functions, analysis or displays in a step 880. Thereafter, the method ends in a step 890. The method may also start again or return to one of the earlier steps depending on the application. The method is not limited to the foregoing steps or the specific order of steps described.

As an example, the Emergency Response Support System ("ERSS") is an integrated, fully distributed, multi-purpose system capable of supporting emergency response by featuring operational, training, and analytical functionality for animal disease outbreaks. The ERSS provides a web-based tool for large and small-scale incident management. The ERSS uses a service-oriented architecture to provide enhanced response capabilities by organizing relevant data from authoritative sources to facilitate rapid information sharing between industry and government at the national level during an animal disease event. The ERSS can be used as an operational tool during a response, as an analysis tool after an event is complete, and as a training tool to prepare for possible future incidents. The ERSS can be used as a pivotal tool for the day-to-day operations and incident response. The ERSS incorporates information from various governmental entities to allow calculation of the number of vaccine doses, personnel needs, and sampling required when one or more outbreak zones are "drawn" or selected on a user interface (i.e., scale and geographic distribution of an outbreak). Topics include resources related to vaccination, active surveillance, and depopulation. Accurate and timely information enables decision makers to mitigate the risk when managing animal movement in support of business continuity operations. Support for rapidly performing traceability of animal movement is also critical.

Figure 10:
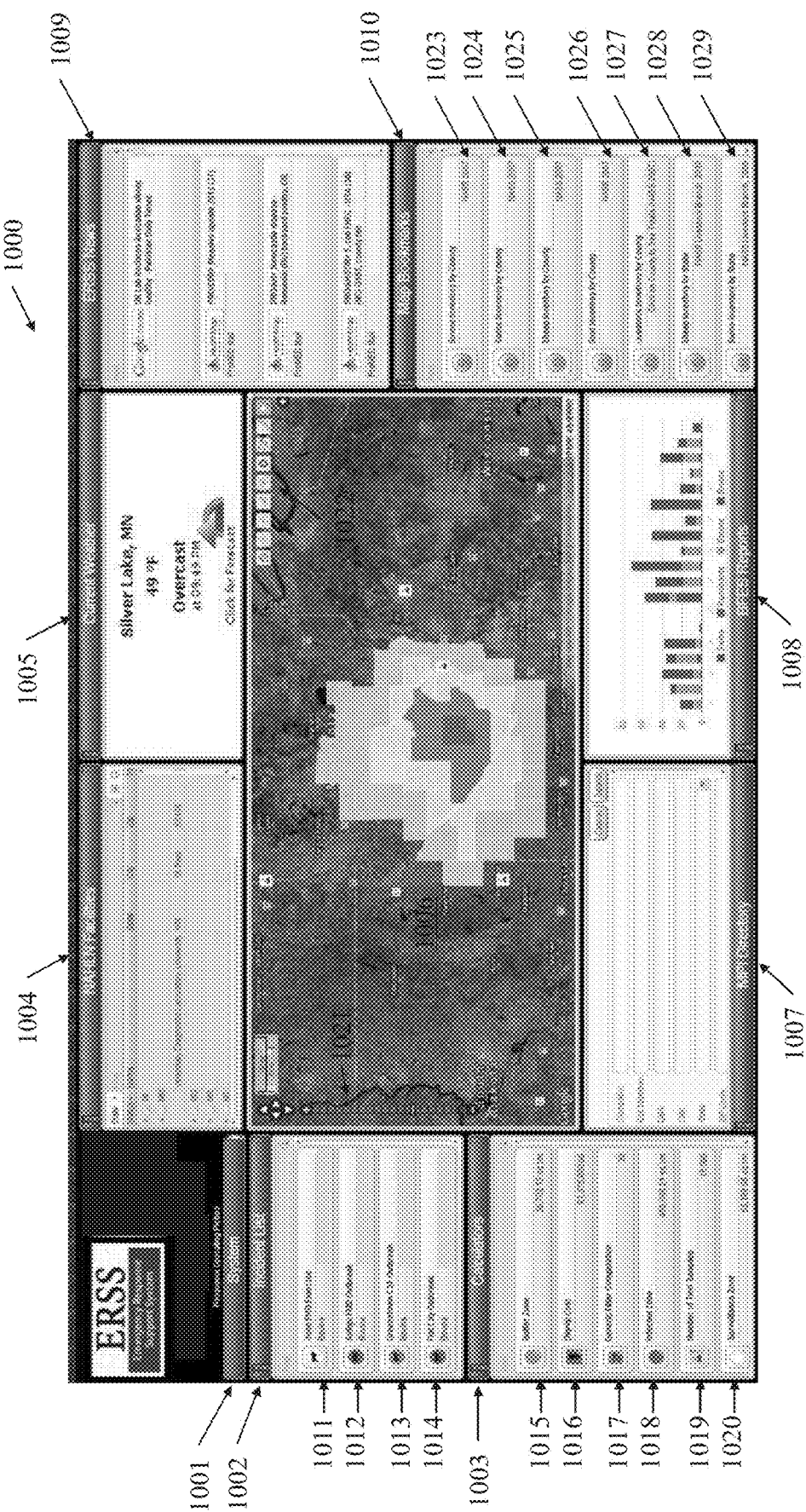
FIG. 10 illustrates a screen shot of an embodiment of an emergency response dashboard.

Turning now to FIG. 10, illustrated is a screen shot of an embodiment of an emergency response dashboard 1000. The emergency response dashboard 1000 is divided into ten frames, namely, a system frame 1001 (minimized), an incident list frame 1002, calculators frame 1003, a NAHLN facilities frame 1004, a current weather frame 1005, an interactive 2 mapping frame 1006, a Meat, Poultry & Egg Product Inspection ("MPI") directory frame 1007, a Bio-Surveillance Field Entry System ("BFES") reports frame 1008, an ERSS news frame 1009, and a map bookmarks frame 1010. As shown, the incident list frame 1002 includes bovine data sets for June foot and mouth disease ("FMD") Exercise 1011, Antigo FMD Outbreak 1012, Greenstown classical swine fever ("CSF") Outbreak 1013 and Flat City Outbreak 1014. The calculators frame 1003 includes a buffer zone calculator 1015, a depopulation cost calculator 1016, a generic filter computation calculator 1017, an infected zone calculator 1018, a number of test samples calculator 1019 and a surveillance zone calculator 1020. The NAHLN facilities frame 1004 displays data regarding NAHLN facilities. The current weather frame 1005 provides current weather conditions with a link to a weather forecast. The interactive mapping frame 1006 graphically displays selected data on a map and includes a set of map navigational tools 1021 and a set of analytical tools 1022. The interactive mapping frame 1006 overlays and color codes various infected, buffer and surveillance zones, as well as test sample locations and geographic information on the map. The MPI directory frame 1007 allows the user to search and display data from the Meat, Poultry & Egg Product Inspection ("MPI") Directory. The BFES reports frame 1008 displays a bar chart of BFES report data for swine, ruminants, equine and bovine. The ERSS news frame 1008 displays various current new feeds. The map bookmarks frame 1010 allows the user to click on the tabs to display bovine inventory by county 1023, swine inventory by county 1024, sheep inventory by county 1025, goat inventory by county 1026, livestock inventory by state 1027, sheep inventory by state 1028, and swine inventory by state 1029.

Figure 11:
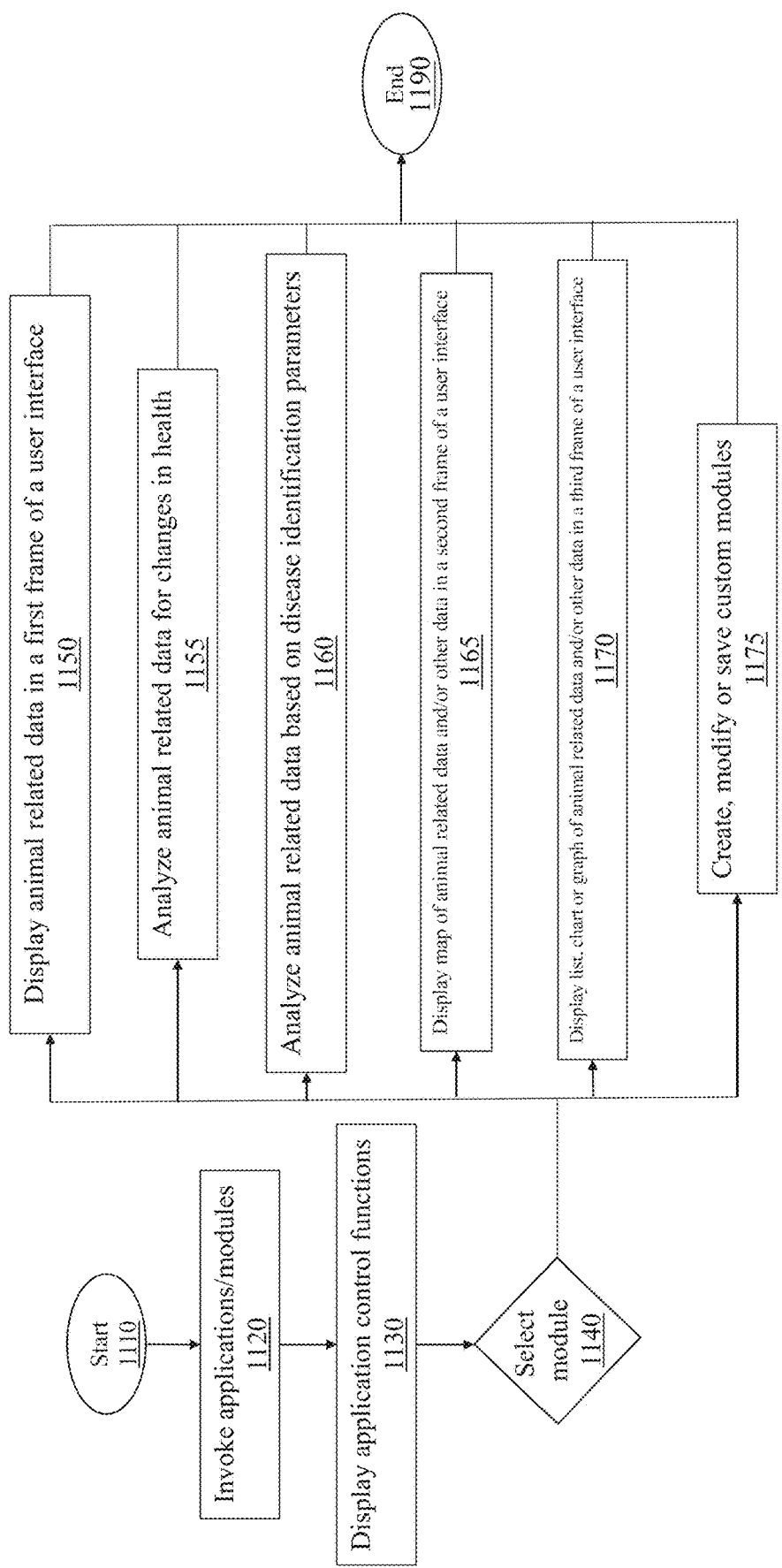
FIG. 11 illustrates a flow chart of an embodiment of a method of monitoring the health of one or more animal herds.

Turning now to FIG. 11, illustrated is a flow chart of an embodiment of a method of monitoring the health of one or more animal herds. With continuing reference to preceding FIGURES, the method begins at a start step 1110. At a step 1120, the method invokes selected applications and modules of FIG. 3. For instance, the method invokes: (a) the data selection module 308 within the data management application 302; (b) the animal disease detection module 314 and the animal health monitoring module 318 within the data analysis application 304; and (c) the application control module 328, the geospatial mapping module 330, the data display module 332 and the macro or scripting module 334 within the user interface application 306.

The data management application 302 can be used to automatically collect the animal related data from the data source(s) 104 and/or or third party data source(s) and service(s) 110, or integrate additional animal related data from one or more sensors into the one or more sets of animal related data. The types of animal related data collected from the data sources may be a limited subset of the full data available, where the subset is predefined based on the type of user, or may be based on a user-defined configuration. The data management application 302 or data analysis application 304 can automatically create and send one or more notifications to client device(s) 108 communicably coupled to the computing device(s) 102. The data management application 302 can also receive additional animal related data from client device(s) 108 communicably coupled to the computing device(s) 102, assign one or more permissions to the animal related data based on one or more data sharing agreements associated with the data source(s) 104 and/or third party data source(s) and service(s) 110, transform or restrict the selected portions of the assessed animal related data based on the one or more permissions assigned to the animal related data, aggregate the assessed animal related data to provide the selected portions of the assessed animal related data without disclosing any confidential information, limit (or dynamically restrict) access to the animal related data based on a security level of a user, the display or a client device, or dynamically adjust access to the animal related data based on specific circumstances such as an emergency level or basis.

The data analysis application 304 provides users with a set of manual and automated tools for analyzing data from the data source(s) 104 and/or third party data source(s) and service(s) 110 via the data management application 302. It is to be appreciated that certain tools may be only available to certain users or in certain distinct situations, such as emergencies, in order to ensure adequate privacy protections. The user interface application 306 provides a user friendly and user customizable interface to access, view, analyze, manipulate and otherwise use data from the data source(s) 104 and/or third party data source(s) and service(s) 110 via the data management application 302 and the data analysis application 304.

A set of application control functions from the application control module 328 is displayed, by the computing device(s) 102, in a user interface of a display in a step 1130. The application control module 328 provides a set of application control functions that allow a user to add, remove, change and manipulate frames displayed on the computing device(s) 102, and to execute, control and terminate the modules and applications. The set of application control functions enable customization and control of the user interface, and execution of the data selection module 308, the animal disease detection module 314, the animal health monitoring module 318, the geospatial mapping module 330, the data display module 332, and the macro or scripting module 334. The user interface application 306 can also provide a data query tool, a map annotation tool, a calculator, one or more analytical tools, the macro or scripting module 334 to create user-defined modules, etc.

In a decisional step 1140, a user input is received, by the computing device(s) 102, in the user interface of the display that indicates activation of at least one of the modules. If the user input indicates activation of the data selection module 308, the method may confirm that such a type of user is authorized to access the requested data, and upon confirmation obtains the one or more sets of animal related data and causes the one or more computing device(s) 102 to display the one or more sets of animal related data in a first frame of the user interface in a step 1150. The animal related data can include animal health data, movement data, key location data, surveillance data, diagnostic testing data, GIS layer data, personnel data, resource data, other data, or a combination thereof. The third-party data source(s) and service(s) 110 can include governmental databases, laboratory databases, animal processing databases, animal producer databases, veterinarian databases, commercial databases, data feeds, sensor data, other sources, or a combination thereof.

If the user input indicates activation of the animal health monitoring module 318, one or more sets of animal related data are analyzed for any changes in the health of the one or more animal herds in a step 1155. The animal health monitoring module 318 can provide the same functionality as the animal tracking module 312 including, among other things, to track movement of one or more animals over time, or track one or more permits associated with one or more animals over time and determine a status of the one or more permits. In addition, animal health monitoring module 318 can request an additional testing of one or more animals, or an animal health data associated with one or more animals, etc. In another embodiment, the animal health monitoring module 318 can provide a notification such as an alert or warning not to move one or more animals to a specific geographic area.

If the user input indicates activation of the animal disease detection module 314, one or more sets of animal related data are analyzed based on one or more disease identification parameters in a step 1160. For a better understanding of monitoring data over time, see the description of FIG. 9 set forth above.

If the user input indicates activation of the geospatial mapping module 330, the method causes a map with one or more graphical objects representing the one or more sets of animal related data, analyzed data from the animal health monitoring module 318, or analyzed data from the animal disease detection module 314 to be displayed, by the one or more computing devices in a second frame of the user interface in a step or module 1165. The geospatial mapping module 330 displays a frame in the user interface that include a map with one or more graphical objects representing various data (e.g., type of animal, stage of production, disease status, etc.). The geospatial mapping module 330 also provides various controls that allow a user to annotate, change and manipulate content displayed within the frame (e.g., map data overlaid with data from the other source(s)).

If the user input indicates activation of the data display module 332, the method causes a listing, a chart or a graph of the one or more sets of animal related data, analyzed data from the animal health monitoring module 318, or analyzed data from the animal disease detection module 314 to be displayed, by the one or more computing device(s) 102 in a third frame of the user interface in a step 1170. The data display module 332 displays a frame in the user interface that provides a listing, a chart or a graph of data.

If the user input indicates activation of the macro or scripting module 334, the method allows the user to create, modify and save customized modules, which provide custom functions, analysis or displays in a step 1175. Thereafter, the method ends in a step 1190. The method may also start again or return to one of the earlier steps depending on the application. The method is not limited to the foregoing steps or the specific order of steps described.

In an embodiment, the EPSS provides an integrated application for collecting and analyzing enhanced surveillance data, and includes a mobile device application (the Biosurveillance Field Entry System ("BFES")) to allow veterinarians to enter clinical animal health data from livestock premises, feedlots, and markets. The mobile application links to the Analyst Workstation ("AWS") dashboard and allows epidemiologists to aggregate collected data through the use of visual, geospatial, and temporal analysis tools to aid in early disease detection or changes in animal health status. The EPSS has broad applications in the international community, especially for monitoring and understanding movement of and relationships between transboundary, emerging, and zoonotic diseases. The data on syndromic prevalence and risk factors associated with neglected diseases such as brucellosis are lacking in many under-developed and developing countries/regions of the world.

Figure 12:
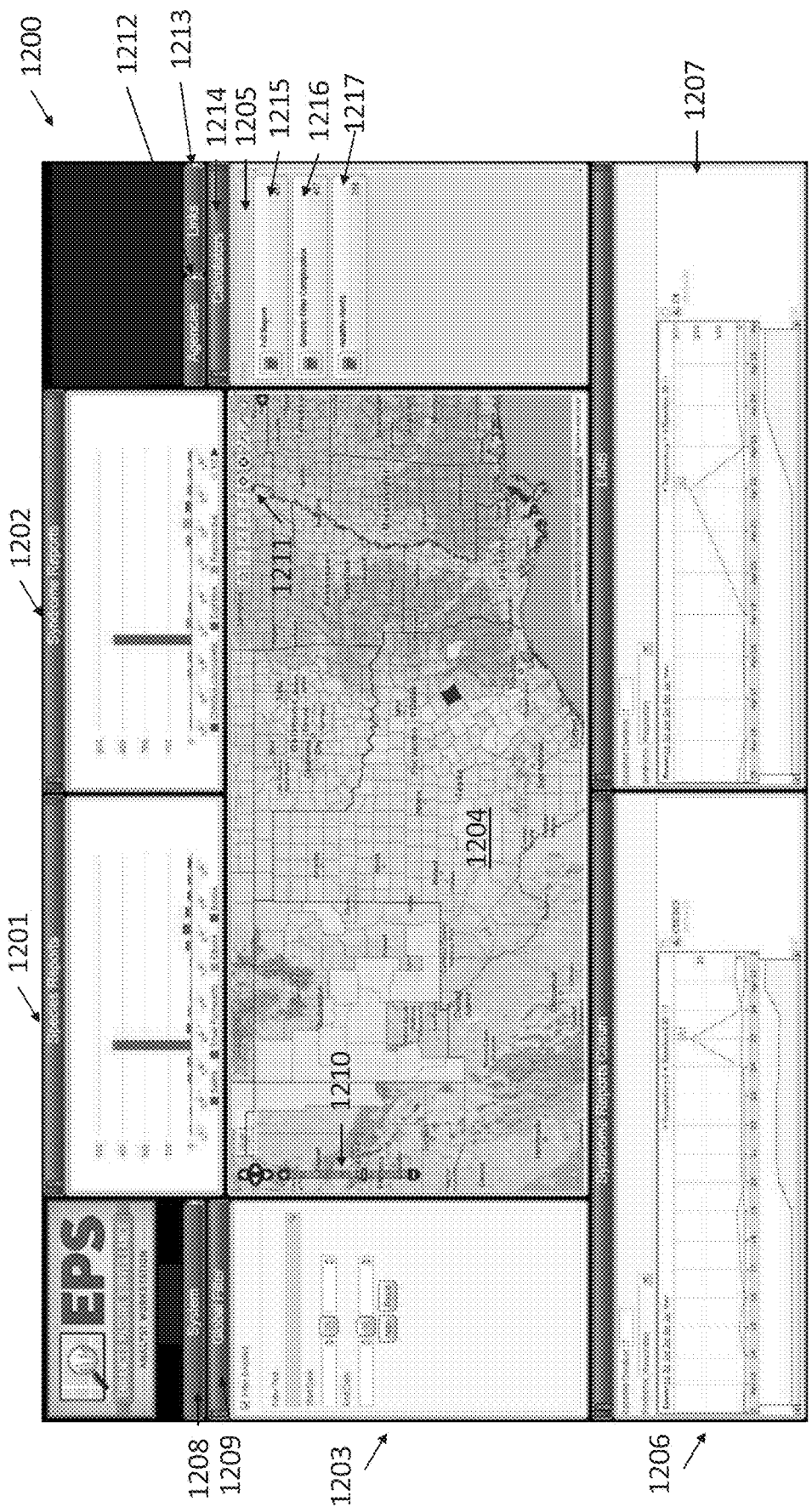
FIG. 12 illustrates a screen shot of an embodiment of a biosurveillance dashboard.

The EPSS supports the development of technology to enable the real-time (or near real-time) collection and analysis of pre-diagnostic data related to clinical symptoms or syndromes observed by an attending veterinarian at an AWS as shown in FIG. 12. An example of the AWS is shown in FIG. 12 in which a biosurveillance dashboard 1200 is divided into seven frames, namely, a species reports frame 1201 (bar graph), a syndrome reports frame 1202 (bar graph), a system and filter frame 1203, an interactive mapping frame 1204, a data selection frame 1205, a syndrome reports custom frame 1206 (line graph) and a Laboratory Information Management System ("LIMS") frame 1207 (line graph). The system and filter frame 1203 includes a system tab 1208 and a global filter tab 1209. The interactive mapping frame 1204 graphically displays selected data on a map and includes a set of map navigational tools 1210 and a set of analytical tools 1211. The data selection frame 1205 includes an agencies tab 1212, a links tab 1213 and a calculators tab 1214. As shown, the calculators tab 1214 provides access to various filtered data sets, such as all data 1215, generic filter reports 1216 and healthy reports 1217.

EPSS uses mobile devices and web-enabled browsers to collect and send the data to an AWS where data is aggregated and combined with embedded tools to help determine baseline conditions in order to detect any anomalies that may signal the onset of an animal disease outbreak. Anomaly detection is the analysis and evaluation of surveillance data to identify unusual increases in animal health outcomes. Algorithms for anomaly detection can be used to quickly identify anomalies based on time series analyses of syndromic data (e.g., count data, number of cases with a given syndrome, or percent positive data, etc.). The anomalies may include abnormal deaths, unexpected clinical signs, weight loss, low birth count, low birth rate, etc. The methods vary in terms of sensitivity, specificity, and false positive rates (e.g., cumulative sum ("CUSUM"), multivariate regression, space-time analysis, etc.). Temporal aggregation can be used for determining syndrome baselines. The baseline period is selected from very recent week(s) relative to the current value. Possible fluctuations in the expected case count attributed to any particular syndrome are accounted for. Seasonal and regional variability is also considered.

The embodiments disclosed herein are capable of rapidly collecting data using computing devices such as mobile devices and integrating that information in real-time with other sources to quickly identify disease events and determine effective interventions and resource allocations. For example, EPSS captures field information from veterinarians, community animal health workers, livestock owners, and other animal and public health officials about livestock and poultry health status in real-time though a mobile device (e.g., tablet or smartphone). It then organizes the information in to an easy-to-use computer display for monitoring and analysis, combining it with other data coming from veterinary diagnostic laboratories, wildlife, livestock markets, slaughterhouses, and environmental data sources.

By improving data collection capabilities and integrating information from multiple disparate sources, the EPSS provides a more comprehensive view of animal health over space and time to aid in early disease detection or monitor changes in animal health status. It is estimated that 60 percent of all human pathogens are zoonotic; therefore analysis of real-time animal health information can have a direct impact on public health, especially in the developing world where animals and humans interact and live together on a daily basis.

In one embodiment, the client device 108 may include a mobile device application such as BFES, which allows for real time collection and reporting of enhanced surveillance data. Through the BFES mobile device application, veterinarians, technicians, production managers, and livestock market inspectors can enter healthy and syndromic animal health data from livestock and poultry premises and livestock markets. The BFES mobile device application links to the AWS shown in FIG. 12, which is part of the system, and allows epidemiologists to aggregate and analyze real-time data through the use of visual, geospatial, and temporal analysis tools to aid in early disease detection or changes in animal health status. The BFES mobile device application also provides valuable information back to veterinarians and livestock market inspectors regarding other syndromic reports in their state, providing access to a unique information source to aid in animal diagnosis and treatment, as well as increasing their situational awareness of the animal health status within their geographic region or state. The BFES mobile device application can link laboratory results with the prediagnostic syndromic reports.

Figure 14:
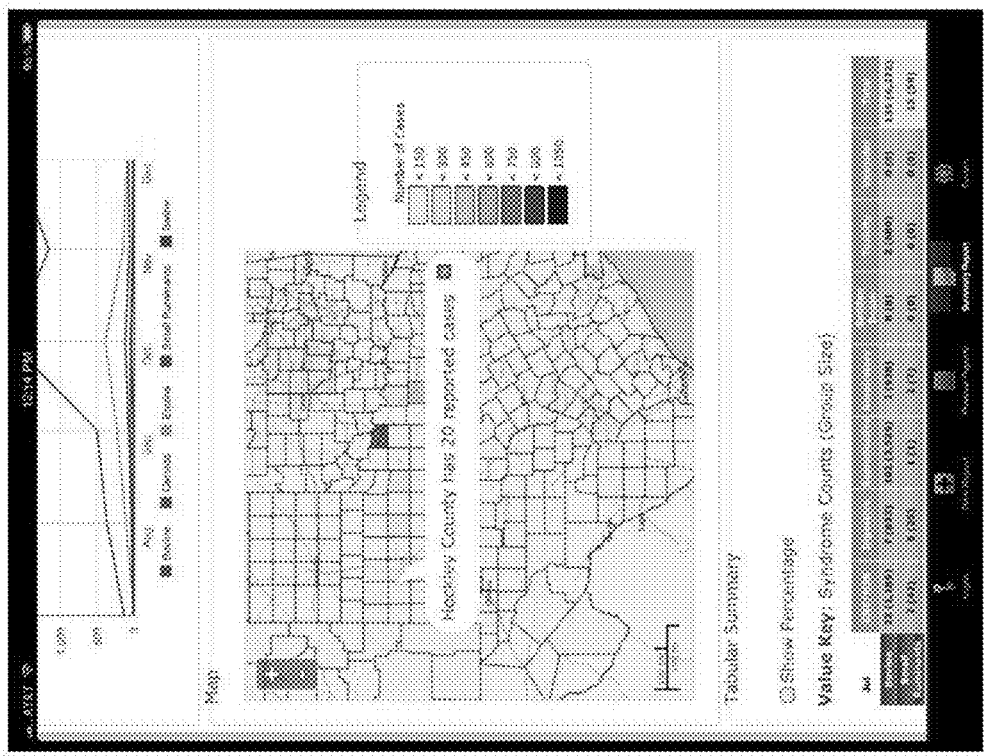
FIGS. 13 to 20 illustrate screen shots of embodiments of a mobile device application.
Figure 13:
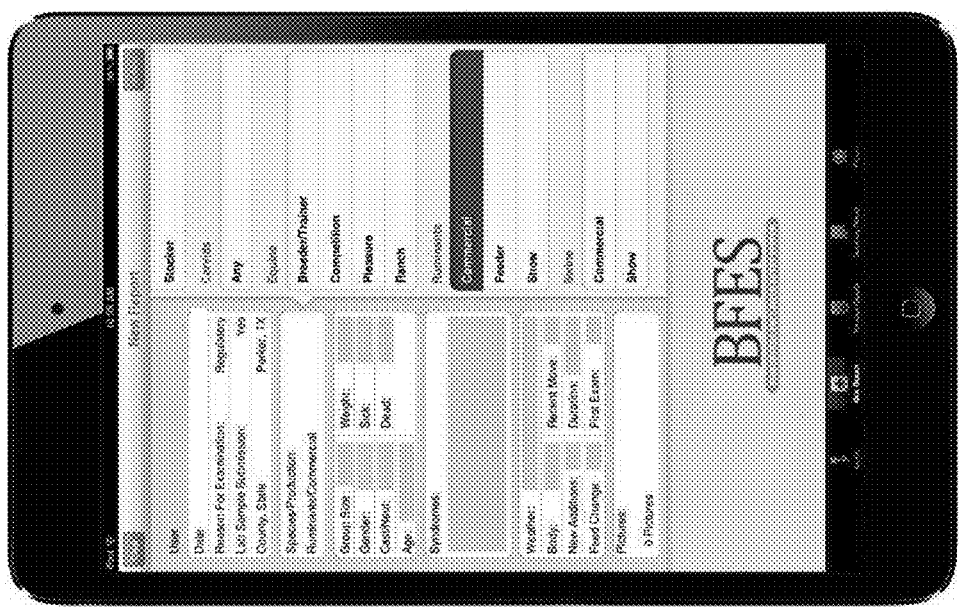
Figure 15:
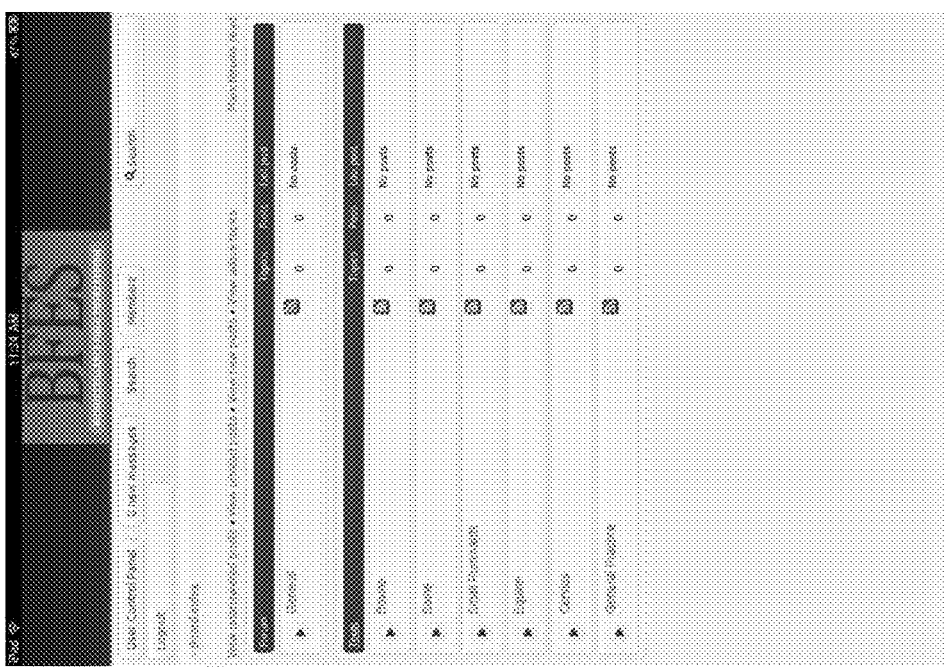

As illustrated in FIGS. 13 to 15, BFES mobile device application users (veterinarians, technicians, wildlife service personnel, production managers, etc.) can use a mobile application interface for field data collection (i.e., populate animal related data via designated fields, (see FIG. 13), the animal related data can be summarized, filtered, aggregated, anonymized and displayed by geographical region using analytics embedded in the mobile application and shared among veterinarians via a summary report feature within the BFES mobile device application (see FIG. 14). In one embodiment, when a new user creates an account and logs into the BFES mobile device application, the user is informed of, and has to agree to, the requirements associated with protecting the data to which the user has access. In another embodiment, when the user logs into the BFES mobile device application, the user is verified as to the rights that user has and to what data the user has access to. In a related embodiment, the verified user has a predefined location and is prevented from changing his/her location to see another user's or state's data or information. The Summary Reports (see FIG. 14) visualizes a user's own data and his/her state's data aggregated at the county level in graphical, geographical and tabular forms. Touching a county on the interactive map enables a popup window showing the number of submitted reports for that county. The user's forum is accessible via the application or Internet and allows communication between users of the same state (see FIG. 15).

Figure 16:
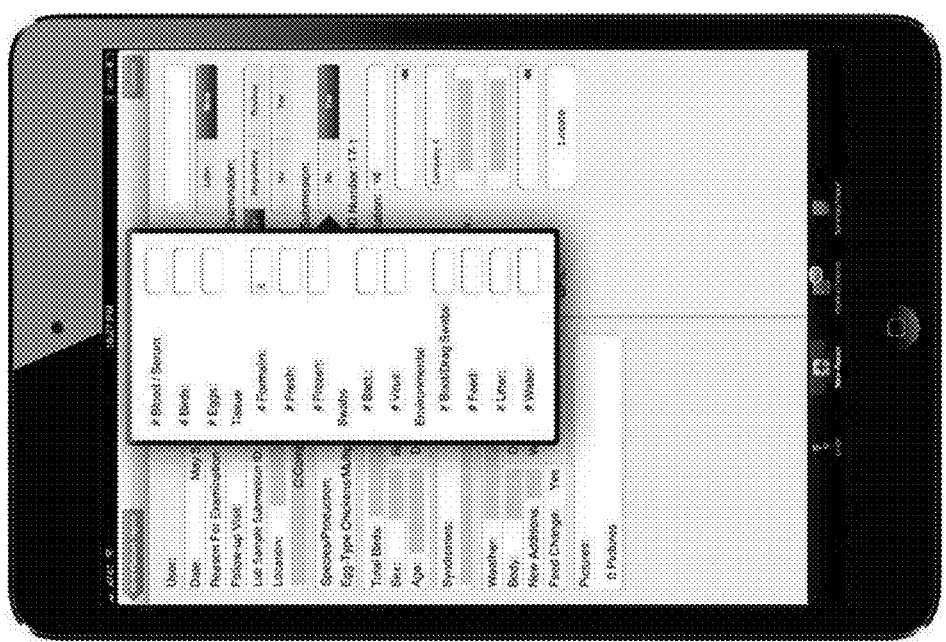
Figure 18:
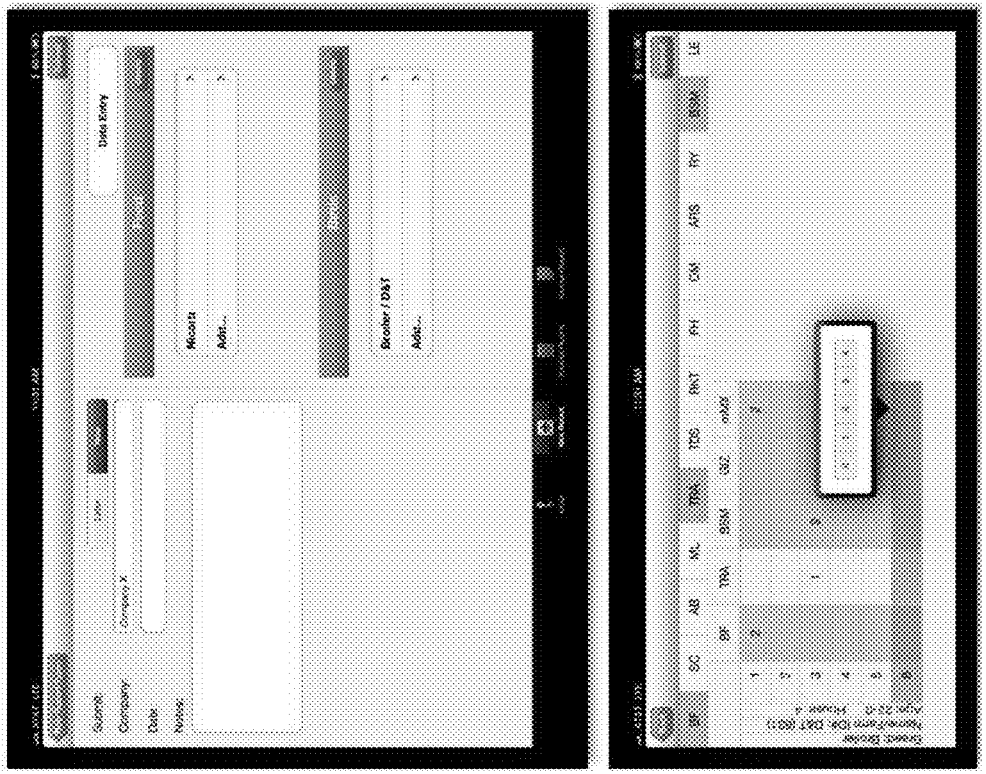
Figure 17:
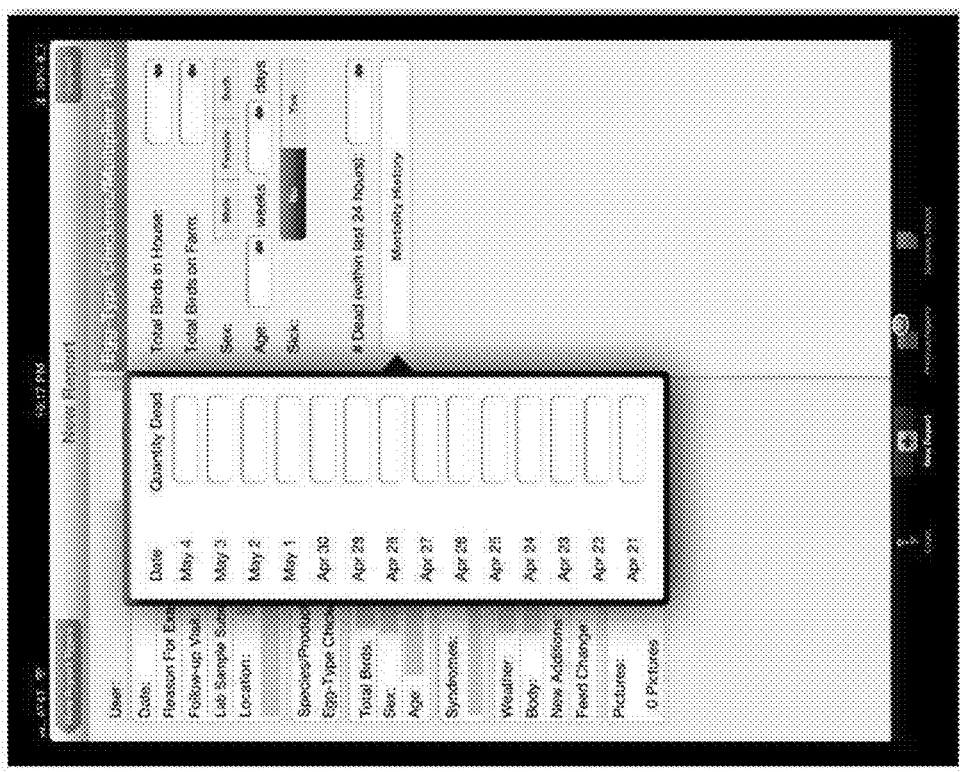
Figure 20:
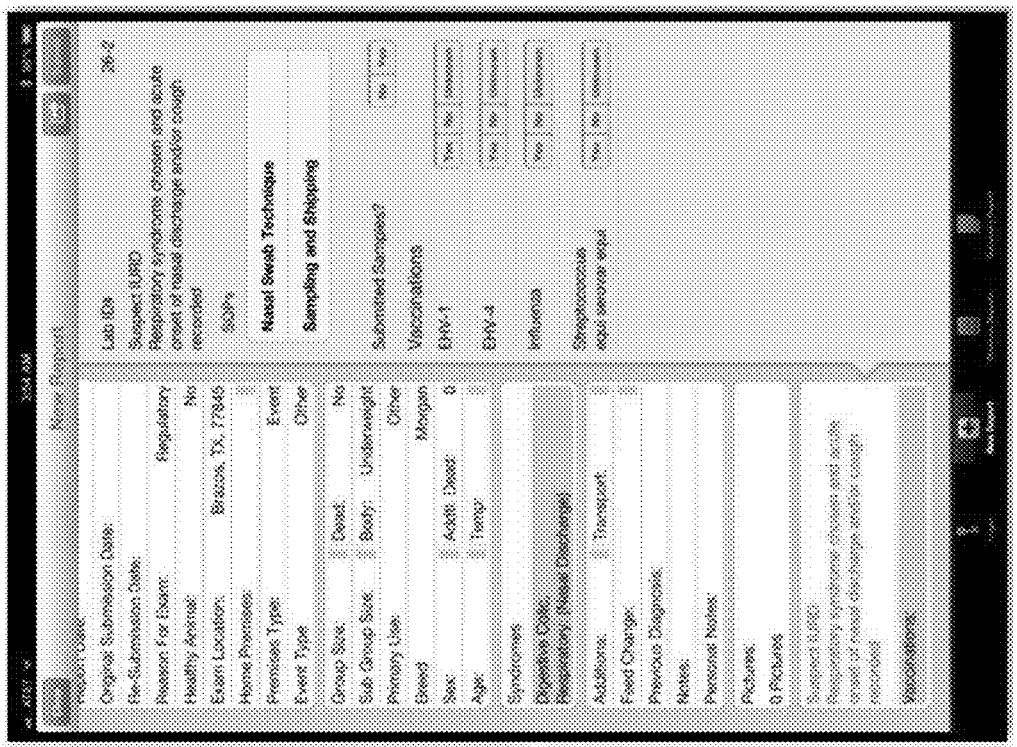

Turning now to FIGS. 16 to 20, illustrated are screen shots of an embodiment of a mobile device application. FIGS. 16 to 18 relate to poultry and FIGS. 19 and 20 relate to equine. As shown in FIGS. 16 and 20, pre-order and test result data from diagnostic laboratories can be incorporated. The BFES mobile device application generates an unique case identification number ("ID") for tracking submission of lab samples and linking of messaged test results to submitted surveillance reports. Immediate notifications of test results can be linked to submitted surveillance reports. Also, global positioning system ("GPS") data is provided at farm level, but typically is not shared beyond the producer. As shown in FIG. 17, historical data collection includes feed intake, water consumption, internal house temperature, and mortality history. Information can be reported for previous dates based on the report date entered. As shown in FIG. 18, the BFES mobile device application includes a report for a health survey for recording and tracking health data from routine necropsies. Feed program(s) are recorded; different programs can be specified for different poultry farms/houses. With respect to data entry, the user can scroll through necropsy codes at the top to select and add to the report, the scoring system for recording necropsy findings is based on industry criteria, and automatic analysis of data is provided.

Figure 19:
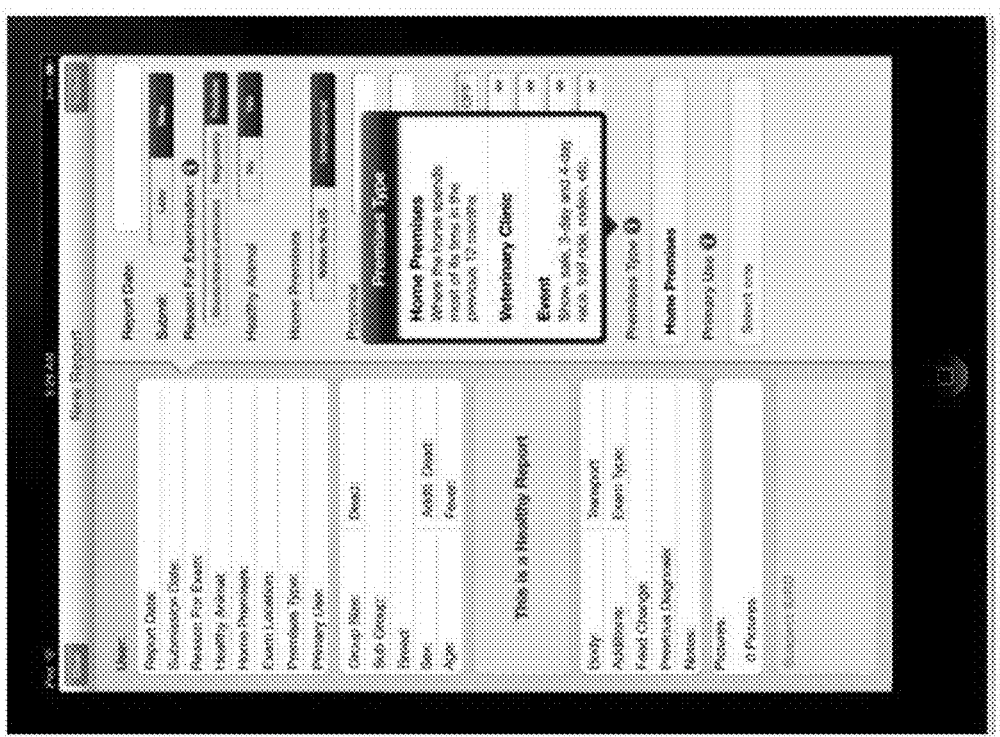

As shown in FIG. 19, new reports can be created that describe the premises, animal, reason for examination, etc. FIG. 19 shows a "healthy report," but "syndromic reports" are also able to be generated by users. Pop-up windows throughout the application display additional information (e.g., definitions of the terms used, examples of the type of information to be entered into the data field, internal number validations, etc.). After completion, reports are submitted. If the user is out of connectivity, the reports are uploaded automatically when the user re-enters connectivity. As shown in FIG. 20, the BFES mobile device application includes a closed loop system supporting lab surveillance, lab test submission, and lab test results. The BFES mobile device application can notify the user that he/she can submit lab samples (i.e., this section becomes activated) if certain criteria are filled out in the report. These criteria compromise the "EPS Case Definition," which is defined as a specific set of internal disease indicators pre-programmed into the BFES applications. When these criteria are met, a unique case identification number ("Case ID") will be automatically generated, which is used to link the lab accession test results back to the specific BFES report. An additional feature allows users to generate Case IDs to include with laboratory order accession forms to pair messaged veterinary diagnostic laboratory tests reports on syndromic reports, even in the absence of a case definition, to allow for user flexibility in test ordering. In this instance, the unique Case ID that is automatically generated, also links test results back to the specific BFES report submission. The BFES mobile device application also includes standard operating procedures ("SOPs") for sampling and shipping.

Traditionally, animal surveillance programs have focused on regulated disease- and agent-specific detection with confirmed laboratory diagnosis, and are not adapted to identify and react to nonregulated disease and health events. A properly developed comprehensive EPSS will provide early detection of endemic, zoonotic, transboundary, environmental, and newly emerging animal diseases, as well as provide the opportunity for targeted surveillance of regulated diseases. These systems leverage the use of state-of-the-art mobile technology for field data collection, giving increased power to traditional clinical veterinary observations by combining them with other existing animal health information streams. In addition, documenting the number of animals observed for signs of foreign animal diseases and found to be healthy will assist the government in demonstrating disease freedom to trading partners.

Figure 21:
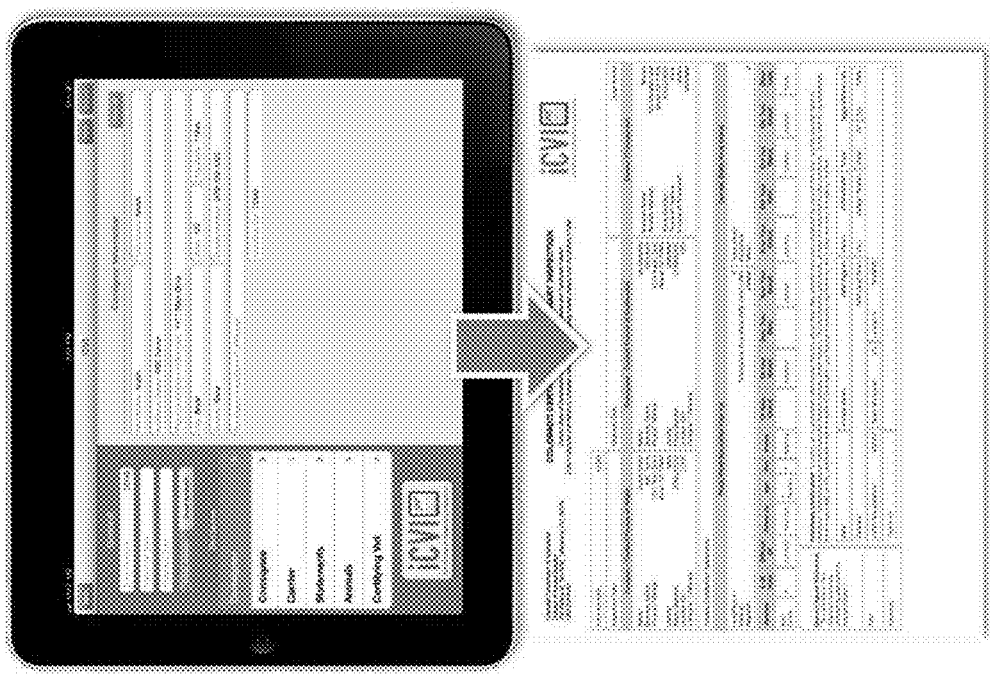
FIG. 21 illustrates a screen shot of an embodiment of a Certificate of Veterinary Inspection form.

As illustrated in FIG. 21, the client device 108 may further include a mobile CVI application, which is an easy-to-use mobile device-based version of the electronic CVI ("eCVI") form that automatically emails a portable document format ("PDF") CVI form to the SAHOs to permit interstate animal movements. A paper certificate can be printed directly from the client device 108 (e.g., mobile device) to a mobile printer. Users will need to be verified before CVI submissions are allowed. Data can be transmitted automatically to the SAHO database and accessible for use in combination with other data streams within the system.

Figure 22:
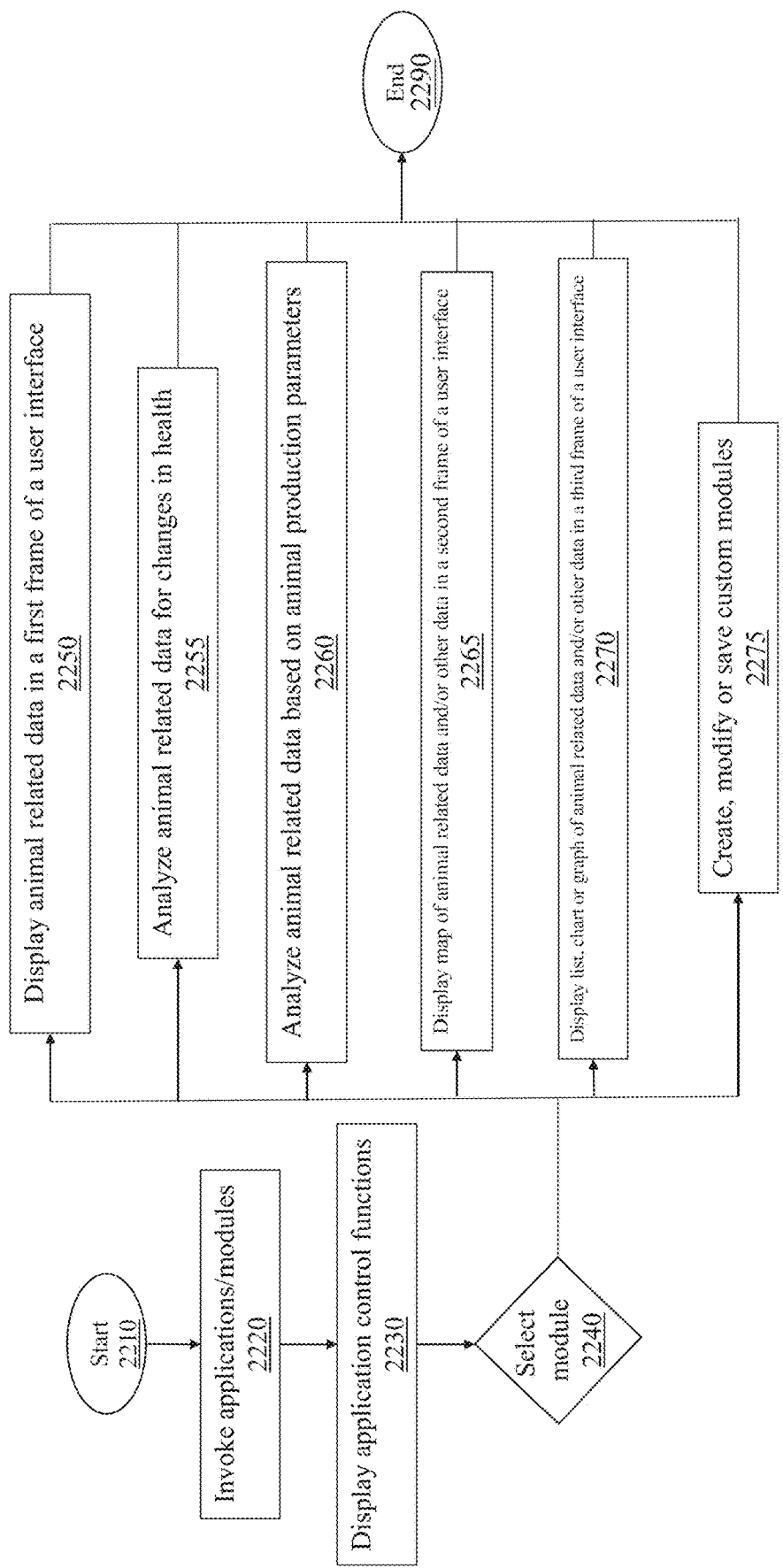
FIG. 22 illustrates a flow chart of an embodiment of a method of monitoring the health of one or more animal herds.

Turning now to FIG. 22, illustrated is a flow chart of an embodiment of a method of monitoring the health of one or more animal herds. With continuing reference to preceding FIGURES, the method begins at a start step 2210. At a step 2220, the method invokes selected applications and modules of FIG. 3. For instance, the method invokes: (a) the data selection module 308 within the data management application 302; (b) the animal health monitoring module 318 and the animal production management module 320 within the data analysis application 304; and (c) the application control module 328, the geospatial mapping module 330, the data display module 332 and the macro or scripting module 334 within the user interface application 306.

The data management application 302 can be used to automatically collect the animal related data from the data source(s) 104 and/or or third party data source(s) and service(s) 110, or integrate additional animal related data from one or more sensors into the one or more sets of animal related data. The data management application 302 can be used to protect confidential information obtained from the data source(s) 104 and/or third party data source(s) and service(s) 110, and disclose such confidential information in an emergency. The data management application 302 or data analysis application 304 can automatically create and send one or more notifications to client device(s) 108 communicably coupled to the computing device(s) 102. The data management application 302 can also receive additional animal related data from client device(s) 108 communicably coupled to the computing device(s) 102, assign one or more permissions to the animal related data based on one or more data sharing agreements associated with the data source(s) 104 and/or third party data source(s) and service(s) 110, transform or restrict the selected portions of the assessed animal related data based on the one or more permissions assigned to the animal related data, aggregate the assessed animal related data to provide the selected portions of the assessed animal related data without disclosing any confidential information, limit (or dynamically restrict) access to the animal related data based on a security level of a user, the display or a client device, or dynamically adjust access to the animal related data based on specific circumstances such as an emergency level or basis.

The data analysis application 304 provides users with a set of manual and automated tools for analyzing data from the data source(s) 104 and/or third party data source(s) and service(s) 110 via the data management application 302. The user interface application 306 provides a user friendly and user customizable interface to access, view, analyze, manipulate and otherwise use data from the data source(s) 104 and/or third party data source(s) and service(s) 110 via the data management application 302 and the data analysis application 304.

A set of application control functions from the application control module 328 is displayed, by the computing device(s) 102, in a user interface of a display in a step 2230. The application control module 328 provides a set of application control functions that allow a user to add, remove, change and manipulate frames displayed on the computing device(s) 102, and to execute, control and terminate the modules and applications. The set of application control functions enable customization and control of the user interface, and execution of the data selection module 308, the animal health monitoring module 318, the animal production management module 320, the geospatial mapping module 330, the data display module 332, and the macro or scripting module 334. The user interface application 306 can also provide a data query tool, a map annotation tool, a calculator, one or more analytical tools, the macro or scripting module 334 to create user-defined modules, etc.

In a decisional step 2240, a user input is received, by the computing device(s) 102, in the user interface of the display that indicates activation of at least one of the modules. If the user input indicates activation of the data selection module 308, the method obtains the one or more sets of animal related data and causes the one or more computing device(s) 102 to display the one or more sets of animal related data in a first frame of the user interface in a step 2250. The animal related data can include animal health data, movement data, key location data, surveillance data, diagnostic testing data, GIS layer data, personnel data, resource data, other data, or a combination thereof. The third-party data source(s) and service(s) 110 can include governmental databases, laboratory databases, animal processing databases, animal producer databases, veterinarian databases, commercial databases, data feeds, sensor data, other sources, or a combination thereof.

If the user input indicates activation of the animal health monitoring module 318, one or more sets of animal related data are analyzed for any changes in the health of the one or more animal herds in a step 2255. The animal health monitoring module 318 can provide the same functionality as the animal tracking module 312 including, among other things, to track movement of one or more animals over time, or track one or more permits associated with one or more animals over time and determine a status of the one or more permits. In addition, animal health monitoring module 318 can request an additional testing of one or more animals, or an animal health data associated with one or more animals, etc. In another embodiment, the animal health monitoring module 318 can provide a notification such as an alert or warning not to move one or more animals to a specific geographic area.

If the user input indicates activation of the animal production management module 320, one or more sets of animal related data are analyzed based on one or more animal production parameters in a step 2260. The animal production management module 320 can also be used to adjust one or more preplanned animal movements, share an animal test data between two or more animal producers, and share premises disease status for a particular pathogen of interest between two or more animal producers, adjust an animal diet based on the analyzed data, and adjust an animal vaccination schedule based on the analyzed data.

If the user input indicates activation of the geospatial mapping module 330, the method causes a map with one or more graphical objects representing the one or more sets of animal related data, analyzed data from the animal health monitoring module 318, or analyzed data from the animal production management module 320 to be displayed, by the one or more computing devices in a second frame of the user interface in a step or module 2265. The geospatial mapping module 330 displays a frame in the user interface that include a map with one or more graphical objects representing various data (e.g., type of animal, stage of production, disease status, etc.). The geospatial mapping module 330 also provides various controls that allow a user to annotate, change and manipulate content displayed within the frame (e.g., map data overlaid with data from the other source(s)).

If the user input indicates activation of the data display module 332, the method causes a listing, a chart or a graph of the one or more sets of animal related data, analyzed data from the animal health monitoring module 318, or analyzed data from the animal production management module 320 to be displayed, by the one or more computing device(s) 102 in a third frame of the user interface in a step 2270. The data display module 332 displays a frame in the user interface that provides a listing, a chart or a graph of data.

If the user input indicates activation of the macro or scripting module 334, the method allows the user to create, modify and save customized modules, which provide custom functions, analysis or displays in a step 2275. Thereafter, the method ends in a step 2290. The method may also start again or return to one of the earlier steps depending on the application. The method is not limited to the foregoing steps or the specific order of steps described.

As an example, the present invention can provide an approach to mitigate the disruption to the normal business cycle for livestock, poultry, and associated animal products that are likely to occur during an animal disease outbreak in the United States, or elsewhere. This embodiment provides a data/information sharing and management architecture that allows business sensitive data to be distributed in a controlled manner, and then integrates that information to support shared situational awareness and decision-making. This supports better risk assessment, mitigation, and management during response operations. Although the system can be provided in a regional or industry specific implementation, the system is scalable to provide a full-scale national or even international deployment of the system across all industries as hereinafter demonstrated.

Figure 23:
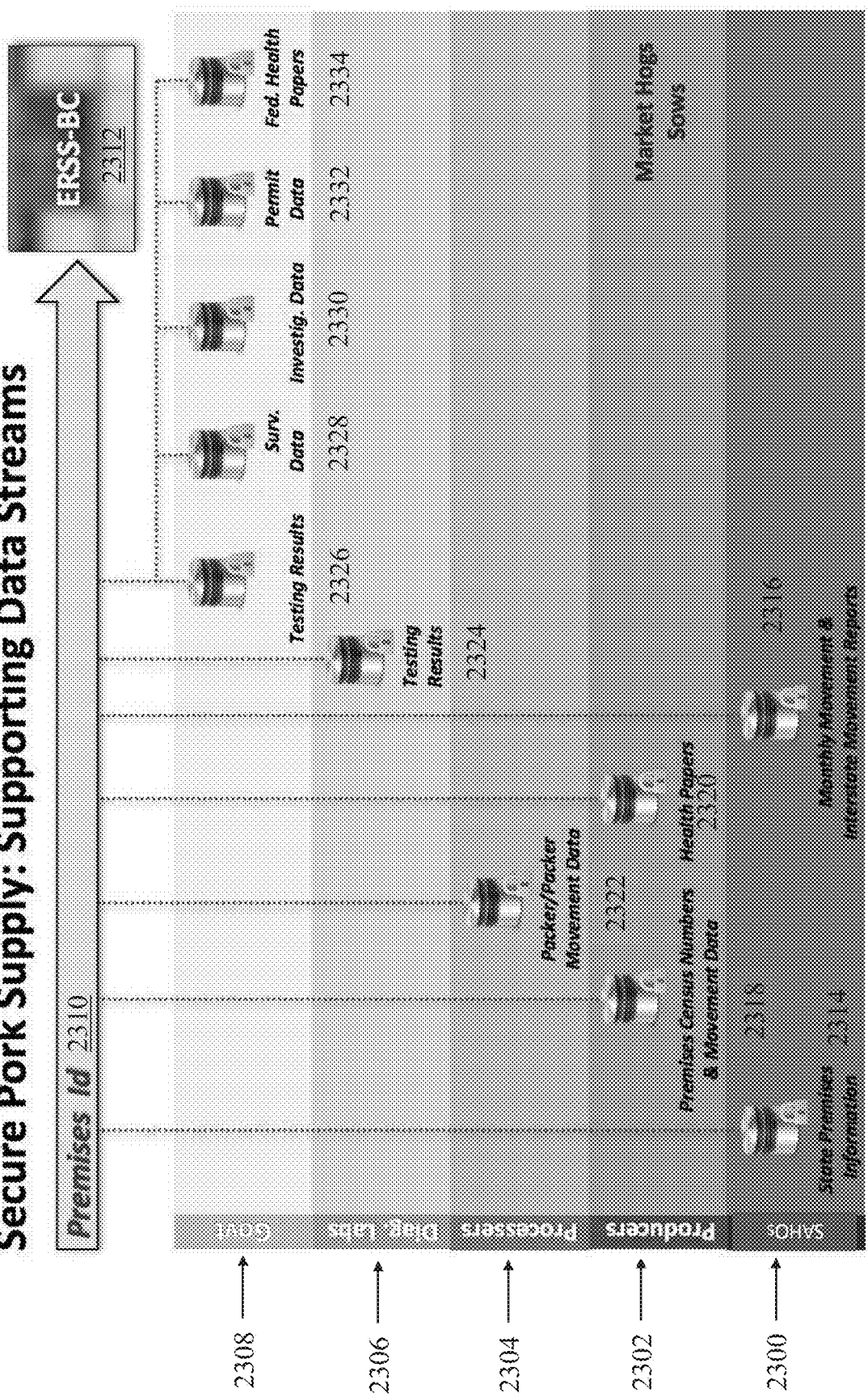
FIG. 23 illustrates a screen shot of an embodiment of disparate data streams for an animal.

Turning now to FIG. 23, illustrated is a screen shot of an embodiment of disparate data streams for an animal. In this case, the disparate data streams support the Secure Pork Supply ("SPS") that feed into the ERSS system. Data is obtained from SAHOs 2300, producers 2302, processors 2304, diagnostic labs 2306 and governmental agencies 2308. The data is tagged with a premises identifier 2310 to indicate the source of the data, and then provided to the various applications, such as an ERSS 2312. The data from the SAHOs 2300 includes state premises information 2314 and monthly movement and interstate movement reports 2316. The data from the producers 2302 includes premises census numbers and movement data 2318 and health papers 2320. The data from the processors 2304 include packer/packer movement data 2322. The data from the diagnostic labs 2306 includes testing results 2324. The data from the government agencies 2308 includes testing results 2326, surveillance data 2328, investigation data 2330, permit data 2332 and federal health papers 2334. In accordance therewith, data such as the state premises information 2314, premises census numbers and movement data 2318 and testing results 2324 may be integrated and combined to provide real time graphical analysis of animal production data. The system shows the day-to-day usefulness for monitoring facility disease status, and premises disease status to support the decision on whether or not to move animals.

Figure 24:
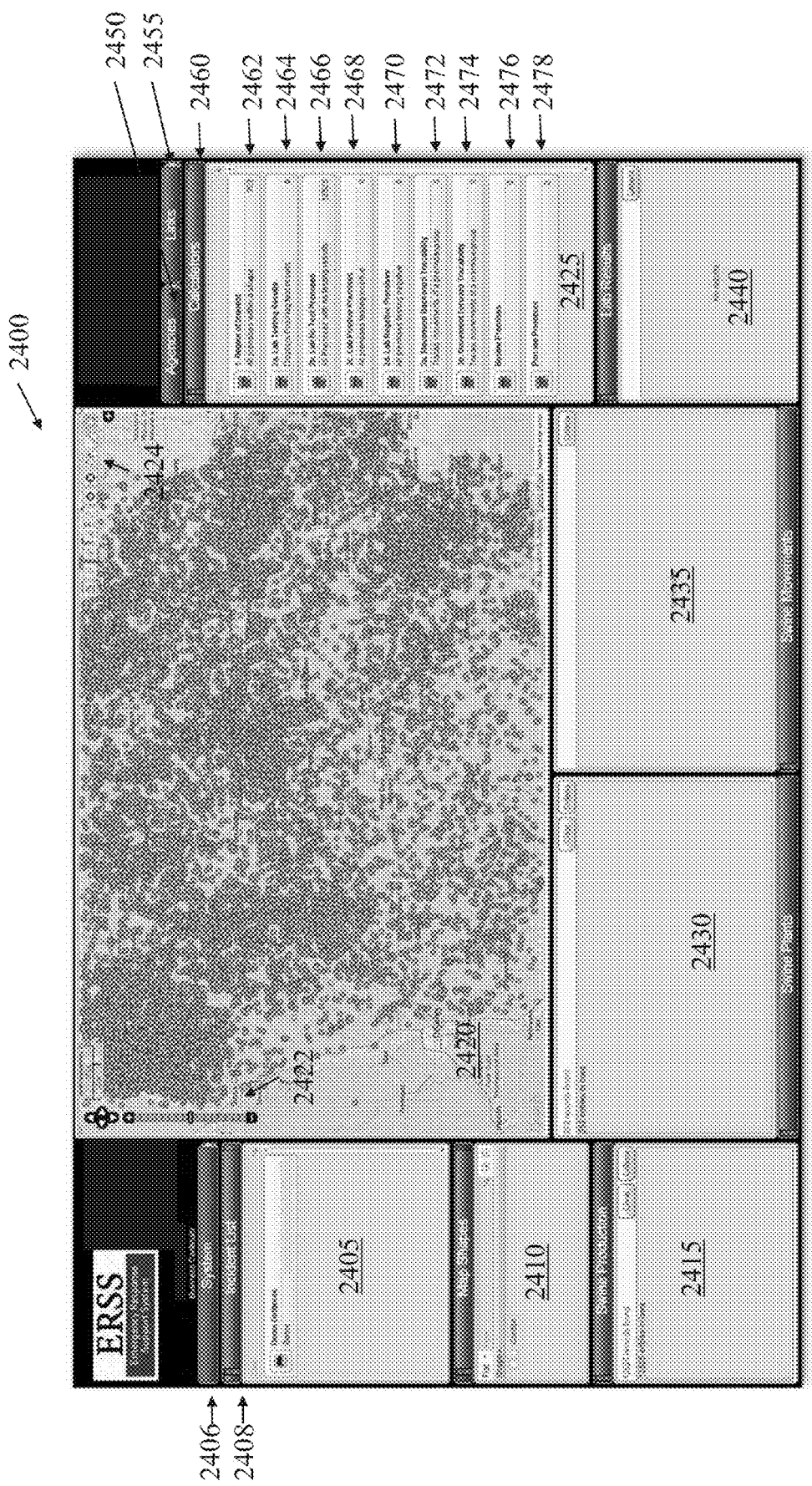
FIG. 24 illustrates a screen shot of an embodiment of a day-to-day animal health management dashboard.

Turning now to FIG. 24, illustrated is a screen shot of an embodiment of a day-to-day animal health management dashboard 2400. The day-to-day animal health management dashboard 2400 is divided into eight frames including a system and incident frame 2405, a map shapes frame 2410, a swine production frame 2415, an interactive mapping frame 2420, a data selection frame 2425, a swine plants (e.g., packaging, processing, rendering, slaughter) frame 2430, a swine movements frame 2435 and a lab results frame 2440. The system and incident frame 2405 includes a system tab 2406 and an incident tab 2408. The interactive mapping frame 2420 graphically displays selected data on a map and includes a set of map navigational tools 2422 and a set of analytical tools 2424. The interactive mapping frame 2420 shows the locations of all premises and plants (e.g., packaging, processing, rendering, slaughter) within the given geographic area. Premises and plants without any outbreak incidents are shown as aqua colored circles, whereas premises and plants with outbreak incidents are shown as yellow colored circles. The data selection frame 2425 includes an agencies tab 2450, a links tab 2455 and a calculators tab 2460. As shown, the calculators tab 2460 provides access to various data sets, such as region of interest 2462, labs with test results 2464, labs with no test results 2466, all premises testing positive 2468, all premises testing negative 2470, movement backward traceability 2472, movement forward traceability 2474, bovine premises 2476, and porcine premises 2478.

Figure 25:
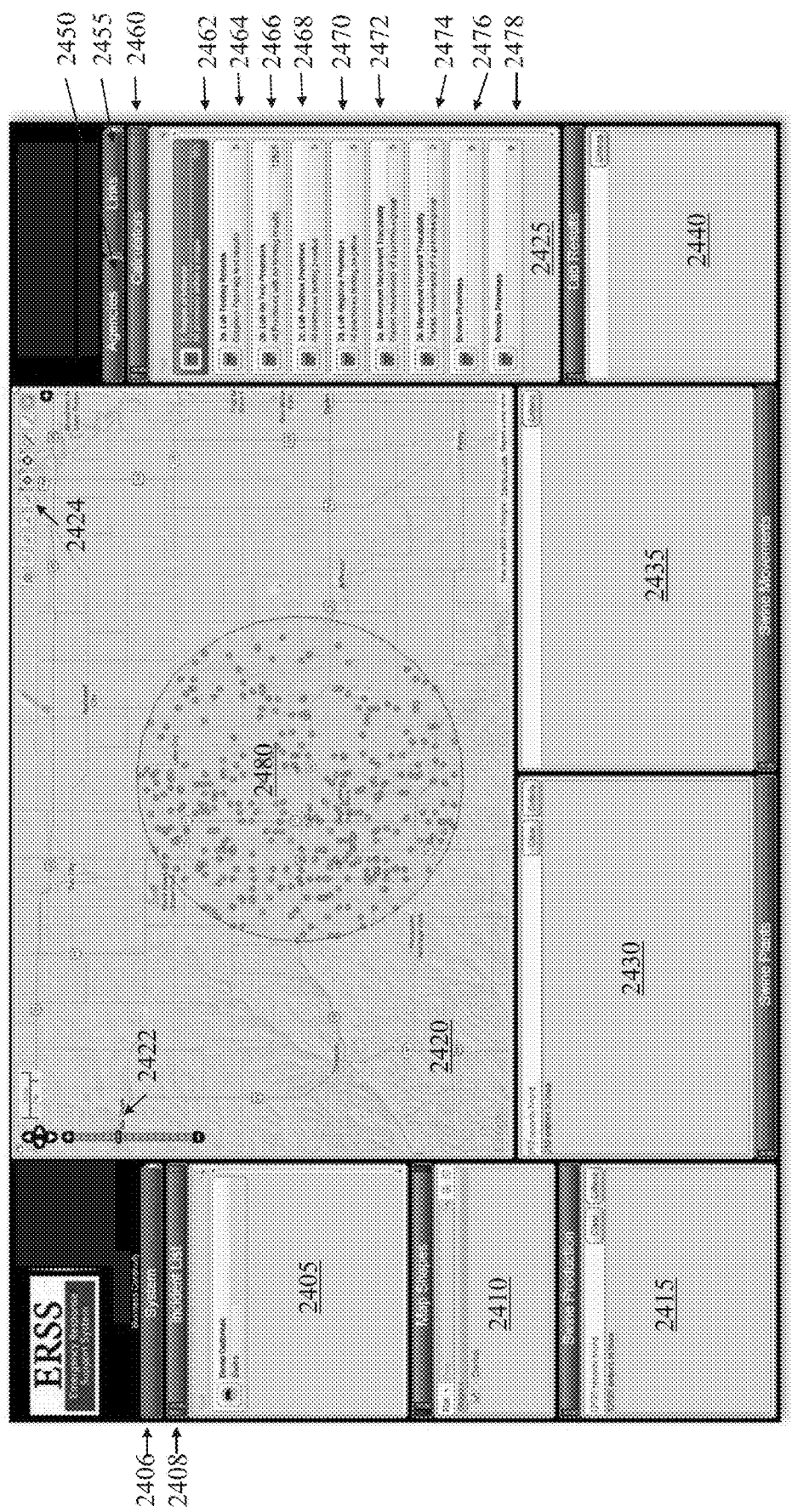
FIG. 25 illustrates a screen shot of an embodiment of a region of interest dashboard created from the day-to-day animal health management dashboard of FIG. 24.
Figure 26:
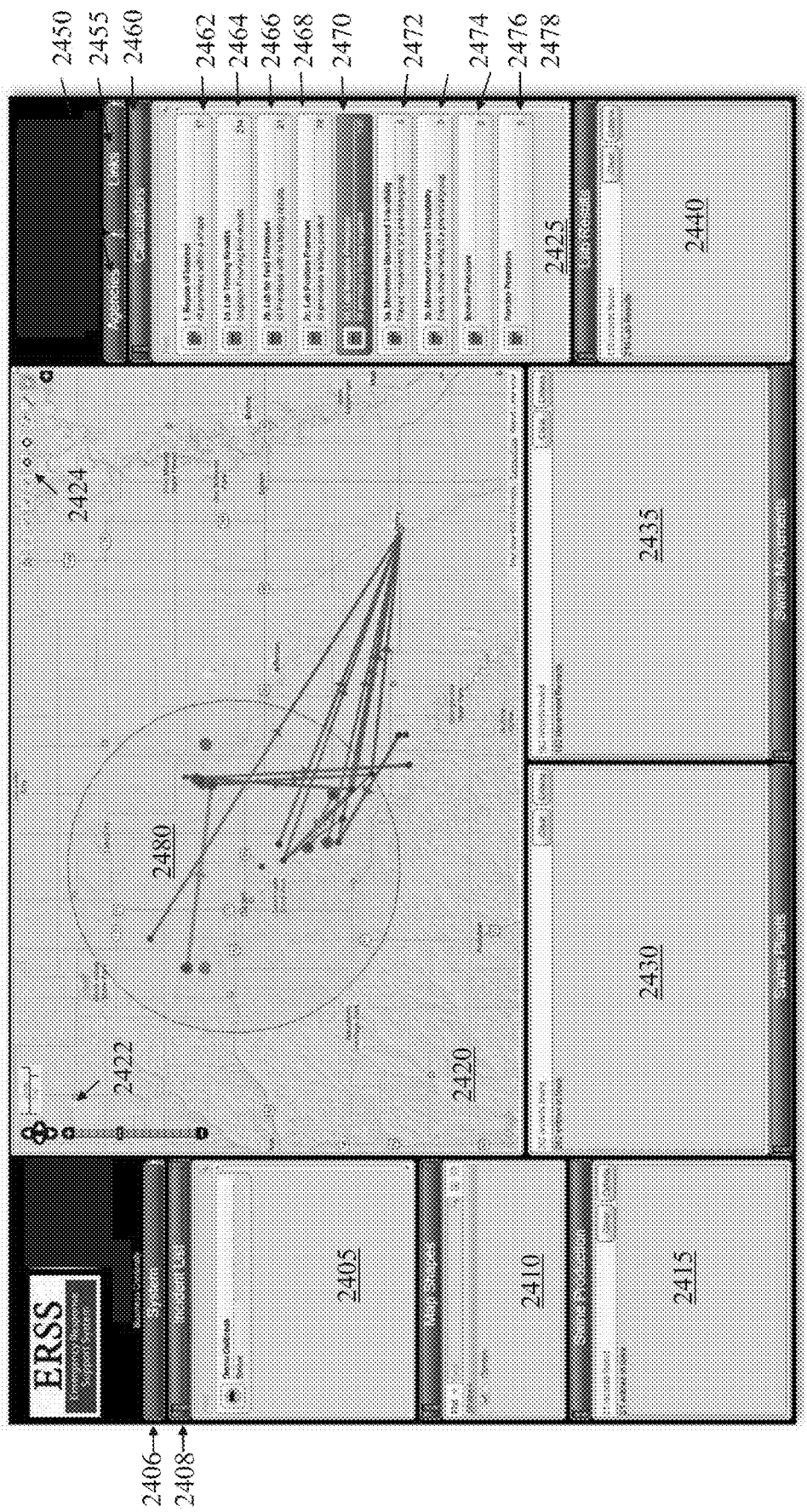
FIG. 26 illustrates a screen shot of an embodiment of a disease status and traceability dashboard within the first region of interest of FIG. 25.

Turning now to FIG. 25, illustrated is a screen shot of an embodiment of a region of interest dashboard created from the day-to-day animal health management dashboard 2400 of FIG. 24 by selecting a first region of interest 2480 within the data selection frame 2425. In response, the interactive mapping frame 2420 shows the locations of all premises and plants within the first region of interest 2480. Referring now to FIG. 26, illustrated is a screen shot of an embodiment of a disease status and traceability dashboard with the first region of interest 2480 of FIG. 25 by selecting the all premises testing negative 2470 within the data selection frame 2425 to graphically display the data within interactive mapping frame 2420. The system can also integrate veterinary diagnostic laboratory test reports to support traceability efforts through the integration of premises location, movement, and disease status data.

Supporting continuity of business operations during a disease outbreak requires traceability analysis for determining source/exposure, surveillance (testing/observation) for determining status, and permit issuing for animal/product movement. Examples of Information Dashboard Frameworks ("IDFs") illustrating Business Continuity are set forth below.

Figure 27:
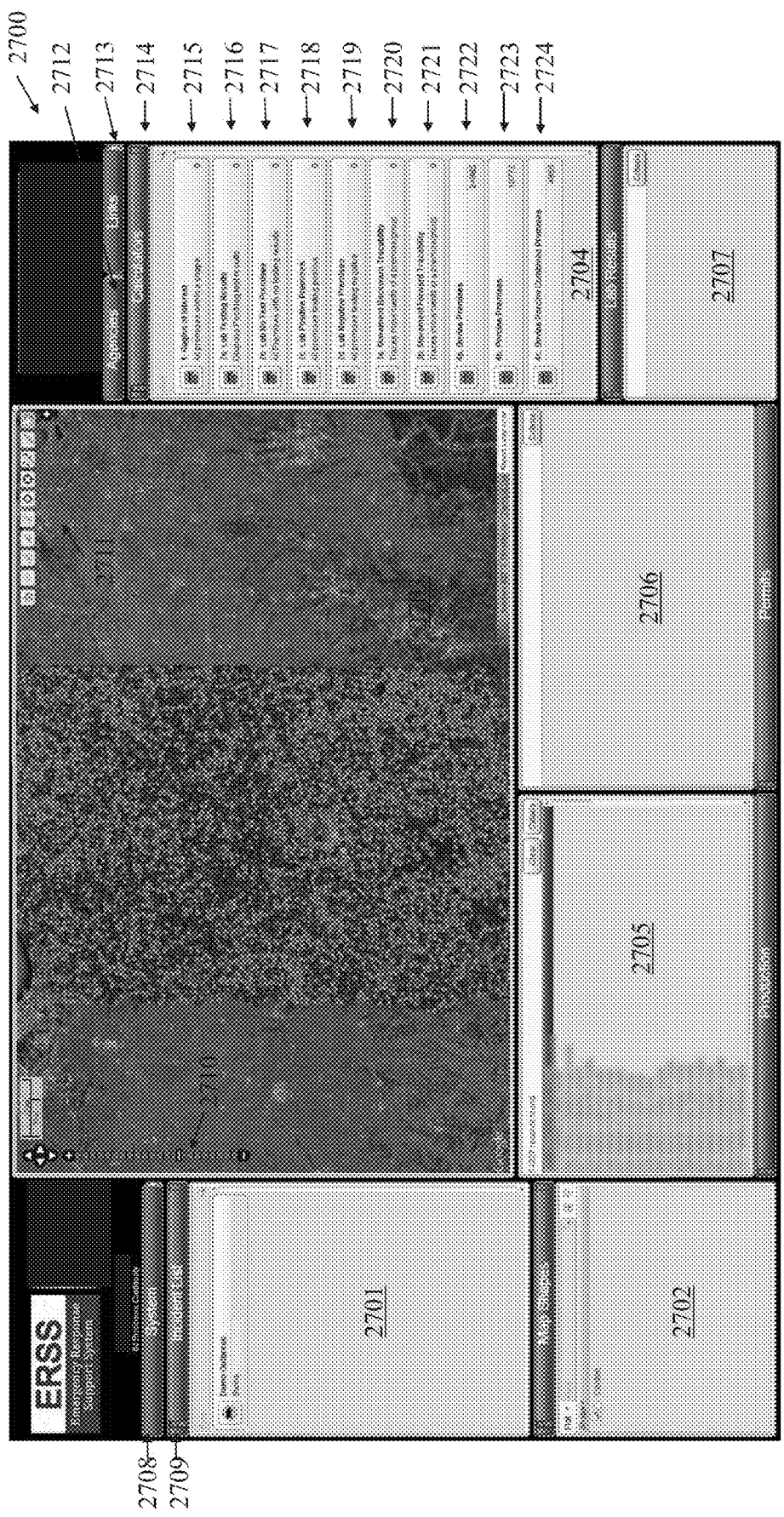
FIG. 27 illustrates a screen shot of an embodiment of a day-to-day animal health management dashboard.

Turning now to FIG. 27, illustrated is a screen shot of an embodiment of a day-to-day animal health management dashboard 2700. The dashboard 2700 includes a system and incident frame 2701, a map shapes frame 2702, an interactive mapping frame 2703, a data selection frame 2704, a production frame 2705, a permits frame 2706, and a lab results frame 2707. The system and incident frame 2701 includes a system tab 2708 and an incident tab 2709. The interactive mapping frame 2703 graphically displays selected data on a map and includes a set of map navigational tools 2710 and a set of analytical tools 2711. The interactive mapping frame 2703 shows the locations of all premises and plants (e.g., packaging, processing, rendering, slaughter) within the given geographic area. Premises and plants with bovine only are shown as green colored circles, porcine only as blue circles and combined bovine and porcine as purple circles. The data selection frame 2704 includes an agencies tab 2712, a links tab 2713 and a calculators tab 2714. As shown, the calculators tab 2714 provides access to various data sets such as a region of interest 2715, labs with test results 2716, labs with no test results 2717, all premises testing positive 2718, all premises testing negative 2719, movement backward traceability (where did the animals come from) 2720, movement forward traceability (where did the animals go) 2721, bovine premises 2722, porcine premises 2723, and bovine porcine combined premises 2724.

Figure 28:
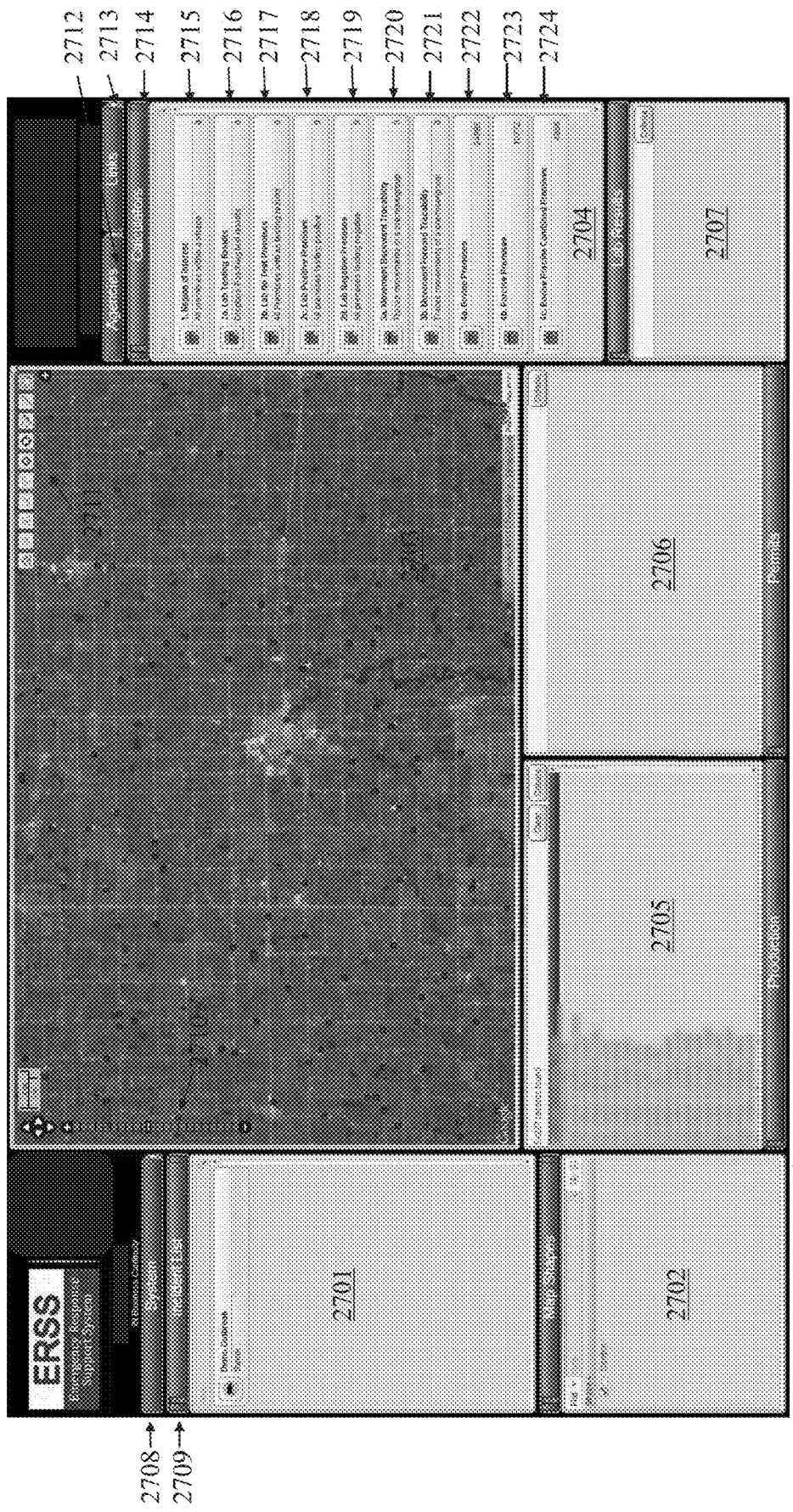
FIG. 28 illustrates a screen shot of an embodiment of a region of interest dashboard created from the day-to-day animal health management dashboard of FIG. 27.
Figure 29:
FIG. 29 illustrates a screen shot of an embodiment of an animal movement permits dashboard.

Turning now to FIG. 28, illustrated is a screen shot of an embodiment of a region of interest dashboard created from the day-to-day animal health management dashboard 2700 of FIG. 27 by zooming in on a selected area. In response, the interactive mapping frame 2703 shows the locations of all premises and plants within the selected area. Referring now to FIG. 29, illustrated is a screen shot of an embodiment of an animal movement permits dashboard showing permits and animal movement over a period of time by selecting the porcine premises 2723 within the data selection frame 2704. In response, the interactive mapping frame 2703 shows all porcine permits going into a selected county over the last 12 months (yellow lines and highlighted states). The present invention is not limited to use of circles or lines in various colors to represent the relevant data or status. In other embodiments, different types of graphical objects and/or colors may be used to represent the relevant data or status.

Figure 30:
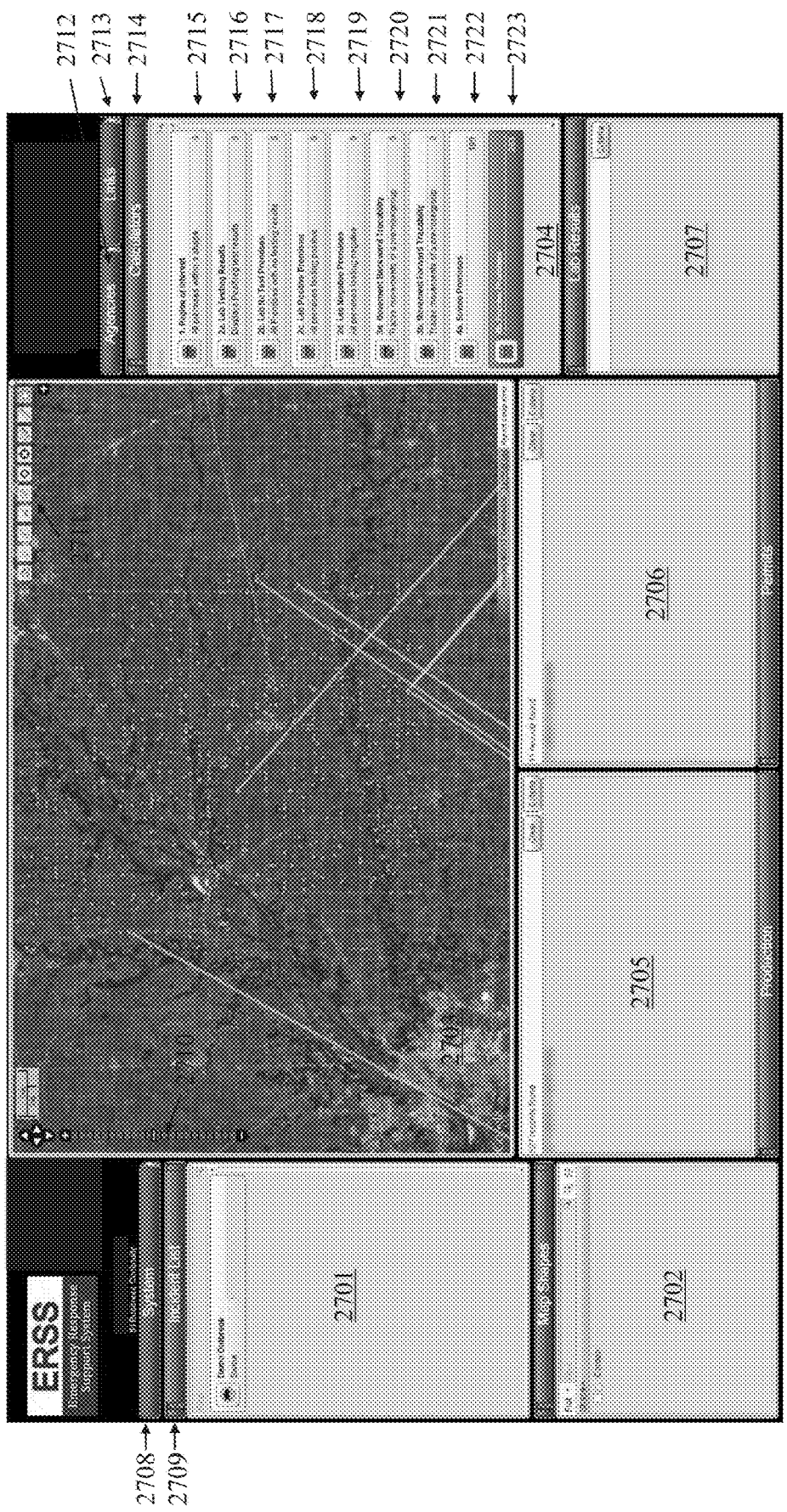
FIG. 30 illustrates a screen shot of an embodiment of another animal movement permits dashboard created from the animal movement permits dashboard of FIG. 29.

Turning now to FIG. 30, illustrated is a screen shot of an embodiment of another animal movement permits dashboard created from the animal movement permits dashboard of FIG. 29 by zooming in on a selected area within the region of interest. In response, the interactive mapping frame 2703 shows the locations of all premises and plants within the selected county and details the permit destinations (yellow lines).

Figure 31:
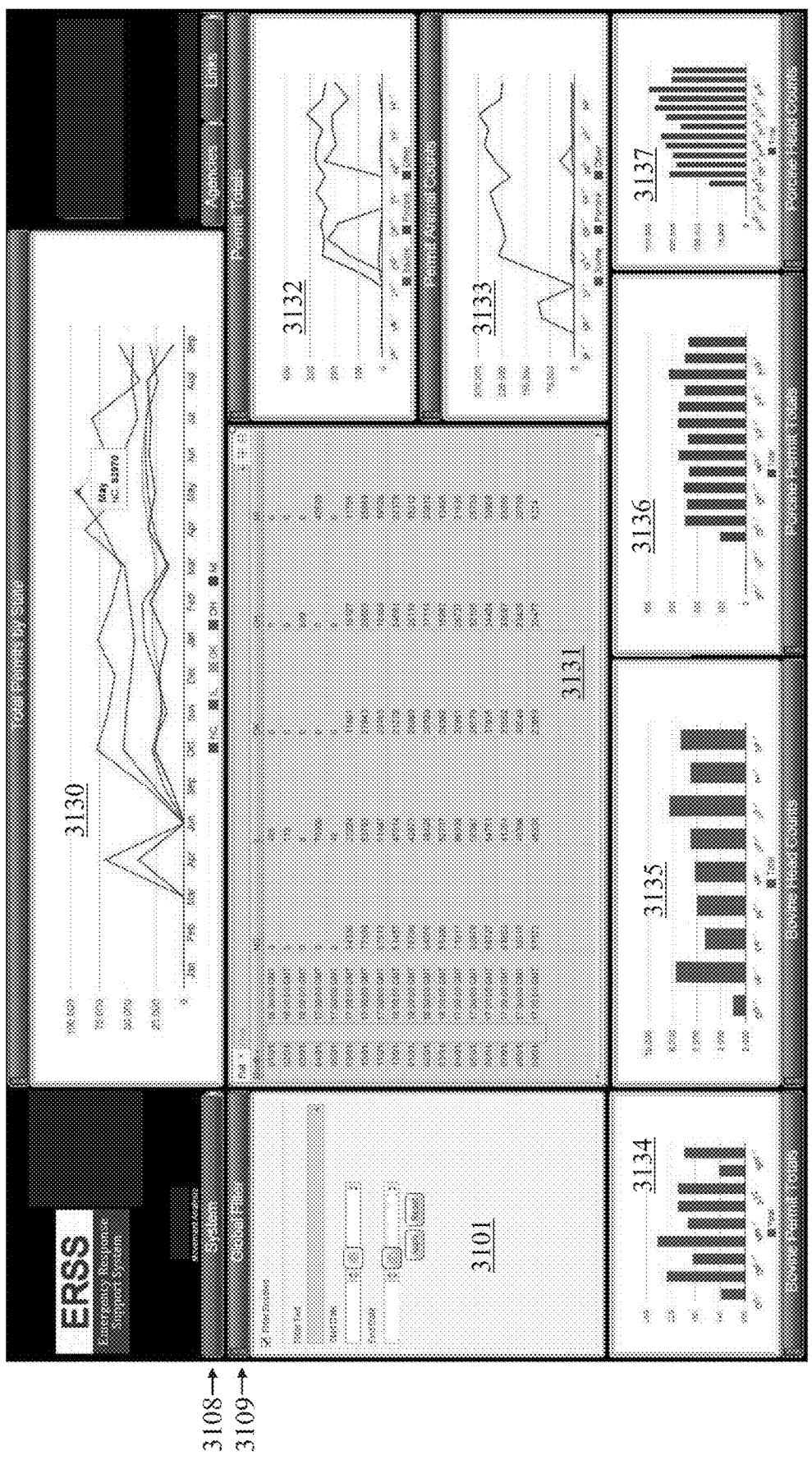
FIG. 31 illustrates a screen shot of an embodiment of a permits summary dashboard.

Turning now to FIG. 31, illustrated is a screen shot of an embodiment of a permits summary dashboard. The permits summary dashboard includes a system and incident frame 3101, a total permits by state frame 3130 (line graph), a detailed data frame 3131, a permit totals by animal type frame 3132 (line graph), a permit animal counts by animal type frame 3133 (line graph), a bovine permits total frame 3134 (bar graph), a bovine head counts frame 3135 (bar graph), a porcine permits total frame 3136 (bar graph), and a porcine head counts frame 3137 (bar graph). The system and incident frame 3101 includes a system tab 3108 and an incident tab 3109.

Figure 32:
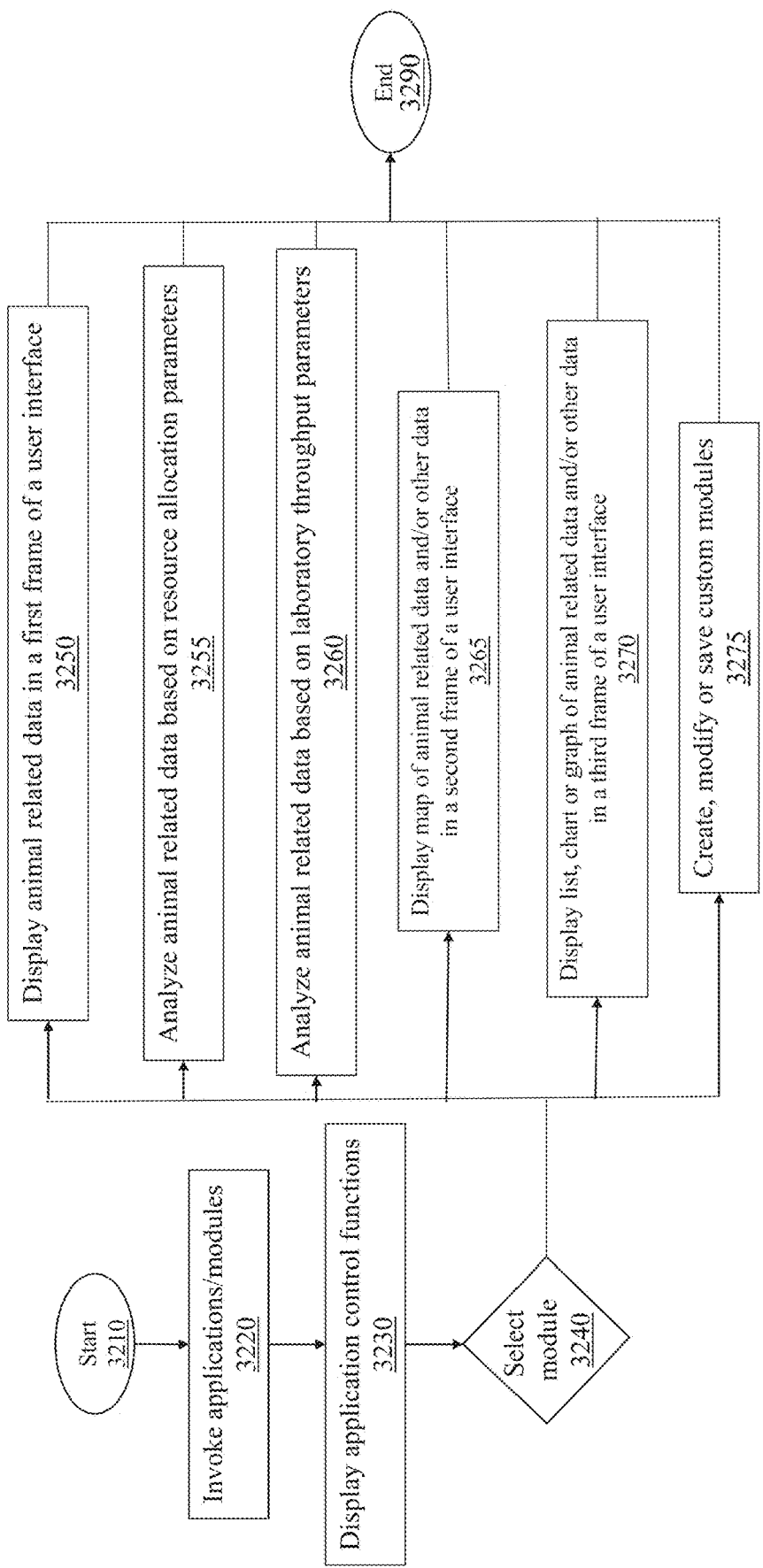
FIG. 32 illustrates a flow chart of an embodiment of a method of managing diagnostic information from one or more veterinary diagnostic laboratories.

Turning now to FIG. 32, illustrated is a flow chart of an embodiment of a method of managing diagnostic information from one or more veterinary diagnostic laboratories. In the illustrated embodiment, the animal related data is veterinary diagnostic laboratory related data. With continuing reference to preceding FIGURES, the method begins at a start step 3210. At a step 3220, the method invokes selected applications and modules of FIG. 3. For instance, the method invokes: (a) the data selection module 308 within the data management application 302; (b) the laboratory resource allocation module 322 and the laboratory throughput analysis module 324 within the data analysis application 304; and (c) the application control module 328, the geospatial mapping module 330, the data display module 332 and the macro or scripting module 334 within the user interface application 306.

The data management application 302 can be used to automatically collect the animal related data from the data source(s) 104 and/or or third party data source(s) and service(s) 110, or integrate additional animal related data from laboratories into the one or more sets of animal related data. The data management application 302 can be used to protect confidential information obtained from the data source(s) 104 and/or third party data source(s) and service(s) 110, and disclose such confidential information in an emergency. For example, geographical data that is expressed as an address may be translated into coordinate-based geographical data in order to limit the amount of information provided to state and federal offices in order to protect the privacy of an individual producer. However, such privacy safeguards may be overridden in the event of an emergency, where a state or federal official requires full access to the information in the data sources. The data management application 302 or data analysis application 304 can automatically create and send one or more notifications to client device(s) 108 communicably coupled to the computing device(s) 102.

The data management application 302 can also receive additional animal related data from client device(s) 108 associated with laboratories communicably coupled to the computing device(s) 102, assign one or more permissions to the animal related data based on one or more data sharing agreements associated with the data source(s) 104 and/or third party data source(s) and service(s) 110, transform or restrict the selected portions of the assessed animal related data based on the one or more permissions assigned to the animal related data, aggregate the assessed animal related data to provide the selected portions of the assessed animal related data without disclosing any confidential information, limit (or dynamically restrict) access to the animal related data based on a security level of a user, the display or a client device, or dynamically adjust access to the animal related data based on specific circumstances such as an emergency level or basis.

The data analysis application 304 provides users with a set of manual and automated tools for analyzing data from the data source(s) 104 and/or third party data source(s) and service(s) 110 via the data management application 302. The user interface application 306 provides a user friendly and user customizable interface to access, view, analyze, manipulate and otherwise use data from the data source(s) 104 and/or third party data source(s) and service(s) 110 via the data management application 302 and the data analysis application 304.

A set of application control functions from the application control module 328 is displayed, by the computing device(s) 102, in a user interface of a display in a step 3230. The application control module 328 provides a set of application control functions that allow a user to add, remove, change and manipulate frames displayed on the computing device(s) 102, and to execute, control and terminate the modules and applications. The set of application control functions enable customization and control of the user interface, and execution of the data selection module 308, the laboratory resource allocation module 322, the laboratory throughput analysis module 324, the geospatial mapping module 330, the data display module 332 and the macro or scripting module 334. The user interface application 306 can also provide a data query tool, a map annotation tool, a calculator, one or more analytical tools, the macro or scripting module 334 to create user-defined modules, etc.

In a decisional step 3240, a user input is received, by the computing device(s) 102, in the user interface of the display that indicates activation of at least one of the modules. If the user input indicates activation of the data selection module 308, the method obtains the one or more sets of animal related data from laboratories and causes the one or more computing device(s) 102 to display the one or more sets of animal related data in a first frame of the user interface in a step 3250. The animal related data can also include animal health data, movement data, key location data, surveillance data, diagnostic testing data, GIS layer data, personnel data, resource data, phylogenetic data, other data, or a combination thereof. The third-party data source(s) and service(s) 110 can include governmental databases, laboratory databases, animal processing databases, animal producer databases, veterinarian databases, commercial databases, data feeds, sensor data, other sources, or a combination thereof.

If the user input indicates activation of the laboratory resource allocation module 322, one or more sets of animal related data from laboratories are analyzed based on one or more resource allocation parameters in a step 3255. The laboratory resource allocation module 322 can determine an allocation of resources using one or more resource allocation parameters, and project an allocation of resources based on one or more actual or planned emergency scenarios.

If the user input indicates activation of the laboratory throughput analysis module 324, one or more sets of animal related data from laboratories are analyzed based on one or more laboratory throughput parameters in a step 3260. The laboratory throughput analysis module 324 can track one or more costs associated with the one or more laboratories, and perform a comparative analysis of the one or more laboratories.

If the user input indicates activation of the geospatial mapping module 330, the method causes a map with one or more graphical objects representing the one or more sets of animal related data from laboratories, analyzed animal related data from the laboratory resource allocation module 322, or analyzed animal related data from the laboratory throughput analysis module 324 to be displayed, by the one or more computing devices in a second frame of the user interface in a step or module 3265. The geospatial mapping module 330 displays a frame in the user interface that include a map with one or more graphical objects representing various data (e.g., type of animal, stage of production, disease status, etc.). The geospatial mapping module 330 also provides various controls that allow a user to annotate, change and manipulate content displayed within the frame (e.g., map data overlaid with data from the other source(s)).

If the user input indicates activation of the data display module 332, the method causes a listing, a chart or a graph of the one or more sets of animal related data from laboratories, analyzed animal related data from the laboratory resource allocation module 322, or analyzed animal related data from the laboratory throughput analysis module 324 to be displayed, by the one or more computing device(s) 102 in a third frame of the user interface in a step 3270. The data display module 332 displays a frame in the user interface that provides a listing, a chart or a graph of data.

If the user input indicates activation of the macro or scripting module 334, the method allows the user to create, modify and save customized modules, which provide custom functions, analysis or displays in a step 3275. Thereafter, the method ends in a step 3290. The method may also start again or return to one of the earlier steps depending on the application. The method is not limited to the foregoing steps or the specific order of steps described.

An example based on the aforementioned method will now be described. The LCEM is a web-based tool to help increase the nation's capability to prepare and respond to a high consequence animal emerging and/or zoonotic disease. This system allows for the automated determination of diagnostic testing capacity estimates, supply and equipment usage, personnel requirements, and any process limitations for individual laboratories and laboratory networks using an underlying model for analysis. Generated data can be used to improve knowledge of individual laboratories and laboratory networks diagnostic testing capacity, support decisions as part of a laboratory network activation plan, assist in the prioritization of additional resources needed, and serve as a tool for managing a large number of diagnostic tests simultaneously. The system facilitates the distribution of samples to promote efficient diagnostic testing by allowing the laboratory network program office insight into laboratory capacity prior to and during an outbreak and promoting more efficient communications between the laboratories and laboratory network coordinator.

Figure 33:
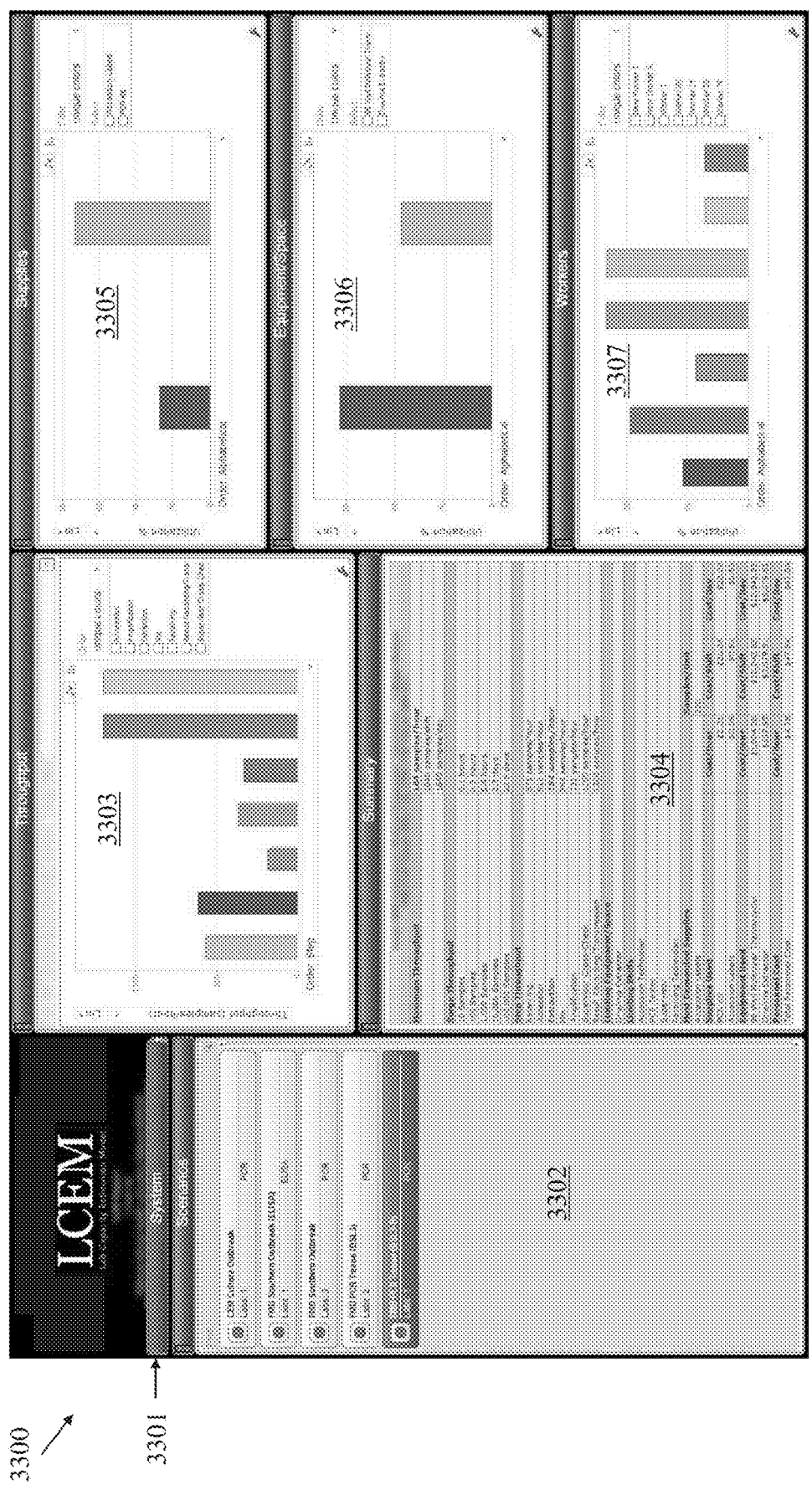
FIG. 33 illustrates a screen shot of an embodiment of a veterinary diagnostic laboratory capacity estimation dashboard.

Turning now to FIG. 33, illustrated is a screen shot of an embodiment of a veterinary diagnostic laboratory capacity estimation dashboard 3300. The veterinary diagnostic laboratory capacity estimation dashboard 3300 is divided into multiple frames including a system frame 3301 (minimized), a scenarios frame 3302, a throughput frame 3303 (bar graph), a data summary frame 3304, a supplies frame 3305 (bar graph), an equipment space 3306 (bar graph) and a workers frame 3307. Aggregated analysis of different inputs will facilitate evaluation of the rate limiting process for laboratory capacity.

Figure 34:
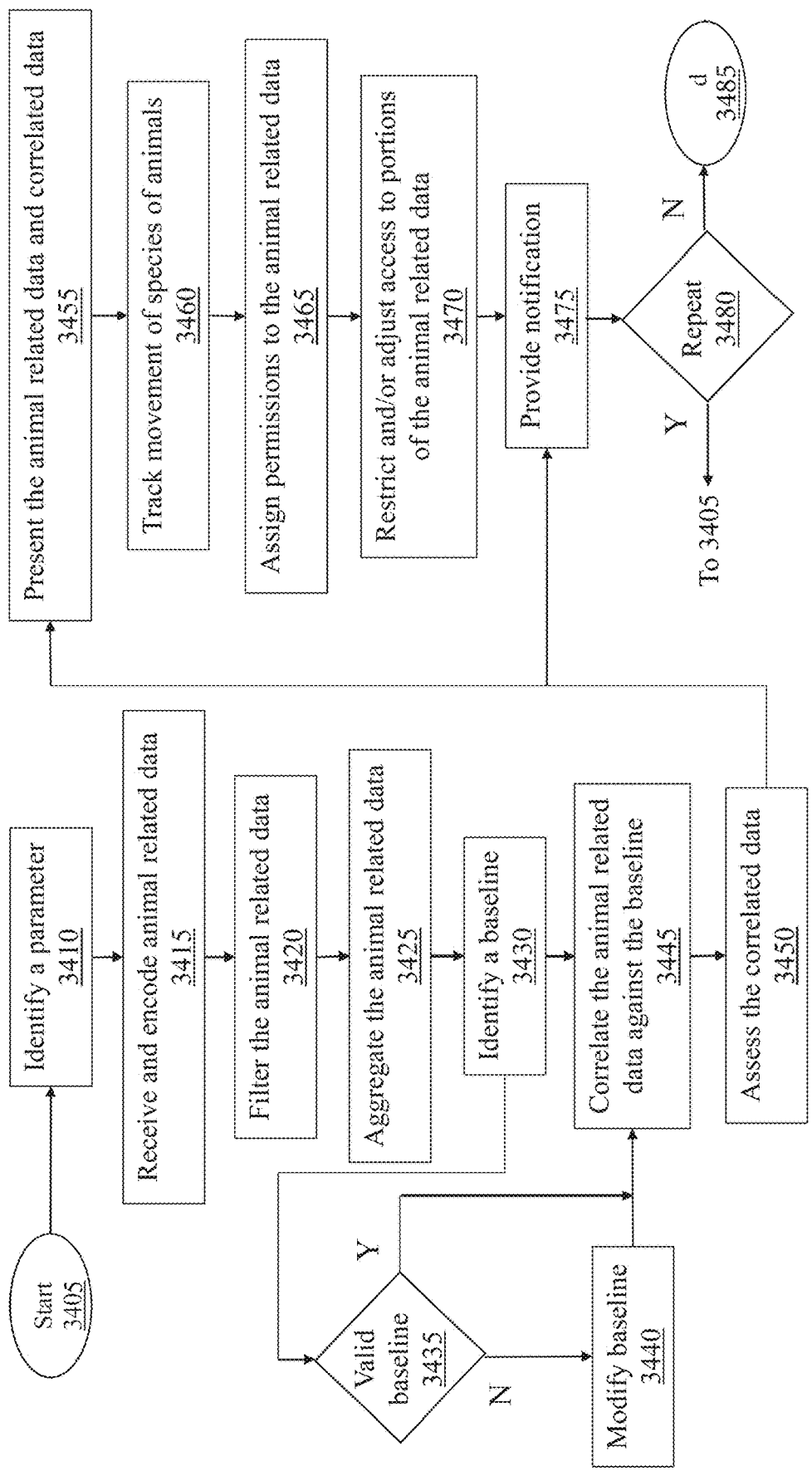
FIG. 34 illustrates a flow diagram of an embodiment of a method operable in biological environment.

Turning now to FIG. 34, illustrated is a flow diagram of an embodiment of a method to operable in a biological environment. The method begins at a start step or module 3405. At a step or module 3410, the method identifies a parameter related to animal management (e.g., a syndrome, animal health, animal production) for species (e.g., disparate species) in the biological environment. The parameter may include, without limitation, an animal diagnostic laboratory throughput parameter (e.g., a veterinary diagnostic laboratory throughput parameter), an animal resource allocation parameter (e.g., a veterinary diagnostic laboratory resource allocation parameter), an animal production parameter, an animal health monitoring parameter, an animal tracking parameter, an animal disease identification parameter, a phylogenetic analysis parameter, and an animal related emergency response parameter/dynamically changing situation.

The method then receives and encodes animal related data from different sources into a common format at a step or module 3415. The animal related data may include, without limitation, animal health data, movement data, key location data, surveillance data, diagnostic testing data, geographic information system layer data, personnel data, resource data, phylogenetic data and laboratory data, and may be directed at the individual or group level. The conversion or translation associated with encoding the animal related data may be from a proprietary format to a common agnostic format. In a related embodiment, the common agnostic format allows the data to be employable across various types of software and/or devices, and in certain instances, the data conversion may occur based on the type of the user or the user's inclusion in a membership of a group having permissions that require data conversion. A unique identifier can also be assigned to the animal related data to associate the data to other data such as a species type. The unique identifier may also be relationally associated with an identifier assigned to the animal related data by the corresponding data source (e.g. producer, veterinarian or health authority), and may be relationally associated by way of, for example, a concatenation of various identifiers associated with a producer, a veterinarian, or a federal health authority. The animal related data may also be anonymized to sanitize sensitive information, but sufficient to enable some type of analysis thereof.

At a step or module 3420, the method filters the animal related data from the different sources based on the parameter. The filtering of the animal related data from the different sources may be based on time, space and context associated with the parameter, and/or based on a guard band or pre-determined baseline associated with the parameter. Thus, certain animal related data may be flagged as anomalous and/or discarded if it falls outside of a particular expectation. Conversely, the animal related data that is filtered out may be retained within the memory 114 for other purposes. The method then aggregates the animal related data from the different sources about the parameter of the species at a step or module 3425.

At a step or module 3430, the method identifies a baseline for the parameter. It should be noted that the baseline may be a time series model calculated over time and may fluctuate based on the animal related data. At a decisional step or module 3435, the method tests the baseline to determine the validity thereof. The method may identify patterns in the animal related data to test the baseline. If the baseline is invalid or should be updated, the method modifies the baseline in a step or module 3440, and then proceeds to a step or module 3445. If the baseline is valid, then the method proceeds to the step or module 3445 and correlates the animal related data against the baseline to obtain correlated data.

Thereafter, the method analyzes the correlated data to assess the animal management at a step or module 3450. The method may assess the animal management by predicting future outcomes associated with the animal management, by identifying a trend associated with the animal management, and/or by identifying an anomaly or confirming a normalcy associated with the animal management. The assessment may be performed in real-time, or delayed to account for incubation time. At a step or module 3455, the method presents the animal related data in a first frame of a display and presents the correlated data in a second frame of the display. The animal related data and correlated data may be presented as a geographical map, a graphical representation, a chart or a list, and dynamically formatted for presentation on the display.

The method then tracks movement of the species associated with the animal related data at a step or module 3460. As an example, the animals may be tagged with a sensor (such as a radio frequency identification tag) that communicates with a reader and server to provide location information to a system performing the method. Of course, the method may not only track, but in addition to or in lieu of incorporate data about the movement of the species. At a step or module 3465, the method assigns permissions (e.g., credential based on predefined rules) to the animal related data based on the source and restricts access to at least portions of the animal related data based on the permissions (e.g., county (or coarser)-level permissions), which may be dynamically adjusted (e.g., full or unlimited access) based on specific circumstances, teaming arrangement, investigation, or on a situational basis such as an emergency level or basis, at a step or module 3470. The permissions may also be applied to access to the correlated data with the data granularity being commensurate with the permission levels. The permissions may be allocated by an external agency or service, and verified and assigned in accordance with the computing device(s) 102. Moreover, the location information may be expressed as either address geographical data, or coordinate geographical data, depending on the permissions.

The method also provides a notification to a device such as a client device(s) 108 based on the correlated data at a step or module 3475. The notification may include an alert to a device such as a client device(s) 108 if the animal related data substantially deviates from the baseline by, for instance, a guard band. A notification may also be provided if the animal related data is outside a predetermined set or threshold, which may affect an accuracy of the correlated data. At a decisional step or module 3480, it is determined if the method should be repeated. If the method should be repeated, then the method returns to the start step or module 3405, other the methods concludes at an end step or module 3485.

Figure 35:
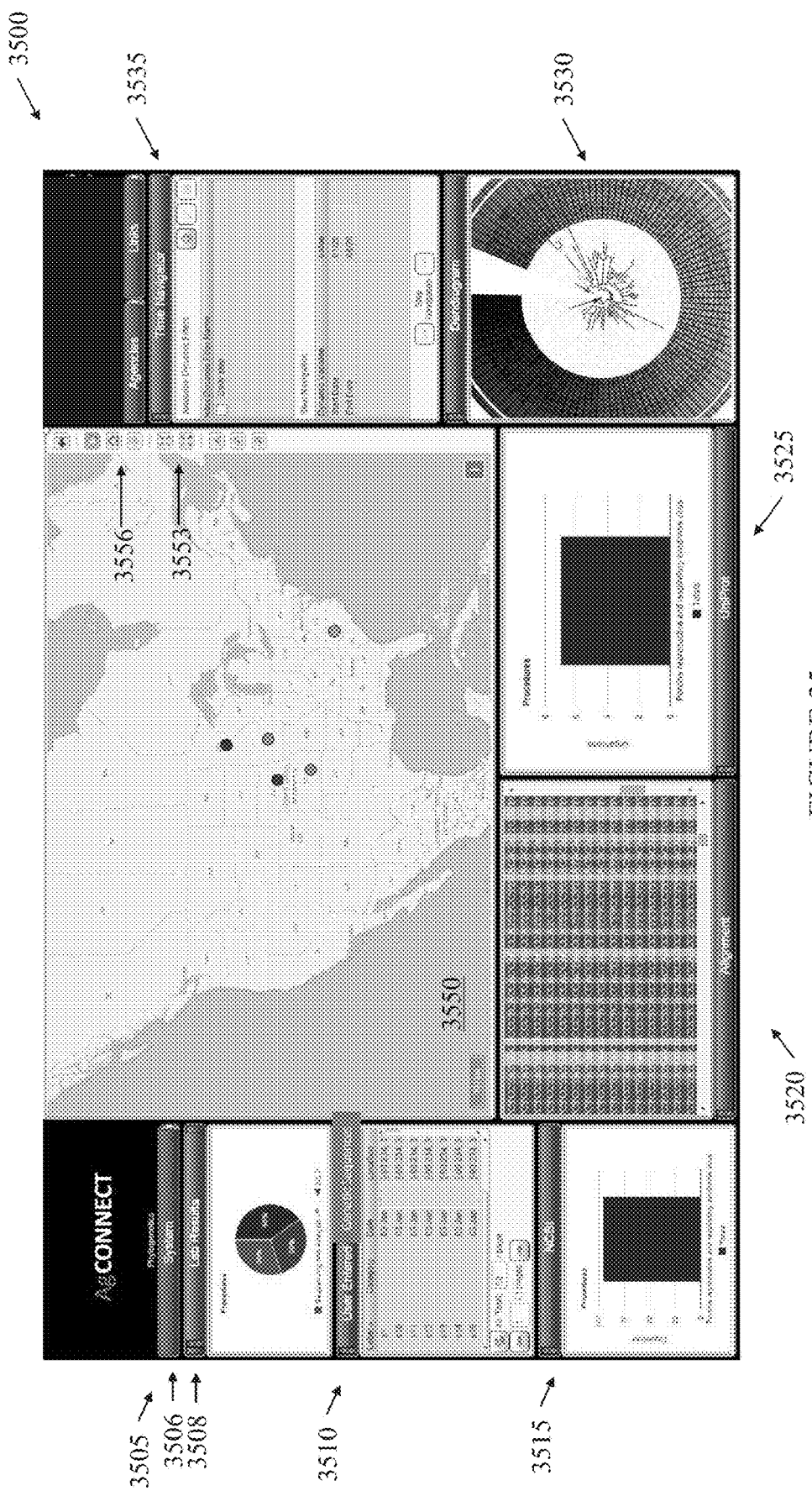
FIG. 35 illustrates a screen shot of an embodiment of a phylogenetic analysis dashboard.

Turning now to FIG. 35, illustrated is a screen shot of an embodiment of a phylogenetic analysis dashboard 3500 divided into multiple frames. The frames include a system and lab results frame 3505, a user entered genetic sequence frame 3510, a NCBI frame 3515, an alignment frame 3520, a UniProt frame 3525, a dendrogram frame 3530, and a time navigator frame 3535. The system and lab results 3505 include a system tab 3506 and lab results tab 3508. An interactive mapping frame 3550 graphically displays selected data on a map and includes a set of map navigational tools 3553 and a set of analytical tools 3556. The interactive mapping frame 3550 shows the specific geospatial locations of identified sequences color-coded based on their linkage and position within the dendrogram 3530. As shown, the lab results tab 3508 provides the ability to query and display test procedures and results of interest from diagnostic laboratories. The user entered genetic sequences tab 3510 provides the ability to import and display a set of user-defined sequences. The NCBI tab 3515 provides the ability to query and display sequences from the NCBI reference library. The alignment tab 3520 provides a display of the aligned set of sequences. The UniProt tab 3525 provides the ability to query and display sequences from the UniProt reference library. The dendrogram tab 3530 provides a graphical tree-based visualization of the set of sequences based upon their relationship to one another. The time navigator tab 3535 provides a tool to temporally filter and navigate the selected and displayed data across the system. The phylogenetic analysis tool integrates genetic sequence data from various sources (e.g., laboratories, end-user, reference libraries) and allows for time/space/visual analysis of the sequences of interest. It allows a user to visualize, analyze, and understand how similar or divergent the disease or condition is over time and space at a genetic level. It builds off of many foundational methodologies from the bio-informatics area.

Various embodiments of the present invention provide a system and computerized methods and applications that allow a diverse set of disparate data to be automatically collected and accessed in near real-time or real-time, brokered based on defined data sharing agreements, transformed (e.g., processed, aggregated, synthesized, integrated, correlated, fused, etc.) as needed, and presented to end-users in a customizable and interactive fashion. The system provides an extensible and modular framework that allows a variety of data and tools, and various underlying technologies to be integrated in a distributed yet seamless fashion. The system can be fully distributed integrating both fixed and mobile elements. The system allows producers, state animal health officials, federal regulatory agencies and others to better understand a situation (shared situational awareness) and to more effectively collaborate, coordinate, communicate and make decisions. The system supports both routine production scenarios and the full emergency cycle (i.e., planning, preparation, early detection, mitigation, response, management and recovery) for emerging disease indications and/or outbreak events. The method and applications, when executed, analyze and display one or more sets of animal related data, monitor the health of one or more animal herds, manage a health of one or more animal herds, or manage one or more animal laboratories.

One embodiment of the present invention is a computer-implemented method of analyzing and displaying one or more sets of animal related data operable on one or more computing devices. A data management application, data analysis application and user interface application executable by the one or more computing devices communicably coupled to one or more data sources are provided. The data management application, data analysis application and user interface application are interconnected. A data selection module is provided within the data management application. An animal tracking module, animal disease detection module and animal event response module are provided within the data analysis application. An application control module, geospatial mapping module and data display module are provided within the user interface application. The one or more computing devices display a set of application control functions from the application control module in a user interface of a display that enable customization and control of the user interface, and execution of the data selection module, animal tracking module, animal disease detection module, animal event response module, geospatial mapping module, phylogenetics analysis module, and data display module. The display is communicatively coupled to at least one of the one or more computing devices. The one or more computing devices receive a user input in the user interface of the display that indicates activation of the data selection module, animal tracking module, animal disease detection module, animal event response module, geospatial mapping module, or data display module.

Whenever the user input indicates activation of the data selection module, the data selection module obtains the one or more sets of animal related data and causes the one or more computing devices to display the one or more sets of animal related data in a first frame of the user interface. The animal related data may be automatically collected from the one or more data sources, and additional animal related data from one or more sensors or one or more client devices can be integrated with the one or more sets of animal related data. The one or more sets of animal related data includes an animal health data, a movement data, a key location data, a surveillance data, a diagnostic testing data, a GIS layer data, a personnel data, a resource data, a laboratory data or a combination thereof, phylogenetics data, and a third party source thereof includes governmental databases, laboratory databases, animal processing databases, animal producer databases, veterinarian databases, commercial databases, data feeds, sensor data or a combination thereof.

Whenever the user input indicates activation of the animal tracking module, the one or more sets of animal related data are correlated with a geospatial data using the animal tracking module. The animal tracking module may also track a movement of one or more animals over time, and/or track one or more permits associated with one or more animals over time and determine a status of the one or more permits.

Whenever the user input indicates activation of the animal disease detection module, the one or more sets of animal related data are analyzed based on one or more disease identification parameters using the animal disease detection module. The disease identification parameters may include a baseline interval to estimate expected data behavior, a current event of potentially anomalous data and a guard band between the baseline interval and the current event to avoid contamination of the baseline interval by an outbreak signal. The animal disease detection module may adjust the disease identification parameters to detect a specific disease or a new strain of the specific disease, and set one or more trigger conditions that provide an alert or notification of the specific disease. The disease identification parameters may also be adjusted to compensate for seasonality. The animal disease detection module may detect one or more anomalies within the one or more sets of animal related data, predict a spread of a disease based on a statistical analysis, detect one or more symptom or disease related patterns or trends, and/or identify a potential threat to human public health. The animal disease detection module may include one or more phylogenetic analysis tools.

Whenever the user input indicates activation of the animal event response module, the one or more sets of animal related data are analyzed based on one or more animal related emergency response parameters. The animal event response module may determine a quarantine zone or a buffer zone, determine an allocation of resources (e.g., based on an animal vaccination scenario, an animal sampling scenario and an animal slaughter scenario), plan a response to an actual or simulated animal disease outbreak and/or implement a response to an actual animal disease outbreak.

Whenever the user input indicates activation of the geospatial mapping module, the geospatial mapping module causes the one or more computing devices display a map with one or more graphical objects representing the one or more sets of animal related data, correlated data from the animal tracking module, analyzed data from the animal disease detection module or analyzed data from the animal event response module in a second frame of the user interface. Whenever the user input indicates activation of the data display module, the data display modules causes the one or more computing devices display a listing, a chart or a graph of the one or more sets of animal related data, correlated data from the animal tracking module, analyzed data from the animal disease detection module or analyzed data from the animal event response module in a third frame of the user interface.

The method may also automatically create and send one or more notifications to one or more client devices communicably coupled to the one or more computing devices. The method may assign one or more permissions to the one or more sets of animal related data based on one or more data sharing agreements associated with the one or more data sources, and transform or restrict selected portions of the assessed one or more sets of animal related data based on one or more permissions assigned to the one or more sets of animal related data. The method may also assess the one or more sets of animal related data, and transform the assessed one or more sets of animal related data by aggregating the assessed one or more sets of animal related data to provide selected portions of the assessed one or more sets of animal related data without disclosing any confidential information. The method may limit access to the one or more sets of animal related data based on a security level of a user, the display or a client device. The method may also dynamically adjust access to the one or more sets of animal related data based on specific circumstances such as an emergency level or basis. The method may also provide a data query tool, a map annotation tool, a calculator, one or more analytical tools and a macro or scripting module to create a user-defined module.

Another embodiment of the present invention is a computer-implemented method of monitoring the health of one or more animal herds operable on one or more computing devices. A data management application, data analysis application and user interface application executable by the one or more computing devices communicably coupled to one or more data sources are provided. The data management application, data analysis application and user interface application are interconnected. A data selection module is provided within the data management application. An animal health monitoring module and an animal disease detection module are provided within the data analysis application. An application control module, a geospatial mapping module and a data display module are provided within the user interface application. The one or more computing devices display a set of application control functions from the application control module in a user interface of a display that enable customization and control of the user interface, and execution of the data selection module, animal health monitoring module, animal disease detection module, geospatial mapping module and data display module. The display is communicatively coupled to at least one of the one or more computing devices. The one or more computing devices receive a user input in the user interface of the display that indicates activation of the data selection module, animal health monitoring module, animal disease detection module, geospatial mapping module, or data display module.

Whenever the user input indicates activation of the data selection module, the data selection module obtains the one or more sets of animal related data and causes the one or more computing devices to display the one or more sets of animal related data in a first frame of the user interface. The animal related data may be automatically collected from the one or more data sources, and additional animal related data from one or more sensors or one or more client devices can be integrated with the one or more sets of animal related data. The one or more sets of animal related data includes an animal health data, a movement data, a key location data, a surveillance data, a diagnostic testing data, a GIS layer data, a personnel data, a resource allocation data, a veterinary diagnostic laboratory data or a combination thereof, phylogenetics data, and a third party source thereof includes governmental databases, laboratory databases, animal processing databases, animal producer databases, veterinarian databases, commercial databases, data feeds, sensor data or a combination thereof.

Whenever the user input indicates activation of the animal health monitoring module, the one or more sets of animal related data are analyzed for any changes in the health of the one or more animal herds using the animal health monitoring module. The animal health monitoring module may also track a movement of one or more animals over time, and/or track one or more permits associated with one or more animals over time and determine a status of the one or more permits. The animal health monitoring module may also request an additional testing of one or more animals, and/or request an animal health data associated with one or more animals.

Whenever the user input indicates activation of the animal disease detection module, the one or more sets of animal related data are analyzed based on one or more disease identification parameters using the animal disease detection module. The disease identification parameters may include a baseline interval to estimate expected data behavior, a current event of potentially anomalous data and a guard band between the baseline interval and the current event to avoid contamination of the baseline interval by an outbreak signal. The animal disease detection module may provide an alert or warning not to move one or more animals to a specific geographic area, adjust the disease identification parameters to detect a specific disease or a new strain of the specific disease, and set one or more trigger conditions that provide an alert or notification of the specific disease. The disease identification parameters may also be adjusted to compensate for seasonality. The animal disease detection module may detect one or more anomalies within the one or more sets of animal related data, predict a spread of a disease based on a statistical analysis, detect one or more symptom or disease related patterns or trends, and/or identify a potential threat to human public health. The animal disease detection module may include one or more phylogenetic analysis tools.

Whenever the user input indicates activation of the geospatial mapping module, the geospatial mapping modules causes a map to be displayed with one or more graphical objects representing the one or more sets of animal related data, analyzed data from the animal health monitoring module, or analyzed data from the animal disease detection module in a second frame of the user interface. Whenever the user input indicates activation of the data display module, the data display module causes a listing, a chart or a graph of the one or more sets of animal related data, analyzed data from the animal health monitoring module, or analyzed data from the animal disease detection module to be displayed by the one or more computing devices in a third frame of the user interface.

The method may also automatically create and send one or more notifications to one or more client devices communicably coupled to the one or more computing devices. The method may assign one or more permissions to the one or more sets of animal related data based on one or more data sharing agreements associated with the one or more data sources, and transform or restrict selected portions of the assessed one or more sets of animal related data based on one or more permissions assigned to the one or more sets of animal related data. The method may also assess the one or more sets of animal related data, and transform the assessed one or more sets of animal related data by aggregating the assessed one or more sets of animal related data to provide selected portions of the assessed one or more sets of animal related data without disclosing any confidential information. The method may limit access to the one or more sets of animal related data based on a security level of a user, the display or a client device. The method may also dynamically adjust access to the one or more sets of animal related data based on specific circumstances such as an emergency level or basis. The method may also provide a data query tool, a map annotation tool, a calculator, one or more analytical tools and a macro or scripting module to create a user-defined module.

Yet another embodiment of the present invention is a computer-implemented method of managing the health of one or more animal herds operable on one or more computing devices. A data management application, data analysis application and user interface application executable by the one or more computing devices communicably coupled to one or more data sources are provided. The data management application, data analysis application and user interface application are interconnected. A data selection module is provided within the data management application. An animal health monitoring module and an animal production management module are provided within the data analysis application. An application control module, a geospatial mapping module and a data display module are provided within the user interface application. The one or more computing devices display, in a user interface of a display that is communicatively coupled to at least one of the one or more computing devices, a set of application control functions from the application control module that enable customization and control of the user interface, and execution of the data selection module, animal health monitoring module, animal production management module, geospatial mapping module and data display module. The one or more computing devices receive a user input in the user interface of the display that indicates activation of the data selection module, animal health monitoring module, animal production management module, geospatial mapping module, or data display module.

Whenever the user input indicates activation of the data selection module, the data selection module obtains the one or more sets of animal related data and causes the one or more computing devices to display the one or more sets of animal related data in a first frame of the user interface. The animal related data may be automatically collected from the one or more data sources, and additional animal related data from one or more sensors or one or more client devices can be integrated with the one or more sets of animal related data. The one or more sets of animal related data includes an animal health data, a movement data, a key location data, a surveillance data, a diagnostic testing data, a GIS layer data, a personnel data, a resource allocation data, a veterinary diagnostic laboratory data or a combination thereof, and a third party source thereof includes governmental databases, laboratory databases, animal processing databases, animal producer databases, veterinarian databases, commercial databases, data feeds, sensor data or a combination thereof.

Whenever the user input indicates activation of the animal health monitoring module, the one or more sets of animal related data are analyzed for any changes in the health of the one or more animal herds using the animal health monitoring module. The animal health monitoring module may also track a movement of one or more animals over time, and/or track one or more permits associated with one or more animals over time and determine a status of the one or more permits. The animal health monitoring module may also request an additional testing of one or more animals, and/or request an animal health data associated with one or more animals. The animal health monitoring module may provide an alert or warning not to move one or more animals to a specific geographic area.

Whenever the user input indicates activation of the animal production management module, the one or more sets of animal related data are analyzed based on one or more animal production parameters using the animal production management module. The animal production management module may adjust one or more preplanned animal movements, share an animal test data between two or more animal producers, and share premises disease status for a particular pathogen of interest between two or more animal producers, adjust an animal diet based on the analyzed data, and/or adjust an animal vaccination schedule based on the analyzed data. The animal production management module may include one or more phylogenetic analysis tools.

Whenever the user input indicates activation of the geospatial mapping module, the geospatial mapping module causes a map to be displayed by the one more computing devices with one or more graphical objects representing the one or more sets of animal related data, analyzed data from the animal health monitoring module, or analyzed data from the animal production management module. Whenever the user input indicates activation of the data display module, the data display module causes the one or more computing devices to display in a third frame of the user interface, a listing, a chart or a graph of the one or more sets of animal related data, analyzed data from the animal health monitoring module, or analyzed data from the animal production management module.

The method may also automatically create and send one or more notifications to one or more client devices communicably coupled to the one or more computing devices. The method may assign one or more permissions to the one or more sets of animal related data based on one or more data sharing agreements associated with the one or more data sources, and transform or restrict selected portions of the assessed one or more sets of animal related data based on one or more permissions assigned to the one or more sets of animal related data. The method may also assess the one or more sets of animal related data, and transform the assessed one or more sets of animal related data by aggregating the assessed one or more sets of animal related data to provide selected portions of the assessed one or more sets of animal related data without disclosing any confidential information. The method may limit access to the one or more sets of animal related data based on a security level of a user, the display or a client device. The method may also dynamically adjust access to the one or more sets of animal related data based on specific circumstances such as an emergency level or basis. The method may also provide a data query tool, a map annotation tool, a calculator, one or more analytical tools and a macro or scripting module to create a user-defined module.

Another embodiment of the present invention is a computer-implemented method of managing one or more animal laboratories operable on one or more computing devices. A data management application, data analysis application and user interface application executable by the one or more computing devices communicably coupled to one or more data sources are provided. The data management application, data analysis application and user interface application are interconnected. A data selection module is provided within the data management application. A laboratory resource allocation module and a laboratory throughput analysis module are provided within the data analysis application. An application control module, a geospatial mapping module and a data display module are provided within the user interface application. The one or more computing devices display a set of application control functions from the application control module in a user interface of a display that enable customization and control of the user interface, and execution of the data selection module, laboratory resource allocation module, laboratory throughput analysis module, geospatial mapping module and data display module. The display is communicatively coupled to at least one of the one or more computing devices. The one or more computing devices receive in the user interface of the display, a user input that indicates activation of the data selection module, laboratory resource allocation module, laboratory throughput analysis module, geospatial mapping module or data display module.

Whenever the user input indicates activation of the data selection module, the data selection module obtains the one or more sets of animal related data (e.g., laboratory data) and causes the one or more computing devices to display the one or more sets of laboratory data in a first frame of the user interface. The animal related data may be automatically collected from the one or more data sources, and additional animal related data from one or more sensors or one or more client devices can be integrated with the one or more sets of animal related data. The one or more sets of animal related data includes an animal health data, a movement data, a key location data, a surveillance data, a diagnostic testing data, a GIS layer data, a personnel data, a resource allocation data, a laboratory data or a combination thereof, and a third party source thereof includes governmental databases, laboratory databases, animal processing databases, animal producer databases, veterinarian databases, commercial databases, data feeds, sensor data or a combination thereof.

Whenever the user input indicates activation of the laboratory resource allocation module, the one or more sets of laboratory data are analyzed based on one or more resource allocation parameters using the laboratory resource allocation module. The laboratory resource allocation module also determines an allocation of resources, and/or project a required allocation of resources based on one or more actual or planned emergency scenarios.

Whenever the user input indicates activation of the laboratory throughput analysis module, the one or more sets of laboratory data are analyzed based on one or more laboratory throughput parameters using the laboratory throughput analysis module. The laboratory throughput analysis module may also track one or more costs associated with the one or more laboratories, and/or perform a comparative analysis of the one or more laboratories.

Whenever the user input indicates activation of the geospatial mapping module, the geospatial mapping module causes a map with one or more graphical objects representing the one or more sets of laboratory data, analyzed data from the laboratory resource allocation module, or analyzed data from the laboratory throughput analysis module to be displayed by the one or more computing devices in a second frame of the user interface. Whenever the user input indicates activation of the data display module, the data display module causes a listing, a chart or a graph of the one or more sets of laboratory data, analyzed data from the laboratory resource allocation module, or analyzed data from the laboratory throughput analysis module to be displayed by the one or more computing devices in a third frame of the user interface.

The method may also automatically create and send one or more notifications to one or more client devices communicably coupled to the one or more computing devices. The method may assign one or more permissions to the one or more sets of animal related data based on one or more data sharing agreements associated with the one or more data sources, and transform or restrict selected portions of the assessed one or more sets of animal related data based on one or more permissions assigned to the one or more sets of animal related data. The method may also assess the one or more sets of animal related data, and transform the assessed one or more sets of animal related data by aggregating the assessed one or more sets of animal related data to provide selected portions of the assessed one or more sets of animal related data without disclosing any confidential information.

The method may limit access to the one or more sets of animal related data based on a security level of a user, the display or a client device. The method may also dynamically adjust access to the one or more sets of animal related data based on specific circumstances such as an emergency level or basis. The method may also provide a data query tool, a map annotation tool, a calculator, one or more analytical tools and a macro or scripting module to create a user-defined module.

The foregoing computerized methods can be implemented with a system that includes one or more data sources, and one or more computing devices communicably coupled to the one or more data sources. The one or more computing devices include a communications interface, a memory, a display and one or more processors communicably coupled to the communications interface, memory and display. The one or more processors are programmed to execute the computer program embodied on a non-transitory computer readable medium.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

For a better understanding of correlation, see U.S. Pat. No. 8,948,279, entitled "Interrogator and Interrogation System Employing the same," by Volpi, et al., issued Feb. 3, 2015. For a better understanding of scan statistics and models for surveillance and early outbreak detection, see "Biosurveillance Applying Scan Statistics with Multiple, Disparate Data Sources," by Burkom, Journal of Urban Health: Bulletin of the New York Academy of Medicine, Volume 80, No. 2, Supplement 1, 2003; "A Statistical Algorithm for the Early Detection of Outbreaks of Infectious Disease," by Farrington, et al., Journal of the Royal Statistical Society, 159, Part 3, pp. 547-563, 1996; "A Simulation Model for Assessing Aberration Detection Methods used in Public Health Surveillance for Systems with Limited Baselines," by Hutwagner, et al., Statistics in Medicine, 24:543-550, 2005; "A Space-Time Permutation Scan Statistic for Disease Outbreak Detection," by Kulldorff, et al., PLoS Medicine, Volume 2, Issue 3, e59, pp. 216-224, March 2005; "Evaluating Statistical Methods for Syndromic Surveillance," by Stoto, et al., Statistical Methods in Counterterrorism, pp. 141-172; and "Evaluation of Sliding Baseline Methods for Spatial Estimation for Cluster Detection in the Biosurveillance System," by Xing, et al., International Journal of Health Geographies, 8:45, 2009.

All publications, patents and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a non-transitory computer readable storage structure tangibly embodying computer program code (i.e., software or firmware) thereon for execution by the computer processor. Many of the features and functions discussed above can be implemented in software, hardware, or firmware, or a combination thereof. Also, many of the features, functions, and steps of operating the same may be reordered, omitted, added, etc., and still fall within the broad scope of the various embodiments.

The techniques shown in the FIGURES illustrated herein can be implemented using code and data stored and executed on one or more electronic devices. Such electronic devices store and communicate (internally and/or with other electronic devices over a network) code and data using non-transitory tangible machine readable medium (e.g., magnetic disks; optical disks; read only memory; flash memory devices; phase-change memory).

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A method comprising:
receiving data associated with livestock from one or more data sources, the received data including geographical data expressed as an address;
converting the received data from a proprietary format to an agnostic format, the received data being converted by:
translating the geographical data into coordinate geographical information, responsive to a determination that the geographical information is in address format; and
generating a unique identifier that is applied to the data for the livestock in agnostic format, the unique identifier being operable to link the data to the livestock, and the unique identifier being generated based on a concatenation of an identifier for a producer, an identifier for a veterinarian, an identifier for a health authority, and a producer generated identification number, said identifiers for the producer, veterinarian, and health authority being designated to ensure the unique identifier is only associated with the livestock; and
outputting for display a graphical user interface (GUI) map representation of the geographic data in agnostic format, the GUI map representation being operable to access at least a subset of the received data for the livestock according to a permission level of a data consumer accessing the data.

2. The method of claim 1, further comprising:
determining whether the received data includes a predetermined set of data for the livestock; and rejecting the data from the one or more data sources upon determining that the received data does not include the predetermined set of data for the livestock.

3. The method of claim 2, further comprising outputting a notice responsive to a determination that the received data does not include the predetermined set of data for the livestock.

4. The method of claim 2, wherein the predetermined set of data comprises a minimum number of data elements required by a data consumer group membership to enable accurate analysis of livestock.

5. The method of claim 1, wherein translating the geographical data into coordinate geographical information further comprises retaining the address associated with the geographical data, and linking the address to the coordinate geographical information.

6. The method of claim 1, further comprising:

applying a permission to a data consumer based on the data consumer's membership in a group assigned a predefined level of detail to which access is permitted to the data in agnostic format; and controlling what level of detail is output for representation according to the permission for the data consumer.

7. The method of claim 6, further comprising changing the predefined level of detail for a group responsive to receipt of an input that indicates an emergency condition exists, to permit data consumers in the group full access to the data for the livestock in agnostic format.

8. The method of claim 6, wherein:

data consumers in a first group are restricted to data aggregated on a county-level absent an input that indicates an emergency condition exists, and responsive to receipt of the input, granting data consumers in the first group full access to the data beyond the county-level.

\* \* \* \* \*